United States Patent
Luxon et al.

[19]

[11] Patent Number: 6,095,820
[45] Date of Patent: Aug. 1, 2000

[54] RADIATION SHIELDING AND RANGE EXTENDING ANTENNA ASSEMBLY

[75] Inventors: Norval N. Luxon, San Jose; R. Joseph Milelli, Pleasanton, both of Calif.; John J. Daniels, Seymour, Conn.

[73] Assignee: Rangestar International Corporation, Aptos, Calif.

[21] Appl. No.: 08/549,063

[22] Filed: Oct. 27, 1995

[51] Int. Cl.$^7$ .................................................. H01Q 1/24
[52] U.S. Cl. ........................ 434/702; 343/841; 343/790; 343/791; 343/818; 343/819; 455/89; 455/90
[58] Field of Search .................................. 343/702, 841, 343/790, 791, 818, 819; 455/89, 90; H01Q 1/24

[56] References Cited

U.S. PATENT DOCUMENTS

| | | | |
|---|---|---|---|
| 2,480,143 | 8/1949 | Laxner | 343/702 |
| 2,490,782 | 12/1949 | Collup | 343/841 |
| 2,599,944 | 6/1952 | Salisbury | 343/841 |
| 2,712,603 | 7/1955 | Bridges et al. | 343/702 |
| 3,196,442 | 7/1965 | Leffelman et al. | 343/841 |

(List continued on next page.)

FOREIGN PATENT DOCUMENTS

| | | |
|---|---|---|
| 2091608 | 9/1994 | Canada . |
| 2091628 | 9/1994 | Canada . |
| 59-92629 | 5/1984 | Japan . |
| 61-56524 | 3/1986 | Japan . |
| 0254630 | 2/1990 | Japan . |
| 4127723 | 4/1992 | Japan . |

OTHER PUBLICATIONS

Detecting Microwave Radiation Hazards, 1961, Electronics World, vol. 65, No. 6, pp31–33 and 78–79.
McCaw to Study Cellular Phones as Safety Questions Affect Sales, Wall Street Journal, Jan. 29, 1993.
*CellShield Brochure.*
*Cell Shield Innovation in Cellular Radiation Protection*, publication date unknown—sometime after Feb. 24, 1993.
*Questions & Answers About Electric and Magnetic Fields Associated with the Use of Electric Power*, Nov. 1994, National Institute of Environmental Health Sciences, US Department of Energy.

(List continued on next page.)

*Primary Examiner*—Hoanganh Le
*Attorney, Agent, or Firm*—Larkin, Hoffman, Daly & Lindgren, Ltd.; John F. Klos

[57] ABSTRACT

An antenna assembly for transmitting a radio signal from a radio signal transmitting device includes an antenna unit comprised of a dipole driven antenna member for transmitting a radio signal from the radio signal transmitting device. A radiation reflector reflects the radio signal transmitted by the driven antenna member, and a support member supports the driven antenna member and the radiation reflector so that a predetermined gap is precisely maintained between the driven antenna member and the radiation reflector. A shielding member shields a portion of the radio signal transmitted by the driven antenna member in a direction toward the shielding member. The antenna unit is pivotally mounted so that it is disposable at selectable positions relative to the shielding member. The output of the radio signal transmitted by the driven antenna member can be controlled depending on a position of the antenna unit. The dipole driven antenna member comprises a first and a second segment made from a metal foil. To reduce the overall length of the antenna, each segment has an unfolded portion and a folded portion. The radiation reflector is a metal wire, also having an unfolded portion and folded portions. This construction makes the inventive antenna assembly compact, while being effective both as a transmitting and receiving unit. The radiation reflector directs a portion of the radio signal toward the open transmission area, so as to extend a transmission range of the antenna assembly, and thus extend the transmission range of the radio signal transmitting device. By this construction, at least some of the radiation signal that is emitted from the driven antenna member in directions toward the user is blocked by the shielding member. Thus, the inventive antenna assembly has a compact construction, prevents unwanted exposure of the user to potentially harmful radiation, and provides an enhanced and extended transmission signal to enable improved communication.

11 Claims, 48 Drawing Sheets

U.S. PATENT DOCUMENTS

| | | | |
|---|---|---|---|
| 3,564,111 | 2/1971 | Breitenbach | 343/702 |
| 4,189,730 | 2/1980 | Murdock | 343/841 |
| 4,471,493 | 9/1984 | Schober | 455/89 |
| 4,750,957 | 6/1988 | Gustafson | 343/702 |
| 4,831,210 | 5/1989 | Larson et al. | 174/35 |
| 4,845,772 | 7/1989 | Metroka et al. | 455/90 |
| 4,964,161 | 10/1990 | Trowbridge, Jr. | 343/702 |
| 4,980,564 | 12/1990 | Steelmon | 250/505 |
| 5,012,114 | 4/1991 | Sisson, Jr. | 343/702 |
| 5,014,346 | 5/1991 | Phillips et al. | 343/702 |
| 5,098,735 | 3/1992 | Henry | 174/33 |
| 5,124,889 | 6/1992 | Humbert et al. | 361/424 |
| 5,139,850 | 8/1992 | Clarke et al. | 324/192 |
| 5,150,282 | 9/1992 | Tomura et al. | 343/702 |
| 5,170,173 | 12/1992 | Krenz et al. | 455/89 |
| 5,231,407 | 7/1993 | McGirr et al. | 343/841 |
| 5,241,321 | 8/1993 | Tsao | 343/700 |
| 5,245,745 | 9/1993 | Jensen et al. | 343/702 |
| 5,247,182 | 9/1993 | Servant et al. | 343/702 |
| 5,260,513 | 11/1993 | Giles et al. | 174/33 |
| 5,262,792 | 11/1993 | Egashira | 343/702 |
| 5,309,164 | 5/1994 | Dienes et al. | 343/702 |
| 5,334,800 | 8/1994 | Kenney | 174/33 |
| 5,335,366 | 8/1994 | Daniels | 343/702 |
| 5,336,848 | 8/1994 | Katz | 343/702 |
| 5,336,896 | 8/1994 | Katz | 343/702 |
| 5,338,896 | 8/1994 | Danforth | 455/346 |
| 5,367,309 | 11/1994 | Tashjian | 343/702 |
| 5,371,509 | 12/1994 | Wallace, Jr. et al. | 343/702 |
| 5,373,304 | 12/1994 | Nolan et al. | 343/841 |
| 5,444,866 | 8/1995 | Cykiert | 343/702 |
| 5,507,012 | 4/1996 | Luxon et al. | 343/702 |
| 5,550,552 | 8/1996 | Oxley | 343/841 |

OTHER PUBLICATIONS

Today's View of Magnetic Fields, IEEE Spectrum, Dec. 1994.

EM Interaction of Handset Antennas and a Human in Personal Communications, Jensen et al., Proceedings of the IEEE, vol. 83, No. 1, Jan. 1995.

Ericson and Pac Bell Target Hearing Aid Interference Solutions, Kelly Pate, RCR, Feb. 26, 1996.

Digital Phones May Have Flaws, Karr et al., Wall Street Journal, Mar. 12, 1996.

Electromagnetic Energy Exposure of Simulated Users of Portable Cellular Telephones, Balzano et al., IEEE Transactions on Vehicular Technology, vol. 44, No. 3, Aug. 1995.

Internal Broadband Antenna for Hand–Held Terminals with Reduced Gain in the Direction of the User's Head, Fuhl et al., IEEE 1995.

Integrated Antennas for Hand–Held Telephones with Low Absorption, Pedersen et al., IEEE 1994.

Environmental Risk Factors for Primary Malignant Brain Tumors: A Review, Wrensch et al., Journal of Neuro–Oncology 17: 47–64, 1993.

Acute Low–Intensity Microwave Exposure Increases DNA Single–Strand Breaks in Rat Brain Cells, Lai et al., Bioelectromagnetics 16:207–210, 1995.

Test Finds Some Interference Between Hearing Aids, Phone, Sakelaris, RCR, Feb. 5, 1996.

GSM Controversy Swirls Around Pac Bell's Plans, Crabtree, Wireless Week, Feb. 26, 1996.

*The Antenna Company Brochure—Drive Time Kit*, Publication Date Unknown.

Wireless Industry Pledges to Fix Hearing Aid Troubles RCR, vol. 14, No. 20, Oct. 23, 1995.

*PCS Wireless, Inc. Brochure—PCS Tecnology at Work*, Publication date unknown.

Antenna Design Considerations for Personal Communications User Protection, Sadeghzadeh et al., IEEE 1995.

Simple Retractable Monopole Antenna with Small Mismatch Loss and High Radiation Efficiency for Cellular Portable Phones, Seki et al., IEEE 1995.

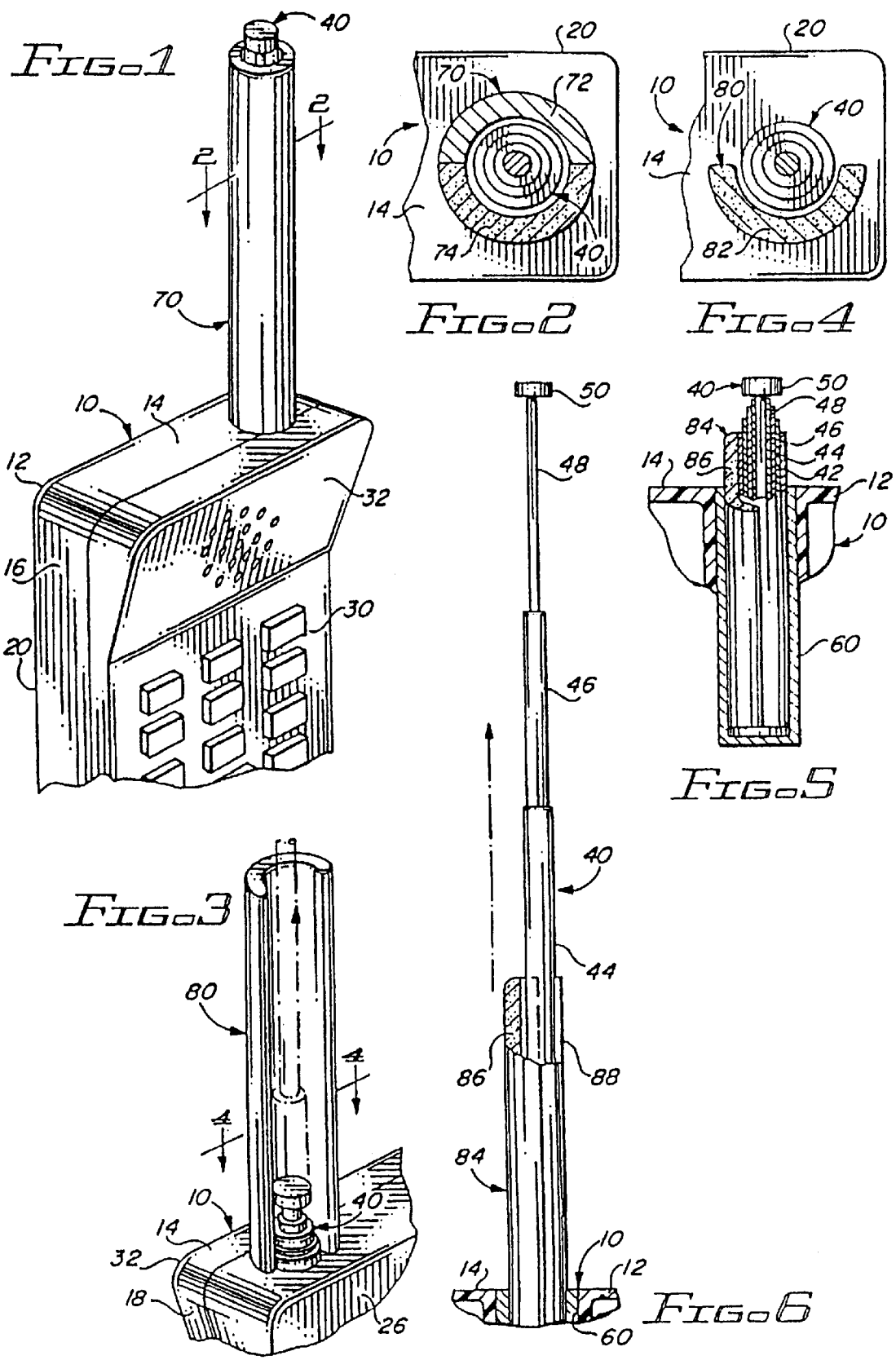

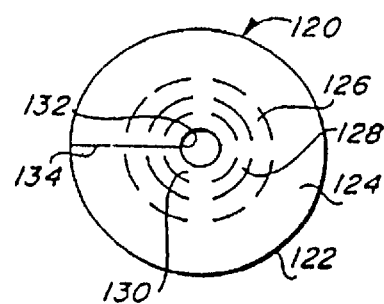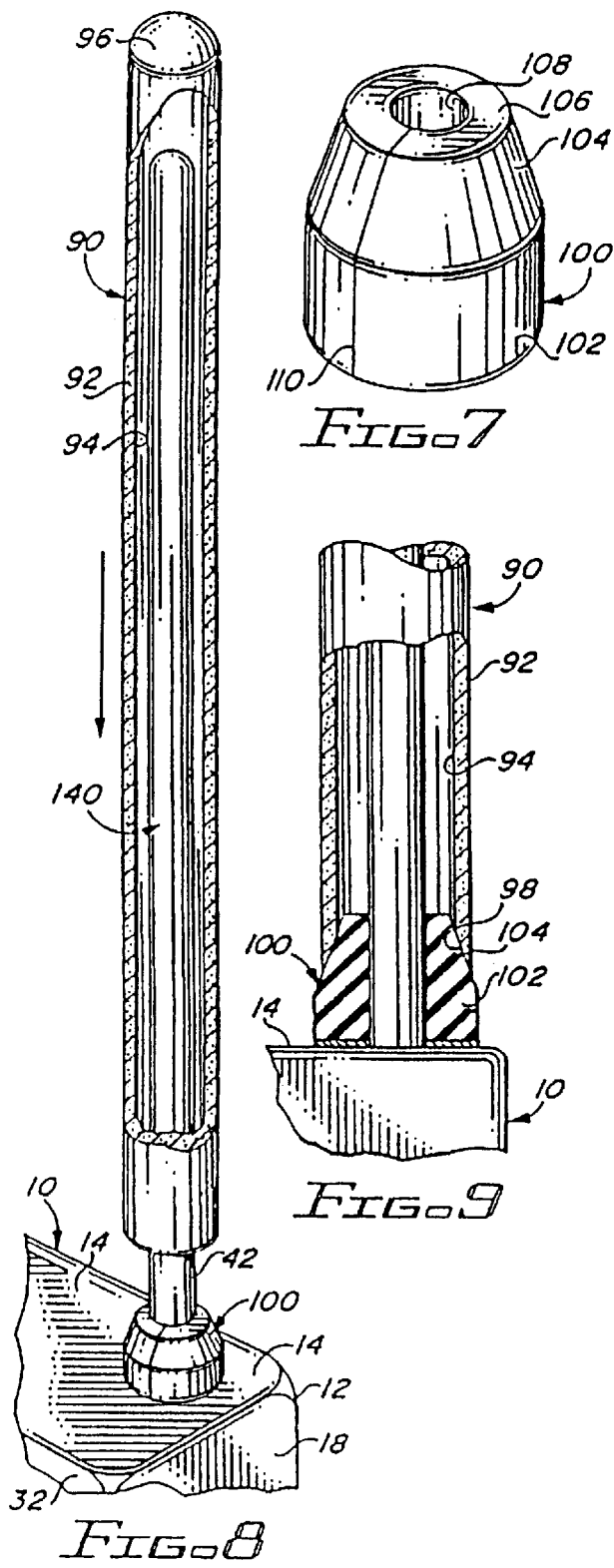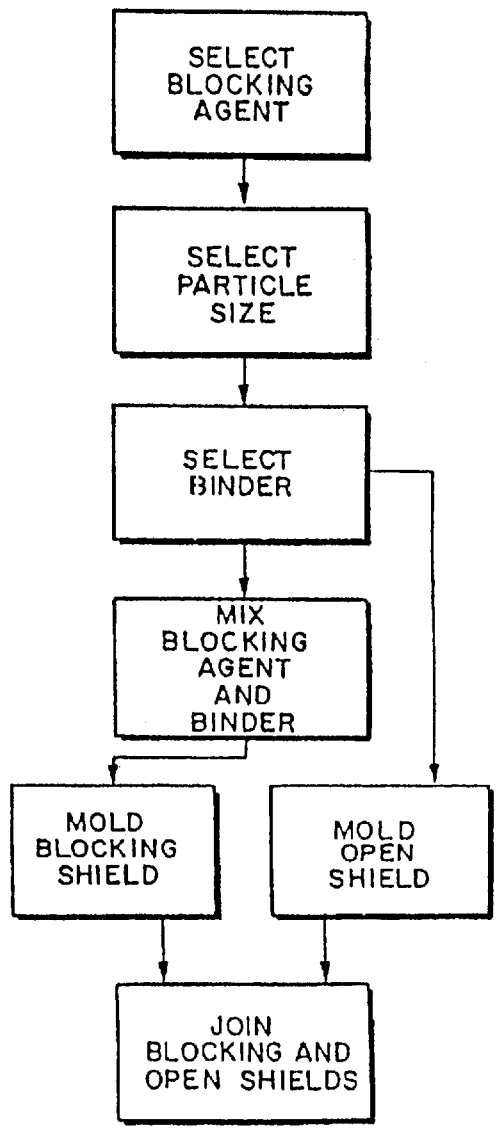

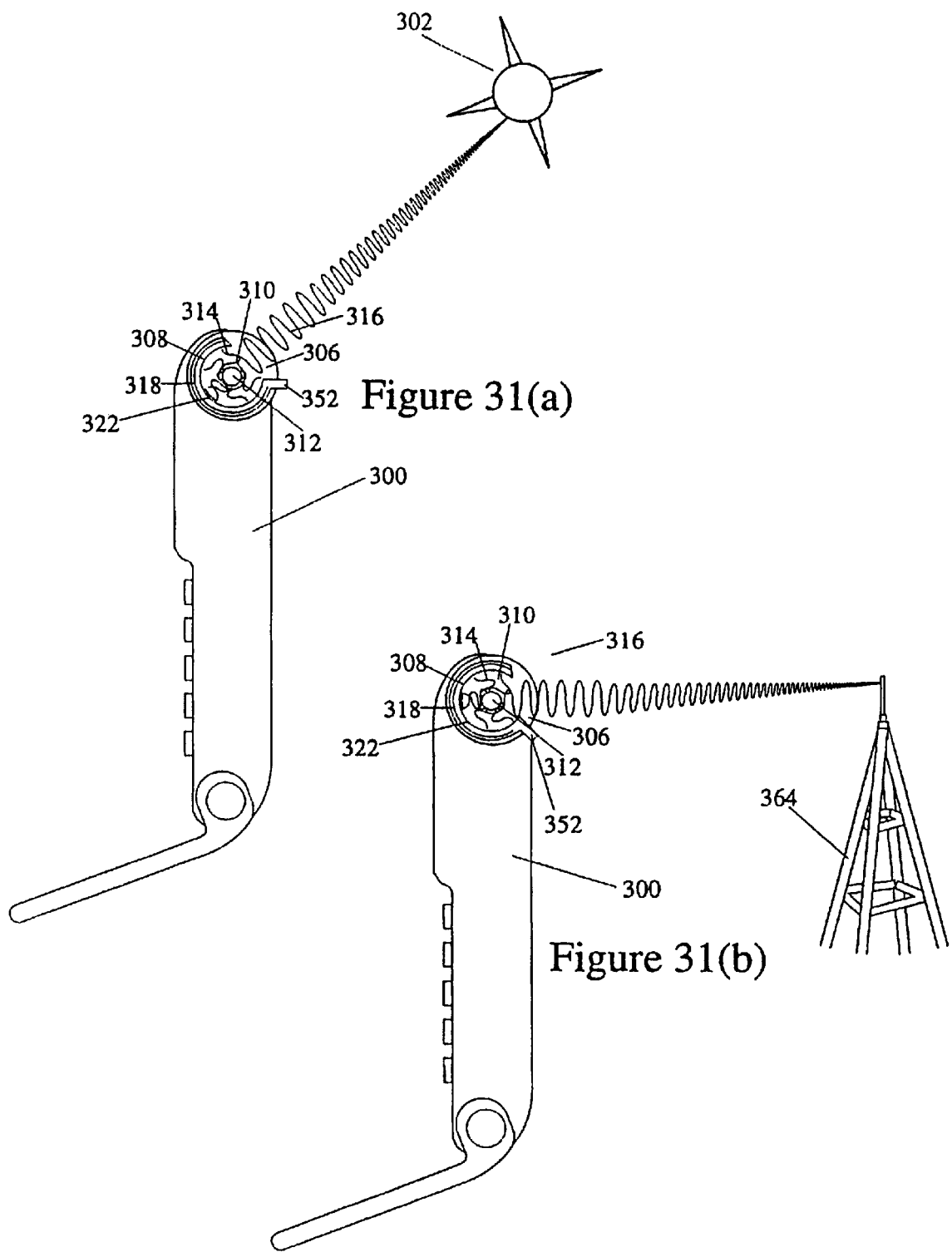

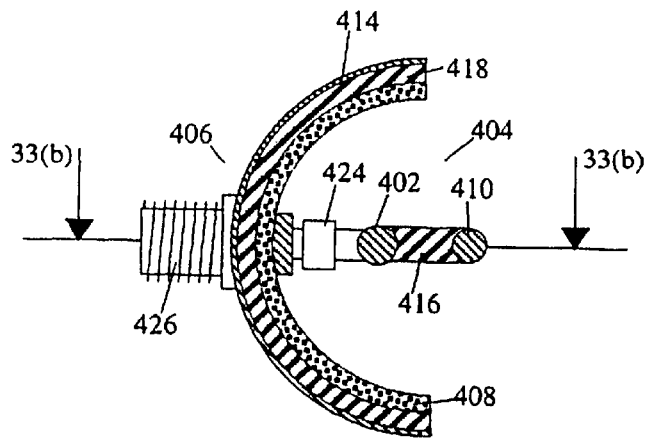
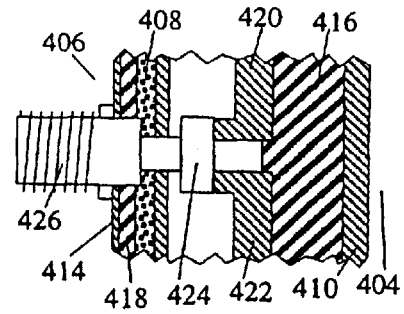
Figure 33(a)  Figure 33(b)
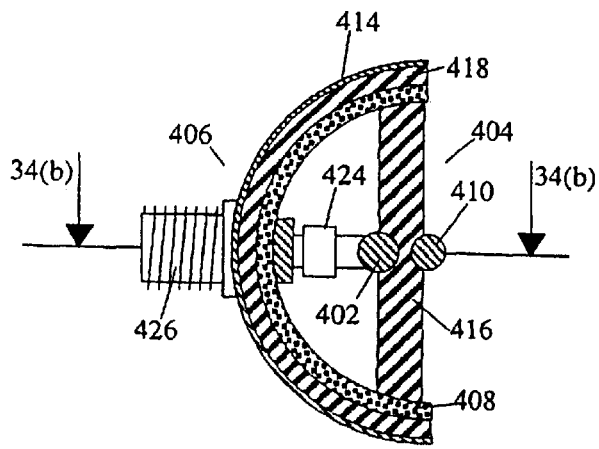
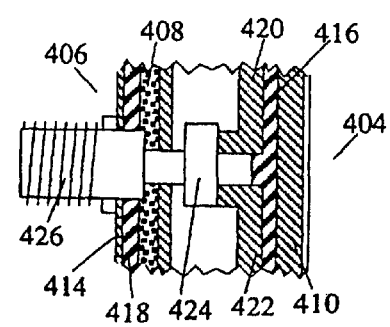
Figure 34(a)  Figure 34(b)
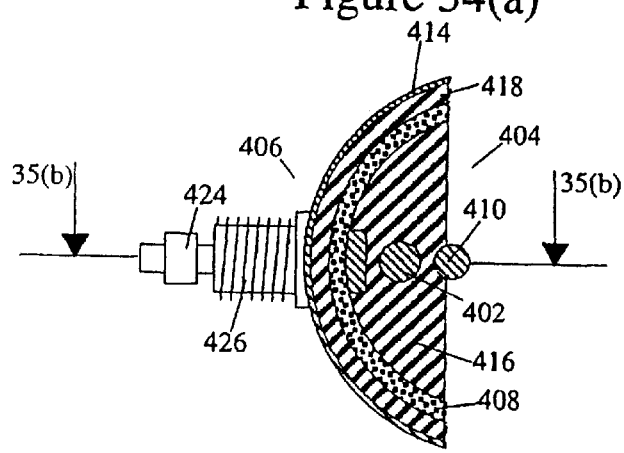
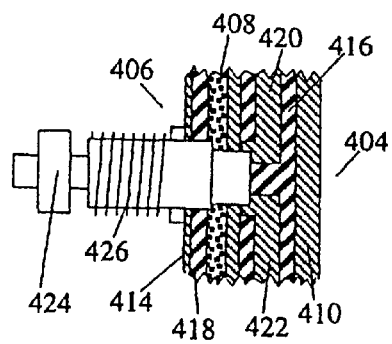
Figure 35(a)  Figure 35(b)

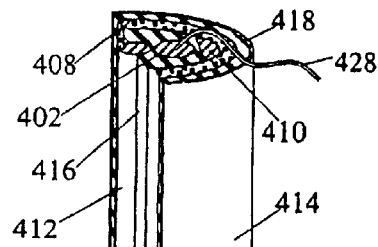
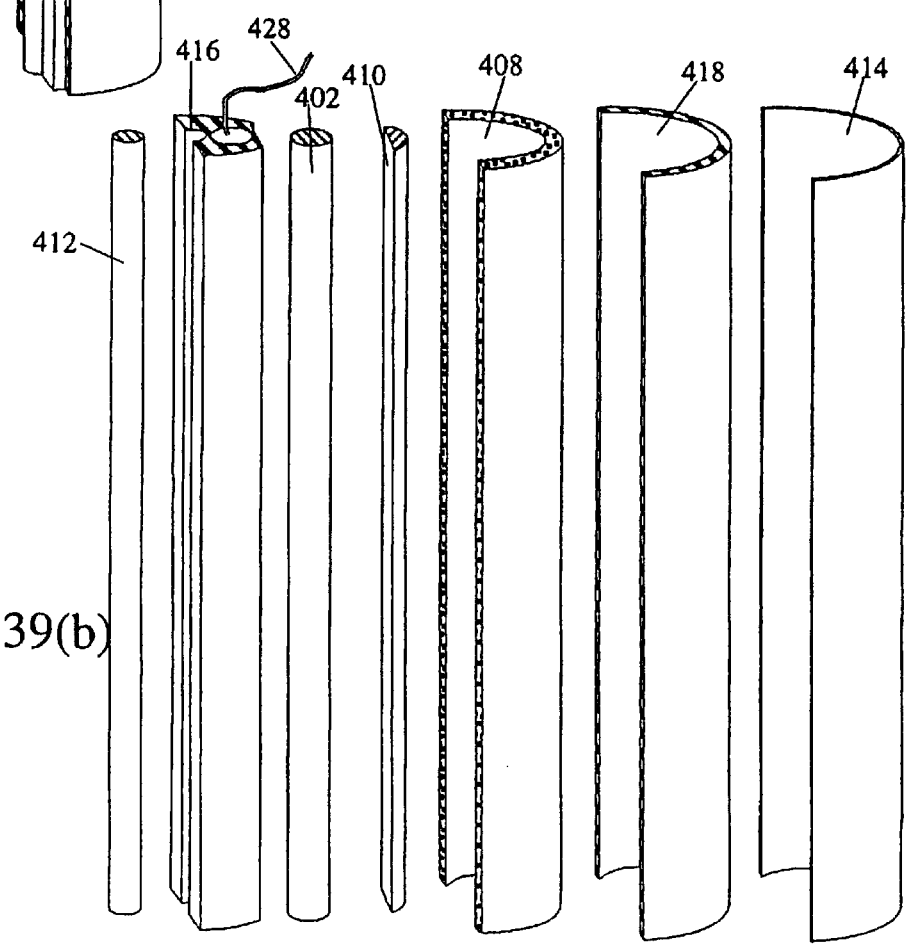
Figure 39(a)
Figure 39(b)

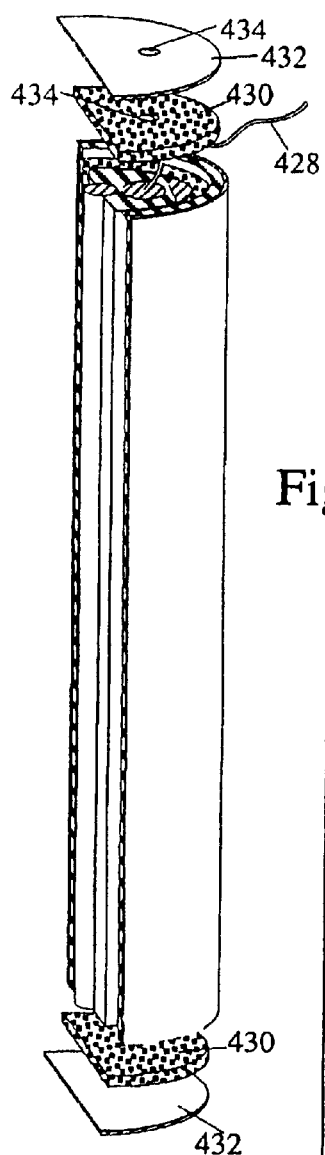
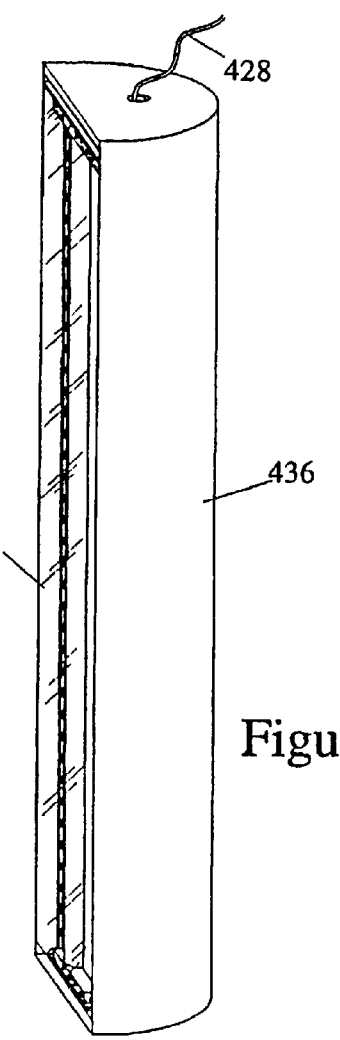
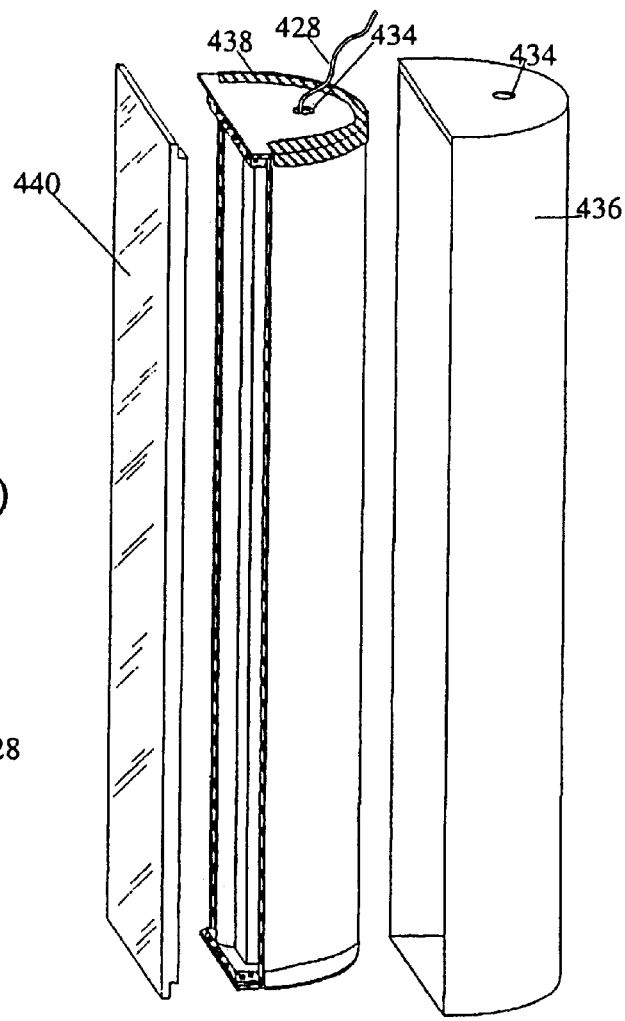
Figure 40(a)
Figure 40(b)
Figure 40(c)

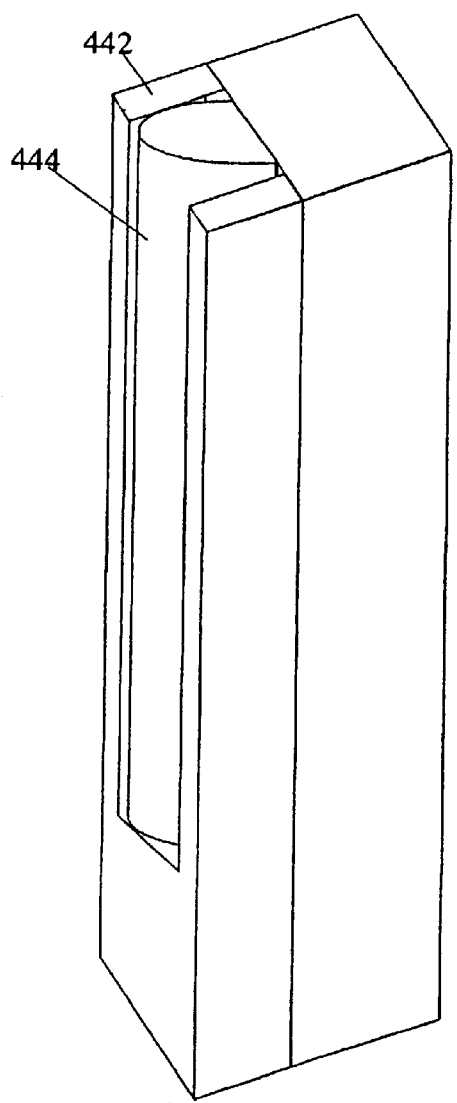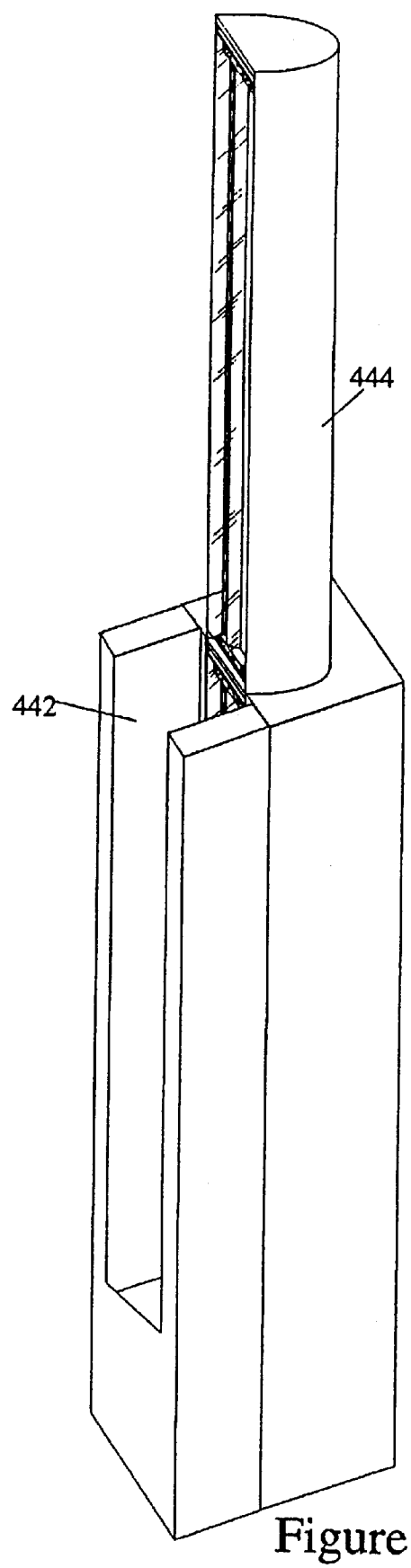
Figure 42(a)
Figure 42(b)

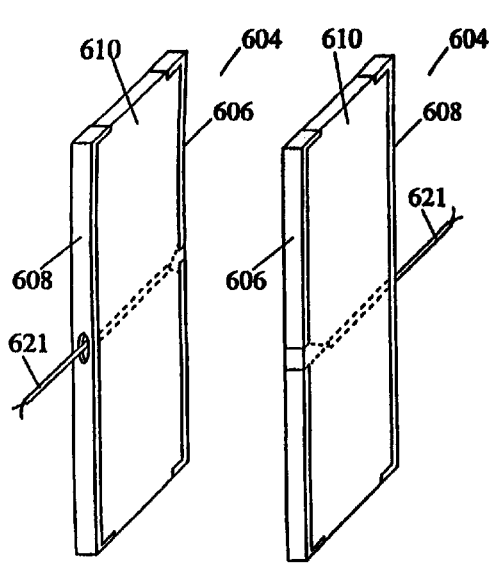 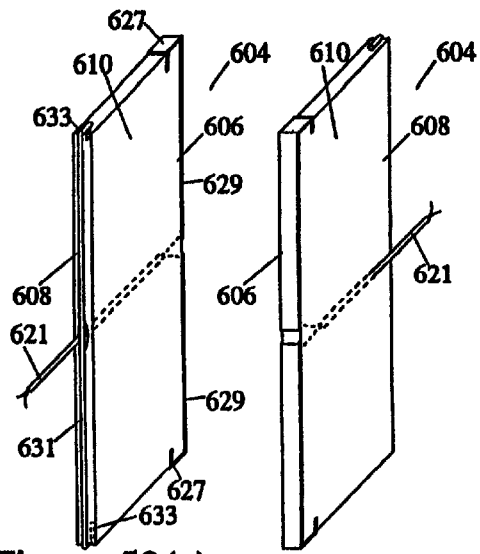
Figure 52(a)  Figure 52(b)  Figure 52(c)  Figure 52(d)
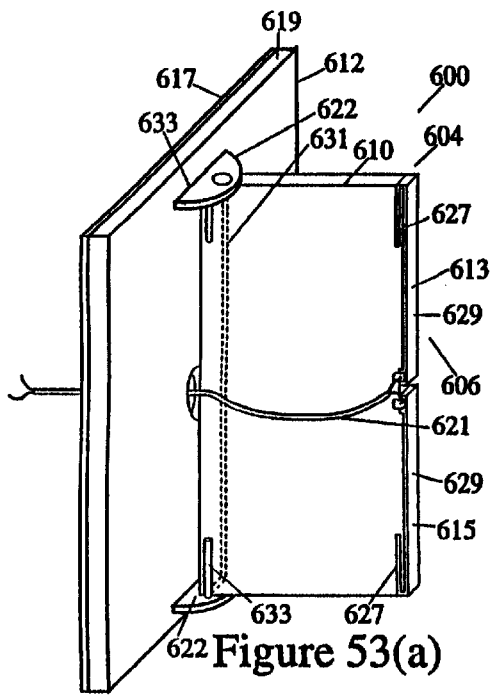 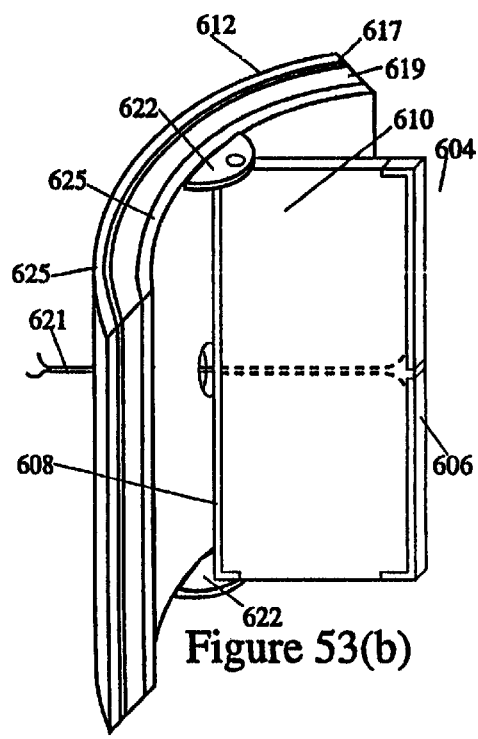
Figure 53(a)  Figure 53(b)

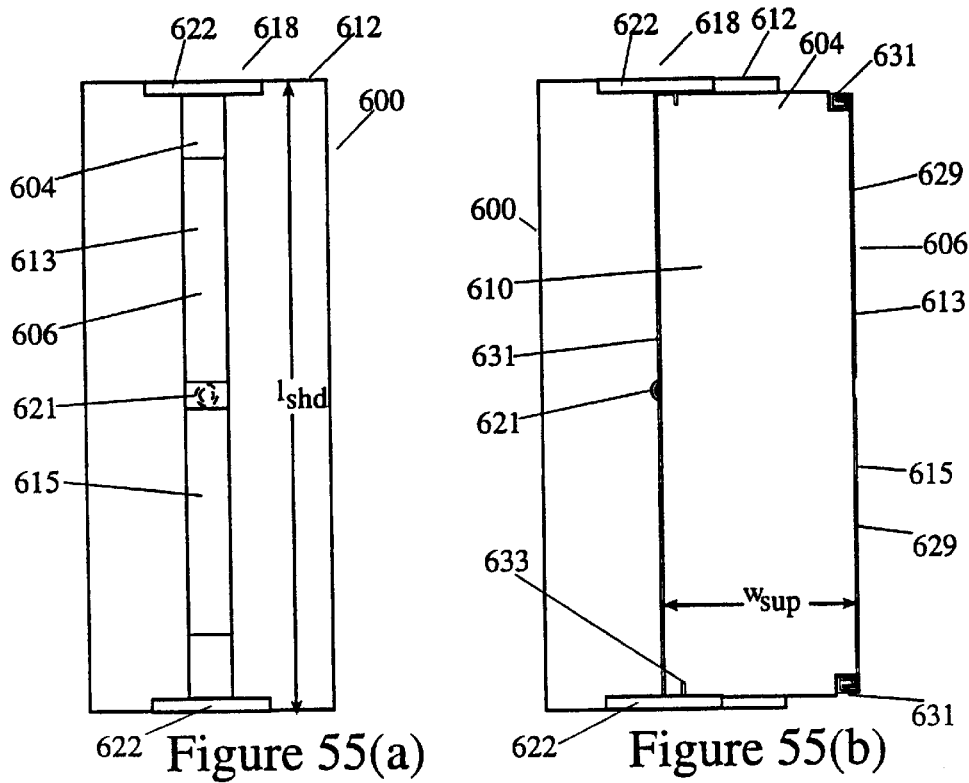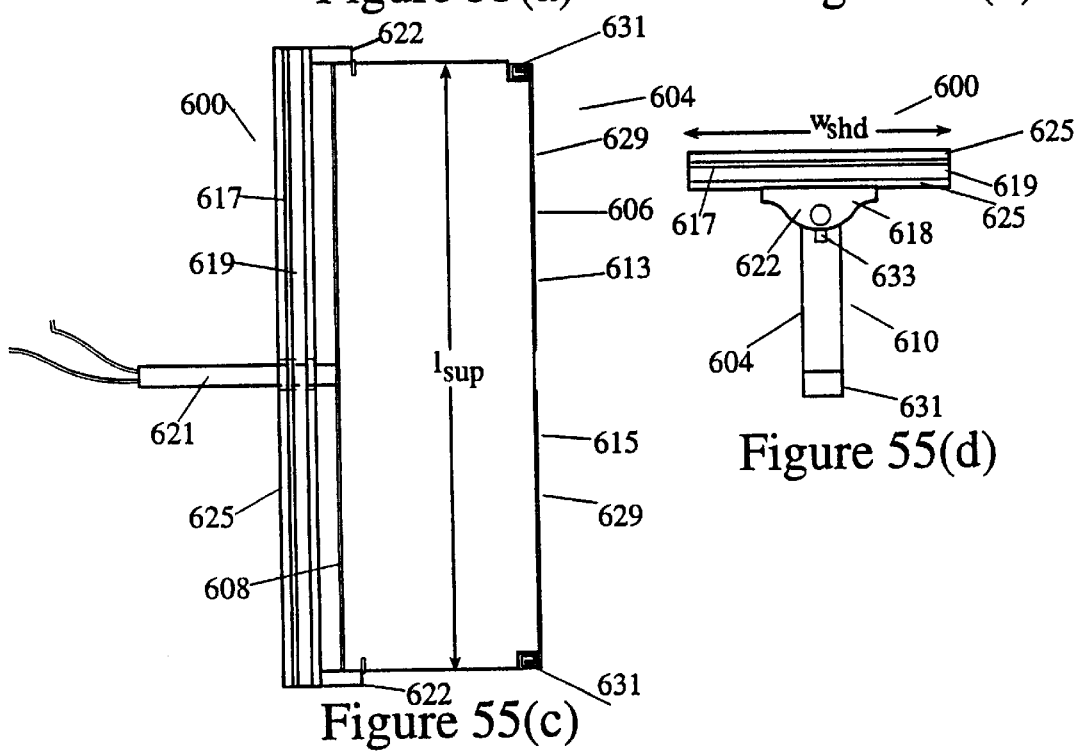

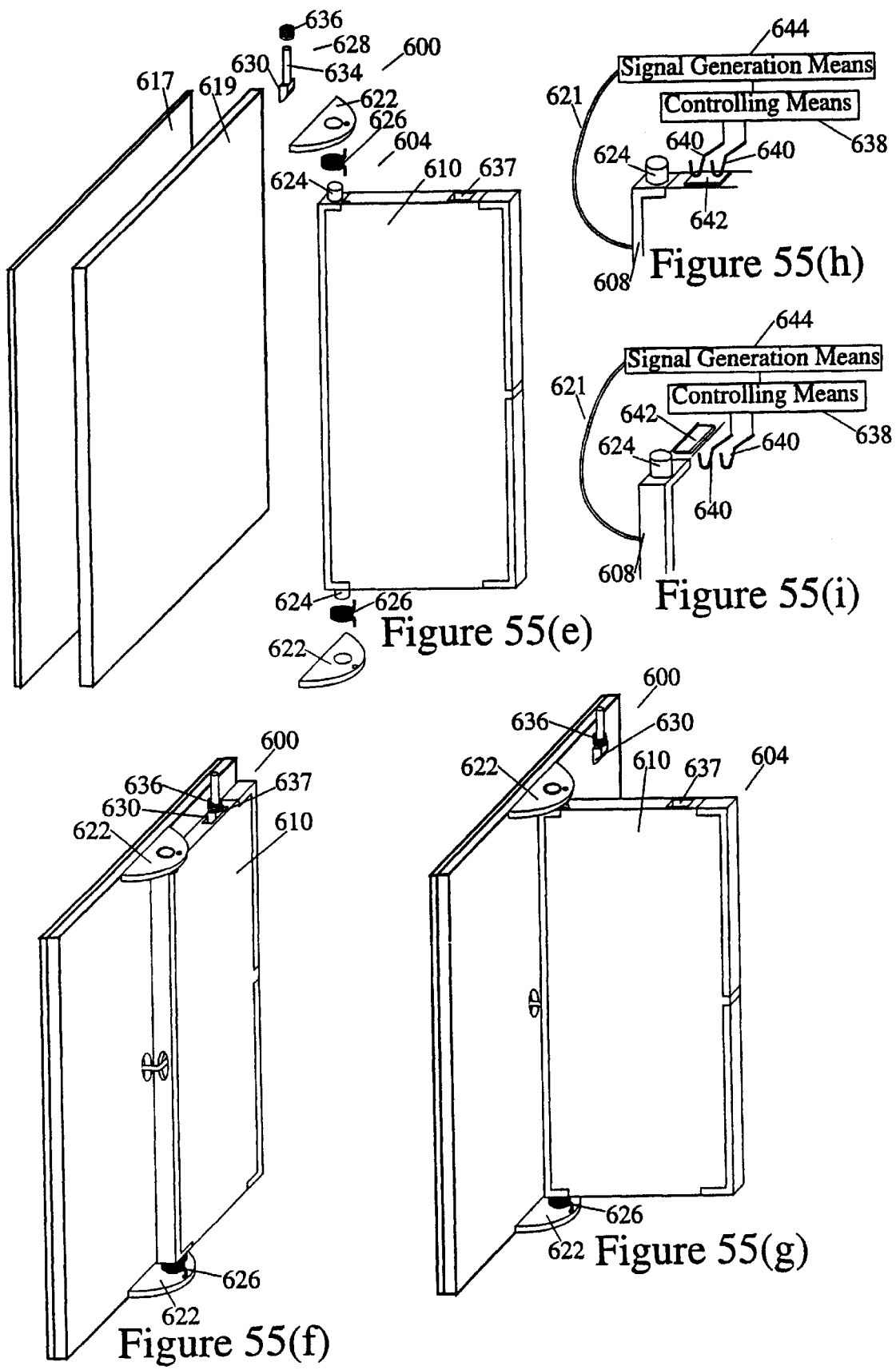

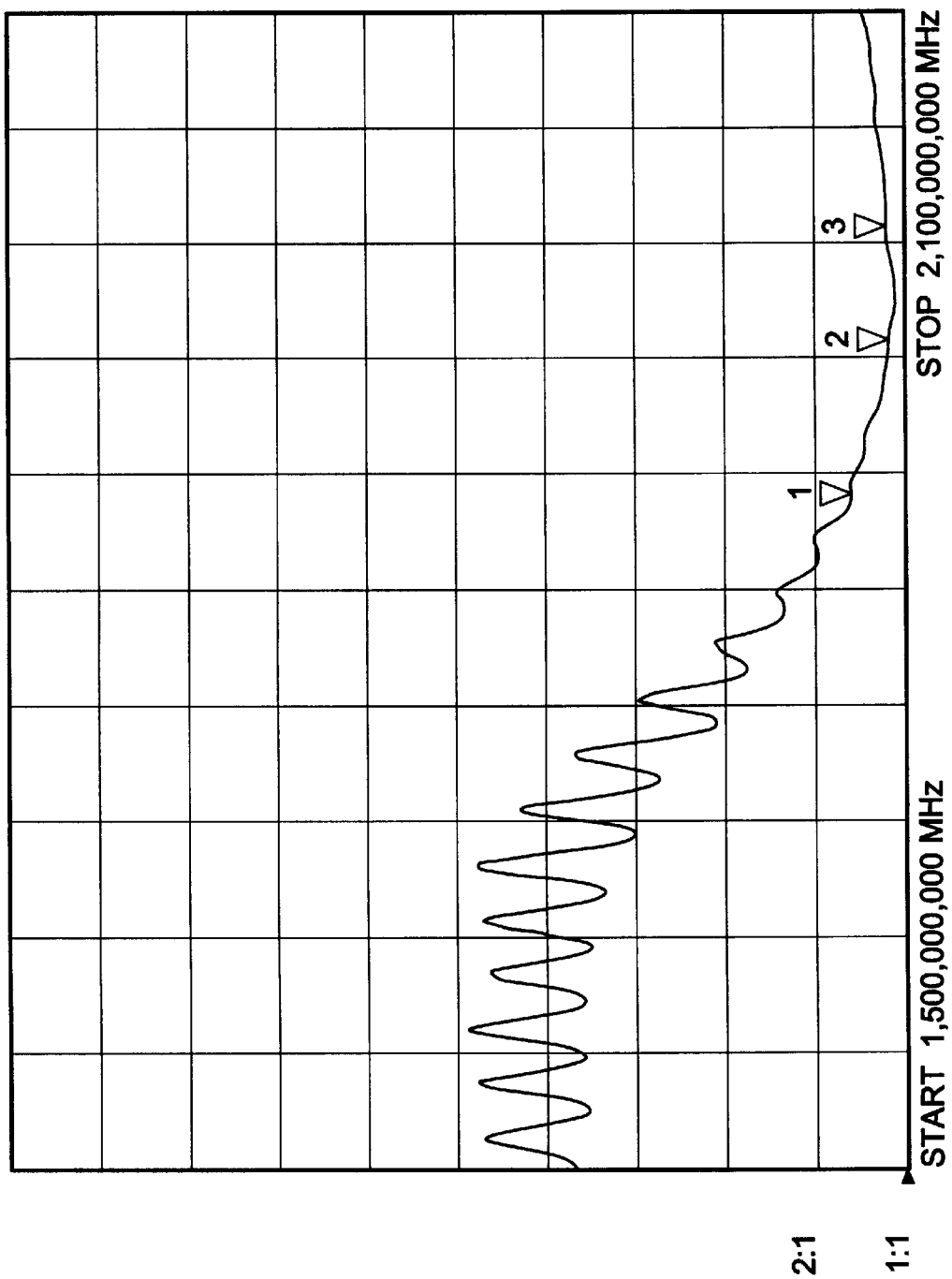
FIG. 57(b) MARKER 3  1.99 GHz

RADIATION SHIELDING AND RANGE EXTENDING ANTENNA ASSEMBLY

CROSS REFERENCE TO RELATED APPLICATIONS

The inventions disclosed herein relate to prior filed, co-owned U.S. applications Ser. No. 012,446, filed Feb. 1, 1993, now U.S. Pat. No. 5,335,366, issued Aug. 1, 1994, Ser. No. 033,569, filed Mar. 17, 1993, abandoned and refiled as Ser. No. 506,653, filed Jul. 25, 1995, Ser. No. 240,859, filed May 10, 1994, Ser. No. 283,526, filed Aug. 1, 1995, Ser. No. 404,435, filed Mar. 15, 1995, Ser. No. 480,905, filed Jun. 8, 1995; and PCT applications Ser. No. PCT/US94/01167 filed Feb. 1, 1994, Ser. No. PCT/US95/05866, filed May 10, 1995, and Ser. No. PCT/US95/09717, filed Aug. 1, 1995.

BACKGROUND OF THE INVENTION

1. Field of the Invention

The present invention relates to portable telephone and other personal communication apparatus and, more particularly, to a protective shield apparatus for absorbing microwave energy to protect a user of the portable telephone and personal communication apparatus from the electromagnetic microwave frequency radiation emanating from such apparatus and to extend the transmission range of such apparatus by redirecting the microwave radiation away from the user of the apparatus. The present invention further pertains to a hand-held radio telephone and antenna assembly for the same. More particularly, the present invention further pertains to a radio signal transmitting device having an antenna assembly effective for enhancing and extending the transmission range of a radiation signal emitted by the hand-held radio telephone, and effective for preventing potentially harmful radiation exposure of the user of the hand-held radio telephone. Further, the present invention pertains to an antenna assembly useful for radio frequency transmission and reception for a communication system, such as a PCS communication system or the like.

2. Description of the Prior Art

There have been a number of contemporary inquires regarding the safety of portable telephones and, more particularly, cellular telephones and wireless communication devices, with respect to the potential danger to the user from electromagnetic microwave radiation associated with the transmission of the signals from such apparatus. When using a hand-held cellular telephone, the user holds the phone with his hand and places the phone to his head so that his ear is in contact with the ear piece of the telephone, and his mouth is at a location close to the mouthpiece of the telephone. This positions the antenna, which usually extends from the top surface of the telephone and/or is disposed on the inside of the telephone case, is in close proximity with the biological tissue of the user's hand and head as it transmits electromagnetic radiation. It has been determined that the presence of the biological tissue alters the radiation pattern and reduces the antenna gain, and, that between 48 and 68% of the power delivered to the antenna of a hand-held cellular telephone is absorbed by the head and hand of the user (see, *EM Interaction of Handset Antennas and a Human in Personal Communications*, Proceedings of the IEEE, Vol. 83, No. 1, January 1995).

The power absorbed by the head and hand reduces the strength of the radiation signal emitted from the antenna for communication. In addition, by requiring the antenna to output a stronger signal, the power absorbed by the head and hand decreases the usable life of the battery of the cellular telephone.

Further, contemporary inquiries are investigating the possibilities that the radiation absorbed by the head and hand may cause cancer or create other health risks or hazards to the user in association with the use of such apparatus. Research is only now being done looking into the potential link between cellular telephone use and detrimental biological effects, such as brain tumors. However, epidemiological studies have suggested that a link exists between exposure to power frequency electric and magnetic fields and certain types of cancer, primarily leukemia and brain cancer (see, *Questions and Answers About Electric and Magnetic Fields Associated With the Use of Electric Power*, National Institute of Environmental Health Sciences, U.S. Department of Energy, November 1994). It is clear that consumers will demand protection from hand-held cellular phone radiation as more and more evidence is discovered linking cellular telephone use with potential health hazards.

In response to the anticipated consumer demand, and to provide protection against health risks, the apparatus of the present invention utilizes electromagnetic radiation absorbing materials disposed about the antenna of a portable wireless transmitting apparatus to shield or protect the user from the potentially harmful radiation emissions from the wireless communication apparatus. In addition, to provide enhanced cellular telephone communications, the present invention extends the transmission range of such apparatus by redirecting the microwave radiation away from the user of the apparatus.

Typically, the broadcast from the portable telephones and wireless communication apparatus emit electromagnetic radiation in the microwave frequency range. An example of a prior art radiation shielding apparatus for a radio transmitting device is disclosed in U.S. Pat. No. 5,335,366, issued to Daniels. The shield apparatus of the present invention is disposed primarily about the antenna and transmitting apparatus, both inside and outside of the portable telephone and wireless communication apparatus itself.

A conventional cellular telephone communicates over hard wire phone lines by transmitting electromagnetic radiation signals between the mobile cellular telephone and stationary, ground-based transmission/reception units known as "cells". These cells are typically connected with a hard-wired telephone network, usually through a direct mechanical link. Thus, a user of a cellular phone is not confined by the traditional limitations of being mechanically linked with the hard-wired telephone network. Rather, the user of a cellular phone has mobility due to the radio transmission of the electromagnetic wave signals between the cellular phone and the cells, and is able to communicate via the hard-wired telephone network as long as the cellular phone is within range of a transmission/reception cell site.

The transmission from the portable cellular telephone is traditionally accomplished through an antenna. In a typical hand-held radio telephone, radio frequency transmitting/receiving circuitry is disposed in the interior and a transmitting/receiving antenna is disposed on the outside and/or in the interior of a single compact unit. This type of cellular phone has steadily increased in popularity because of the convenience and mobility afforded by its compact structure. Traditionally, these cellular phones transmit at a cellular frequency range between 800 and 900 megahertz and at a power any where from less than one to six or more watts.

FIG. 32 shows a typical configuration for a hand-held cellular phone, commonly known as a "flip phone". This conventional cellular phone has a main phone body 1 having an ear piece 2 disposed thereon. A mouthpiece 3 is flipped downward in an open position so that when the hand-held cellular phone is appropriately positioned by a user, the ear piece 2 is adjacent to the user's ear, while the mouthpiece 3 is adjacent to the user's mouth. An antenna 4, which may be telescoping or fixed, is disposed externally on the phone body 1. The antenna 4, which may include an antenna disposed inside the telephone case, emits electromagnetic radiation to send communication signals from the hand-held cellular phone to a distant ground-based cell of a cellular network, and receives electromagnetic radiation carrying communication signals from the cell. Thus, the user is able to communicate through the cellular network to the hard wire telephone network, or other receivers via radio signals transmitted from the cell.

However, the antenna 4 of a conventional hand-held radio telephone emits a radiation signal that exposes the user to the health risks now being associated with exposure to electromagnetic radiation in the cellular frequency band. At the present time the exact cause or extent of the health risks are not known, but, it is apparent that there is great demand for a means to shield the users of hand-held cellular phones from unwanted, and possibly harmful, exposure to the radiation generated by the cellular phone. Recent tests have shown that radio waves in and around the cellular frequency band can damage the blood-brain barrier, which protects the brain from toxins. Furthermore, radio frequencies, including the European cellular frequency, have been shown to damage the calcium coating in cells that regulate the passage of hormonal "messages" between cells. Some scientists believe that the brain tissue absorbs some of the power of the electromagnetic radiation. The exact empirical health risks which can be directly linked to the cellular phone are still not known. However, it is apparent that the users and future purchasers of cellular phones are demanding a means to protect themselves as much as possible from exposure to the radiation generated by the cellular phone.

Antenna configurations include the familiar wandlike monopole, which extends from the top of the telephone, interior antennas, which are disposed within the telephone case, and flush mounted antennas, which are usually located on the sides, back or top of the telephone. Each of these antenna configurations suffers from the problems of power being absorbed by the head and hand of the user. In particular, the flush mounted antennas suffer from a higher degree of electromagnetic interaction, since the head and hand are typically disposed very close to the antenna during use of the telephone. Also, the hand holding the telephone tends to mask the flush mounted antenna, causing a detuning effect on the antenna resonant frequency and impedance. This detuning can reduce the communication range of the telephone (see, *EM Interaction of Handset Antennas and a Human in Personal Communications*, Proceedings of the IEEE, Vol. 83, No. 1, January 1995).

The currently used ground-based cell sites have a number of serious disadvantages. The user of a cellular phone must be within the transmission/reception range of a ground-based cell site for the cellular phone to function. The transmission/reception range between a cellular phone and a ground-based cell site is severely limited by the existence of mountains, buildings or other structures disposed between the ground-based cell site and the cellular phone. Therefore, in places where there are tall buildings, mountains or other obscuring structures it is necessary to maintain a large number ground-based cell sites. Also, there are many locations where it is not practical or possible to maintain a cell site, such as off-shore or sparsely populated locations. Thus, compared to the vast expanses of the Earth, there are currently very few places where a cellular telephone has any use.

To overcome the problems associated with ground-based cell sites, a new means of communication is on the technological horizon of the wireless communications industry. Satellites orbiting the Earth can be used as a means for communication between ground-based locations. The use of orbiting satellites as a communications link has a number of distinct advantages over the use of ground-based cell sites. For example, since the satellites are located high overhead, there is much less chance of a signal being obstructed by a land or building feature, allowing for clearer, more consistent communication. Also, a network of relatively few orbiting satellites can provide communication over the entire surface of the Earth. Thus, satellites can enable communication from remote locations, such as mid-ocean and mountain tops, where it is impractical or impossible to build and maintain cell sites. Also, an expensive to erect and to maintain infrastructure comprising numerous ground-based cell sites is not necessary, thereby allowing developing countries to have the advantages of a communications systems without requiring the investment in numerous expensive components. Conventionally, the use of satellites for communication has required expensive and awkward equipment, typically having a relative large antenna assembly for transmission and reception of a radiation signal. However, there are currently being developed satellite communication systems that will enable communication between small hand-held radio units. A technological problem to be addressed is the design of an antenna assembly that has the transmission range necessary for effective use of an orbiting satellite, while having low power consumption and compact size. The present invention has been devised to overcome the drawbacks of the conventional art and provides a hand-held radio telephone capable of preventing unwanted exposure of the user to radiation, and having and enhanced and extended transmission signal.

Personal communication services (PCS) have recently been introduced to provide communication coverage in locations where a cellular telephone system is impractical to be used. A PCS systems enables communication using a mobile unit in locations such as shopping malls, underground train platforms, office buildings and cities with tall buildings. A typical PCS system is comprised of a number of distributed array antennas that transmit and receive radio signals necessary for communication. However, the capacity of a typical PCS system can be over capacitated when more users wish to use the system then the radio frequency allocated for the system allows.

A conventional radio signal transmitting device, such as a cellular telephone of PCS telephone typically utilize a monopole antenna design. A monopole antenna provides an omni-directional radiation pattern, transmitting the radio signal more or less equally in all directions. However, the use of an antenna that produces an omni-directional antenna pattern has now been shown to have deleterious effects, due to the absorption of the radiation emitted by the antenna by the body, particularly, the head, of the user.

The radio signals transmitted between a radio signal transmitting device, such as a cellular telephone or PCS telephone, can be either digital or analog. Digital radio signals have advantages over analog, such as increased bandwidth capacity and the ability to scramble the digital signal making it a much more private vehicle for carrying data and voice communication. Because of the advantages of digital transmission, PCS operators are opting for its use in their newly developing systems. Further, many cellular telephone carriers are converting from analog to digital technology as well.

Recently, the use of a digital radio signal for the wireless transmission of data and voice has been shown to present serious problems, impacting on the practical use of the digital signal for communication purposes. For example, the digital radio signal transmitted by a radio signal transmitting device, such as a cellular or PCS telephone, is known to interfere with the use of a hearing aid by the hearing impaired. It may also be possible that the radio signal emitted by a radio signal transmitting device will interfere with other electronic devices located on or within the body of the user, such as pacemakers and the like.

There are growing concerns at the Federal Communications Commission and in Congress about the hearing aid interference issue. Members of the wireless telecommunications industry have pledged to develop solutions to the hearing aid interference problem so that the hearing impaired can enjoy the benefits of digital wireless technology (see, RCR, Volume 14, Number 20, Oct. 23, 1995). Thus, there is a recognized need, by both government and industry, to provide a means for preventing the radio signal emitted by a radio signal transmitting device from interfering with other devices. In particular, there is a recognized need to prevent interference with the operation of a hearing aid due to the transmission of a digital radio signal from a radio signal transmitting device.

SUMMARY OF THE INVENTION

The present invention is intended to provide a solution to the problems associated with the possibly harmful exposure to radiation during radio telephone use, and to provide a means for extending the signal range of a radiation signal emitted by the radio telephone. An object of the present invention is to provide a shield apparatus for shielding an antenna and related transmitting elements of portable telephones and other wireless communication apparatus. The shield apparatus includes portions which block by absorption the microwave radio frequency radiation which is directed toward the user of the apparatus, and allows the microwave radiation to be redirected and broadcast outwardly from the antenna in the directions away from the user, and thus extends the transmission range of the apparatus.

An object of the present invention is to provide new and useful radiation absorption and blocking apparatus. Another object of the present invention is to provide new and useful apparatus for portable telephones and wireless communication apparatus to block electromagnetic radio frequency radiation from reaching the user of such apparatus. Another object of the present invention is to provide new and useful portable telephone and wireless communication apparatus for directing microwave energy away from a user of the apparatus and thereby extend the transmission range of the apparatus. Another object of the present invention is to provide new and useful shield apparatus for the transmitting apparatus antenna of portable telephone and other wireless communication apparatus. Another object of the present invention is to provide new and useful hand-held communications apparatus which includes shielding for the user and which directs radiation away from the user and extends the transmission range of the apparatus by directing the radiation away from the user. Another object of the present invention is to provide universal shield apparatus for the antenna of a hand-held portable telephone and wireless communication apparatus. Another object of the present invention is to provide new and useful radiation blocking apparatus between hand-held portable telephone and other wireless communication apparatus and the user thereof.

Still another object of the present invention is to provide a hand-held cellular telephone that is effective for radio communication with a remote receiver, such as an orbiting satellite or a ground-based antenna receiver. Yet another object of the present invention is to provide an antenna assembly capable of preventing unwanted exposure of transmitted radiation from the inventive hand-held radio telephone, while allowing the transmission of a radiation signal to a remote receiver, such as an orbiting satellite. A further object of the present invention is to provide such a hand-held radio telephone and antenna assembly having range extension capabilities obtained due to an enhanced and directed transmission of the radiation signal. Yet another object of the present invention is to provide a hand-held radio telephone and antenna assembly having a transmitted signal angle adjustment mechanism for adjusting the angle at which the transmitted radiation signal is directed from the hand-held radio telephone.

Still another object of the present invention is to provide a means for preventing interference between a radio signal transmitted by a radio signal transmitting device and an electronic device on or within the body of a user. In particular, it is still another object of the present invention to provide a means for preventing the transmission of a digital radio signal by a hand-held radio signal transmitting device, such as a PCS or cellular telephone, from interfering with the use of a hearing aid, or other electronic device.

Other objects of the present invention include utilizing the inventive antenna assembly to overcome the drawbacks of a conventional PCS system, and to provide a retrofittable antenna assembly for use with a existing radio signal transmitting device. A further object of the invention is to reduce the size of the inventive antenna assembly through a novel construction and selection of materials.

In accordance with the present invention, a hand-held radio telephone is provided for communication via a remote receiver, such as a ground-based cell site or an orbiting satellite. An antenna assembly is fixed to the hand-held radio telephone. The antenna assembly includes a radiation absorber defining an open curved shape in cross section, so as to define an open transmission area. An antenna is disposed adjacent to the open transmission area so that during use of the hand-held radio telephone a first portion of a radiation signal emitted from the antenna is absorbed by the radiation absorber. A second portion of the radiation signal emitted from the antenna is transmitted through the open transmission area for reception by a remote receiver, such as a ground-based cell site or an orbiting satellite. To provide range enhancement of the transmitted signal from the inventive hand-held radio telephone, at least one parasitic radiation redirection element receives radiation emitted from the antenna, the redirection element may be a reflector or a director. The radiation received by the parasitic radiation redirection element is directed toward the open transmission area, so as to extend a transmission range of the antenna assembly, and thus extend the transmission range of the hand-held radio telephone.

Preferably, an antenna housing is integrally formed with the hand-held radio from the user. Furthermore, the radiation absorber is disposed, relative to the antenna, in a direction toward the user. Thus, the radiation signal emitted from the antenna that is not absorbed by the radiation absorber is transmitted through the open transmission area and in a direction of an orbiting satellite. By this construction, at least some of the radiation signal that is emitted from the antenna in directions toward the user is blocked by the radiation absorber from being transmitted to and absorbed by the user, and at least some of the radiation emitted from the antenna in directions toward the user is redirected and transmitted as an enhanced radiation signal. Thus, in accordance with the present invention, the inventive hand-held radio telephone has an antenna assembly capable of preventing unwanted exposure of the user to potentially harmful radiation, while providing an enhanced and extended transmission signal to enable improved communication.

Preferably, the antenna assembly has a longitudinal axis perpendicular to the cross section of the radiation absorber. The antenna assembly is mounted and fixed in the antenna housing so that the longitudinal axis of the antenna assembly is perpendicular to a longitudinal axis of the hand-held radio telephone. The antenna assembly is disposed during use so that radiation transmitted through the open transmission area is directed up and away from the user. This construction and orientation of the antenna assembly is particularly suited for communication with a satellite in low earth orbit. The transmission signal is directed upward in directions where a clear line-of-sight is more likely to be available between the open transmission area and the orbiting satellite, thus making it much less likely that a ground-based feature, such as a building or mountain will attenuate the transmitted signal. The radiation absorber comprises a conductive material, or blocking agent, dispersed in a non-conductive binder matrix. The conductive material is any suitable material such as a conductive free metal, $FeO_2$, titanium oxide, ferromagnetic material include carbonyl iron or ferrite oxide mixed with other oxides or ferrite or garnet, and materials such as magnesium nickel, lithium, yttrium, and/or calcium vanadium. Preferably, the particle sizes of the blocking agents range from typically about four microns to about 20 microns. Various types of matrix binders may be used with the blocking agents. For example, silicone, epoxy, neoprene, ceramic or polyvinyl chloride are all satisfactory binder materials for the blocking agents.

The antenna assembly may include a support structure fixed to the radiation absorber. The radiation absorber preferably has a semicircular cross section having an arc length of at least 180 degrees to adequately prevent harmful exposure of the user to radiation emitted from the antenna. Also, a radiation blocking layer may be disposed between the antenna and the user to provide further security against unwanted exposure of the user to radiation emitted from the antenna. By this construction, a radio telephone is provided having an antenna assembly capable of preventing potentially dangerous exposure to radiation, while enabling an enhanced and extended transmission signal.

In accordance with another aspect of the present invention, an antenna assembly is provided for use with a radio signal transmitting device. The antenna assembly includes an antenna for transmitting a radio signal from the radio signal transmitting device. The radio signal is transmitted at a transmission side of the antenna assembly. The radio signal is blocked from transmission through a shielding side of the antenna assembly. A radiation absorber member is disposed at the shielding side and is disposed during use between the antenna and the user of the radio transmitting device. A first parasitic element is disposed during use between the antenna and the user. A second parasitic element is disposed at the transmission side and disposed during use so that the antenna is between the second parasitic element and the user. The first and second parasitic elements are disposed from the antenna at a gap distance effective to direct a portion of the radio signal toward the transmission side. A metal shell member is disposed at the shielding side, and disposed during use between the radiation absorber member and the user. The portion of the radio signal transmitted from the antenna is blocked at the shielding side to prevent exposure of the user to the radio signal. The radio signal is transmitted at the transmitting side for effective communication with a remote receiver. It is an object of the invention to protect users of radio equipment from electromagnetic radiation emitted from antenna assembly which is located in close proximity to the body of the user and especially in close proximity to the head of the user. Another object of the invention is to provide an antenna assembly that is effective for redirecting a radio signal that conventionally is absorbed by the body of the user in a direction away from the user, to thereby increase range performance of the radio system. The inventive antenna assembly can be used for hand-held communication devices, such as cellular telephones, or any other radio communication system.

In accordance with another aspect of the invention, an antenna assembly for transmitting a radio signal from a radio signal transmitting device includes an antenna unit comprised of a dipole driven antenna member for transmitting a radio signal from the radio signal transmitting device. A radiation reflector reflects the radio signal transmitted by the driven antenna member, and a support member supports the driven antenna member and the radiation reflector so that a predetermined gap is precisely maintained between the driven antenna member and the radiation reflector. A shielding member shields a portion of the radio signal transmitted by the driven antenna member in a direction toward the shielding member. The antenna unit is pivotally mounted so that it is disposable at selectable positions relative to the shielding member.

The transmission of the radio signal transmitted by the driven antenna member can be controlled depending on a position of the antenna unit. For example, the transmission of the radio signal transmitted by the driven antenna member can be controlled so that a radio signal is only emitted from the driven antenna member when the antenna unit is in the open or deployed position. The dipole driven antenna member comprises a first and a second segment made from a metal foil. To reduce the overall length of the antenna, each segment has an unfolded portion and a folded portion. The radiation reflector is a metal wire, also having an unfolded portion and folded portions. This construction makes the inventive antenna assembly compact, while being effective both as a transmitting and receiving unit.

The various constructions of the inventive antenna assembly described herein provide a means for preventing a radio signal transmitted by a radio signal transmitting device from interfering with an electronic device on or within the body of the user of the radio signal transmitting device. In accordance with the present invention, interference with such an electronic device, such as a hearing aid, pacemaker, or the like, is prevented by shielding and/or directing away that portion of the radio signal that would conventionally be transmitted toward the user. Thus, the inventive antenna assembly prevents unwanted and potentially harmful exposure to radiation, and prevents interference with an electronic device, such as a hearing aid, by the transmitted radio signal. Further, the inventive antenna assembly obtains a significant increase in the forward gain of the transmitted radio signal, making the radio signal transmitting device more effective for communication.

BRIEF DESCRIPTION OF THE DRAWINGS

FIG. 1 is a perspective view of the apparatus of the present invention in its use environment;

FIG. 2 is a view in partial section taken generally along line 2—2 of FIG. 1;

FIG. 3 is a perspective view of an alternate embodiment of the apparatus of FIGS. 1 and 2;

FIG. 4 is a view in partial section taken generally along line 4—4 of FIG. 3;

FIG. 5 is a side view in partial section of an alternate embodiment of the present invention;

FIG. 6 is a side view in partial section illustrating the functioning of the antenna apparatus associated with the present invention;

FIG. 7 is a perspective view of an element which comprises an alternate embodiment of the apparatus of the present invention;

FIG. 8 is a perspective view, partially broken away, sequentially illustrating the operation of an alternate embodiment of the apparatus of the present invention with the element of FIG. 7;

FIG. 9 is a sequential view illustrating the operation of the elements illustrated in FIGS. 7 and 8;

FIG. 10 is a top plan view of an alternate embodiment of the radiation shield and microwave redirection and range extension apparatus of the present invention;

FIG. 11 is a block diagram illustrating the fabrication of the apparatus of the present invention;

FIG. 31(a) is a schematic view of an embodiment of the inventive hand-held radio telephone having the inventive antenna assembly and mounting means shown in FIG. 29(a) transmitting to an orbiting satellite;

FIG. 31(b) is a schematic view of the embodiment of the inventive hand-held radio telephone shown in FIG. 31(a) having the inventive antenna assembly and mounting means shown in FIG. 29(a) transmitting to a ground-based cell site antenna;

FIG. 33(a) is a cross-sectional view of an embodiment of an antenna assembly in accordance with another aspect of the present invention;

FIG. 33(b) is a cut-away cross-sectional view of the antenna assembly along line 33(b)—33(b) shown in FIG. 33(a);

FIG. 34(a) is a cross-sectional view of another embodiment of the antenna assembly in accordance with the present invention;

FIG. 34(b) is a cut-away cross-sectional view of the antenna assembly along line 34(b)—34(b) shown in FIG. 34(a);

FIG. 35(a) is a cross-sectional view of another embodiment of the antenna assembly in accordance with the present invention;

FIG. 35(b) is a cut-away cross-sectional view of the antenna assembly along line 35(b)—35(b) shown in FIG. 35(a);

FIG. 39(a) is a perspective view of another embodiment of an antenna assembly comprising one half of an inventive dual antenna assembly;

FIG. 39(b) is an exploded view of the antenna assembly shown in FIG. 39(a);

FIG. 40(a) is a partial exploded view the antenna assembly shown in FIG. 39(a) having radiation absorbing end caps and metal end caps;

FIG. 40(b) is a partial exploded view of the antenna assembly shown in FIG. 40(a) prior to installation in an assembly housing;

FIG. 40(c) is a perspective view of an assembled antenna assembly and assembly housing;

FIG. 42(a) is a perspective view of the radio transmitting device shown in FIG. 41(b) having installed on it the battery pack shown in FIG. 41(a) and having the inventive dual antenna assembly disposed in a closed position;

FIG. 42(b) is a perspective view of the radio transmitting device shown in FIG. 42(a) having the inventive dual antenna assembly disposed in an open, in-use position;

FIG. 52(a) is an isolated back perspective view of a configuration of an antenna unit of an inventive antenna assembly;

FIG. 52(b) is an isolated front perspective view of the antenna unit shown in FIG. 52(a);

FIG. 52(c) is an isolated back perspective view of another configuration of an antenna unit of the inventive antenna assembly;

FIG. 52(d) is an isolated front perspective view of the antenna unit shown in FIG. 52(c);

FIG. 53(a) is a perspective view of a configuration of the antenna assembly having a flat shielding member;

FIG. 53(b) is a perspective view of a configuration of the antenna assembly having a curved shielding member;

FIG. 55(a) is a front plan view of the inventive antenna assembly shown in FIG. 54(a), having the antenna unit in a deployed position;

FIG. 55(b) is a front plan view of the inventive antenna assembly shown in FIG. 54(b), having the antenna unit in a stowed position;

FIG. 55(c) is a partially cross sectional, side plan view of the inventive antenna assembly shown in FIG. 54(a);

FIG. 55(d) is a partially cross sectional, top plan view of the inventive antenna assembly shown in FIG. 54(a);

FIG. 55(e) is an exploded perspective view of a configuration of the inventive antenna assembly shown in FIG. 54(a), having a spring loaded antenna unit;

FIG. 55(f) is an assembled perspective view of the inventive antenna assembly shown in FIG. 55(e), in the stand-by, stowed position;

FIG. 55(g) is an assembled perspective view of the inventive antenna assembly shown in FIG. 55(e), in the in-use, deployed position;

FIG. 55(h) is an isolated enlarged view of electrical contacts and a block view of circuit components of controlling means for controlling a radio signal transmitted by the antenna assembly;

FIG. 55(i) is an isolated enlarged view of electrical contacts and a block view of circuit components of controlling means for controlling a radio signal transmitted by the antenna assembly;

FIG. 56(f) is an isolated perspective view of a configuration of the inventive antenna assembly having a hollow frame support member;

FIG. 57(b) is a graphical representation of test results showing the VSWR obtained using a construction of the inventive antenna assembly configured for a PCS telephone;

DETAILED DESCRIPTION OF THE INVENTION

Figure 12:
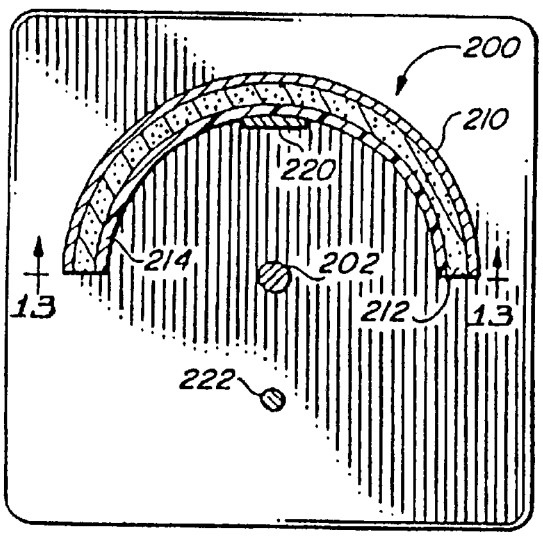
FIG. 12 is a top view of an alternate embodiment of the radiation shield and microwave redirection and range extension apparatus of the present invention.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

For purposes of illustrating the present invention, a portable telephone or wireless personal communication apparatus 10, and only a few portions of such apparatus are identified in the drawing and will be discussed. The same basic portable telephone or wireless personal communication apparatus 10 is shown with different antenna configurations and with different protective shield and microwave redirection and range extension embodiments in the drawing figures.

The telephone or personal communication apparatus 10 is shown as including a case 12 having a top 14. Two sides of the telephone or personal communication apparatus case 12 are shown, as a side 16 in FIG. 1 and a side 18 is FIGS. 3 and 8.

The telephone or personal communication apparatus 10 includes a front which has a key pad 30 in the upper portion of the apparatus and a speaker 32 in the upper portion. The telephone or personal communication apparatus 10 also includes a back 26, shown in FIG. 3.

FIG. 1 is a perspective view of the telephone or personal communication apparatus 10. The apparatus 10 is a hand-held, wireless telephone or personal communication apparatus, which may typically be a cellular telephone or other type of hand-held and/or cordless telephone or wireless personal communication apparatus. An antenna 40 extends upwardly from the top 14.

In FIGS. 1–6, the antenna 40 is shown as a telescoping antenna, such as typically used in portable telephones or wireless personal communication apparatus. Alternatively, the antenna may also be a fixed length antenna, such as typically used in cellular telephones, as shown in FIGS. 8 and 9.

With the same basic portable telephone or personal communication apparatus 10, and the same basic antenna 40, several different embodiments of shield apparatus are shown.

FIG. 2 is a top view of the telephone apparatus 10 of FIG. 1 taken generally along line 2—2 of FIG. 1. FIG. 2 shows the top 14 of the telephone or personal communication apparatus 10, with the antenna 40 disposed in a shield and microwave redirection and range extension apparatus 70. The shield apparatus 70 is shown in both FIGS. 1 and 2.

The shield and microwave redirection and range extension apparatus 70 is a generally cylindrical element, with the cylindrical element having two portions, an open portion 72 and an absorbing and microwave redirection portion 74. That is, there is a portion of the cylindrical shield 70 which is open to electromagnetic microwave radio frequency radiation. The portion 72 is the open portion in that microwave radio frequency radiation will pass through the portion 72 without any blocking or absorbing of the radiation.

However, the portion 74 is the absorbing and microwave radiation redirection portion and will absorb, block and redirect the radiation to shield the user of the telephone or wireless personal communication apparatus 10 from the potentially harmful effects of the microwave radio frequency radiation emanating from the antenna. In addition, the portion 74 extends the transmission range of the apparatus 10 by redirecting the microwave radiation away from the user.

It will be noted that the shield and microwave redirection apparatus 70 is of a limited or finite height. The antenna 40 is shown contained within the shield and microwave redirection apparatus 70. The height of the shield and microwave redirection apparatus 70 is typically set to protect the head of the user of the apparatus 10 while the telephone or wireless personal communication apparatus 10 is in use, and to extend the microwave radiation and transmission range of the apparatus.

An alternate embodiment of the shield and microwave radiation apparatus 70 of FIGS. 1 and 2 is shown in FIGS. 3 and 4. The shield apparatus of FIGS. 4 and 5 comprises a shield and microwave redirection apparatus 80 secured to and extending upwardly from, the top 14 of the telephone or wireless personal communication apparatus 10.

Shield and microwave redirection apparatus 80 shown in FIGS. 3 and 4 comprises only a segmental blocking shield and microwave redirection apparatus 82 disposed between the user of the apparatus, whose head will be adjacent to the speaker portion 32 during use, and the antenna 40. With the shield 82 being only a segmental portion, the antenna is free from any type of obstruction on the opposite side of the shield apparatus 80, or remote from the user of the apparatus.

FIGS. 5 and 6 illustrate sequential views of the antenna 40 in use with another alternate shield and microwave redirection apparatus embodiment 84. In FIG. 5, the telephone or wireless personal communication apparatus 10 is shown with an antenna well 60 which extends downwardly from the top 14 of the case 12. In the art, it is well known and understood that an antenna, such as the antenna 40, may be made of a segment or of concentric segments which may be retracted into a well within the telephone or personal communication apparatus. The antenna is extended, and the segment and/or segments extend upwardly and outwardly as they are pulled out by the user of the telephone or personal communication apparatus.

In FIG. 5, the well 60 is shown with the antenna 40 in its down or collapsed or telescoping orientation within the well. In FIG. 6, the antenna 40 is shown extending outwardly from the case 12 and outwardly from the antenna well 60. It will be noted that the electrical connections, well known and understood in the art, have been omitted from both FIGS. 5 and 6.

The shield and microwave redirection apparatus 84 is shown in FIG. 5 extending downwardly into the well 60 and accordingly surrounding the bottom of the antenna 40. The antenna 40, as shown, includes four telescoping segments, an outer bottom segment 42, a first inner segment 44, a second inner segment 46, and a third and innermost segment 48. A button 50 is secured to the top of the innermost segment 48.

With the antenna 40 in its down or nesting orientation, as illustrated in FIG. 5, the shield apparatus 84 is disposed almost entirely within the well 60 and about the antenna. With the extension of the antenna 40, as shown in FIG. 6, the shield and microwave redirection apparatus 84 is moved upwardly with the antenna segments as the antenna is raised. The shield and microwave redirection apparatus 84 is disposed about the lower portions of the antenna, namely the segments 42 and 44 and accordingly protects the user from the radiation and redirects the microwave radiation away form the user.

The shield 84 includes two portions, a blocking or shield and microwave redirection portion 86, which is directed toward the user of the telephone apparatus 10, and an open portion 88, which is directed away from the user and through which radio frequency radiation passes without absorption. The blocking or shield and microwave redirection portion 86 absorbs and redirects the microwave radiation away from the user of the apparatus 10.

FIGS. 7, 8 and 9, illustrate another embodiment of the shield and microwave redirection apparatus of the present invention. FIG. 7 is a perspective view of a washer 100 which is disposed about the bottom of an antenna 140 and on the top surface 14 of the telephone or personal communication case 12. The washer 100 is used to secure a fixed shield and microwave redirection sheath 90 to the antenna 140. It will be noted that, with the shield apparatus 90 and its washer 100, the antenna 140 must be raised to its up position and must remain there within the shield and microwave redirection sheath 90. If the telephone or wireless personal communication apparatus is a cellular phone with a fixed antenna, then there is no problem of inconvenience due to the inability to retract the antenna. Essentially, the alternate embodiment 90 comprises a universal blocking and microwave redirection element which may be fitted to a number of different portable or cellular telephones or personal communication apparatus. Typically, the shield apparatus 90 will be fitted to a cellular telephone or wireless personal communications apparatus having a fixed antenna.

The alternate embodiment 90 includes a shield and microwave redirection sheath 92 which is generally of a cylindrical configuration. There is an inner bore 94 within the sheath 92. The sheath 92 and the bore 94 are closed by a top 96. At the bottom of the sheath 92 is a tapered portion 98, best shown in FIG. 9. The tapered portion 98 is disposed against, and appropriately secured to, the washer 100.

FIG. 7 is a perspective view of the washer 100. FIG. 8 is a perspective view of the portable telephone or wireless personal communication apparatus 10, with the washer 100 disposed about the bottom of the antenna 140, and the antenna 140 is shown raised to its highest or uppermost open position. FIG. 9 is a side view in partial section showing the washer 100 secured to the top 14 of the telephone or wireless personal communication apparatus 10, and the sheath 92 is shown secured to the washer 100.

Note that the antenna 140 is a fixed length antenna, and not telescoping. The washer 100, perhaps best shown in FIG. 7, includes a lower cylindrical portion 102 with an upper tapering portion 104. The tapering portion 104 extends from the lower cylindrical portion 102 to a top 106. A bore 108 extends through the washer 100 from the top 106 to the bottom of the washer. A radially extending slot 110 extends through the washer, including through both the lower bottom cylindrical portion 12 and the upper tapering portion 104.

For securing the washer 100 to the top 14, and about the lower portion of the antenna 140, the washer 40 is opened at the slit 110 and the washer is then fitted about the lower portion 42 of the antenna 40. The bottom of the washer 100 is placed on the top 14, and may be adhesively secured thereto.

The sheath 92 is placed over the antenna. The bottom tapering portion 98 of the sheath 92 is disposed against the tapering wall or portion 104 of the washer 100. The tapering portion 98 at the bottom of the sheath 92 matches the taper 104 of the washer 100. If desired, the sheath 92 may be adhesively secured to the washer 100. The shield and microwave redirection apparatus 90 accordingly becomes a relatively permanent part of the telephone or wireless personal communication apparatus 10.

The shield and microwave redirection apparatus 90 includes a blocking and microwave redirection portion and an open portion, such as discussed above. The blocking and radiation redirection portion is disposed adjacent to, or in the direction of, the speaker portion 32 of the telephone or personal communication apparatus 10, and accordingly in the direction or towards the user of the telephone or personal communication apparatus. The "open" portion is directed away from the user.

The washer 100 may preferably also include two portions, again a blocking and microwave redirecting portion which is oriented towards the user and an unblocked or open portion which is directed away from the user to allow the transmitted electromagnetic radiation from the antenna 140 to radiate or flow outwardly therefrom.

Returning again to FIGS. 2, 3 and 4, the blocking and radiation redirection portions of the shields discussed above are shown as comprising an arcuate extent of about 180 degrees. It may very well be that a lesser arcuate extent will be just as effective in blocking the potentially harmful radiation from the antenna 40 (and also from the antenna 140), and from associated portions of the telephone or wireless personal communication apparatus 10. For example, it may be that an arcuate length of only about 120 degrees, or even perhaps less, is necessary. On the other hand, it may be that a full 180 degrees, or more, is necessary for effective radiation protection.

Referring again to FIG. 5, the shield and microwave redirection portion 84 is shown extending down into the antenna well 60. If desired, the shield, or particularly the absorption, blocking and microwave radiation redirection portion thereof, may permanently extend down into the well about the antenna and may also be disposed between the user of the telephone or wireless personal communication apparatus and any other portions within the case 12 which may discharge electromagnetic radiation.

Similarly, radiation blocking or absorbing portions may also be disposed about the case 12 where a user typically holds on to the hand set, or wireless personal communication apparatus, if desired. In such case, the blocking and/or absorption materials would provide a shield for the hand of the user as the user holds the telephone or personal communication apparatus.

FIG. 10 is a top view of an alternate embodiment of the washer apparatus 100. FIG. 10 comprises a top view of washer apparatus 120 which is a generally universal type washer.

Since the diameter of an antenna varies from one telephone or personal communication apparatus to another, the washer apparatus 100 has been configured to fit a wide range of telephone or personal communication apparatus antennae. The washer apparatus 120 includes a cylindrical portion 122, which is substantially identical to the cylindrical portion 102. From the cylindrical portion, there is an upwardly extending tapering portion 124 which extends upwardly to the top of the washer. There are three concentric rings, including an outer concentric ring 126, a middle concentric ring 128, and an inner concentric ring 130. The inner concentric ring 130 includes an inner bore 132. A slot 134 extends through the washer 120, including through the lower cylindrical portion 122, the tapered portion 124, and through all three of the concentric rings 126, 128 and 130, from the inner bore 132 radially outwardly.

The concentric rings 126, 128 and 130 are scored at their outer peripheries to allow them to be removed, as desired, to provide an inner diameter for the washer apparatus 120 which will fit reasonably snugly against the outer diameters of antennae of various sizes.

The bore 132 of the inner ring 130 is configured to fit the smallest antenna, while the removal of all three of the concentric rings will leave a bore which is substantially the same as the outer diameter of the largest of the known antennae. Thus, the washer 120 may be sold with the sheath 92 to fit virtually all antennae in use with various types of hand-held telephones or personal communication apparatus.

FIG. 11 comprises a block diagram illustrating the fabrication of the absorption, blocking, and microwave redirection shields discussed above. Essentially, the shields are made of a binder or base carrier product that blocking agents will be mixed with. There are different types of blocking agents which form radiation or wave absorption materials. Relatively popular, ferromagnetic material include carbonyl iron or ferrite oxide mixed with other oxides or ferrite or garnet, and materials such as magnesium nickel, lithium, yttrium, and/or calcium vanadium. The particle sizes of the blocking agents range from typically about four microns to about 20 microns. The particle size and ferrite content of the mixture depends generally on the frequency of the radiation to be blocked.

Various types of binders may be used with the blocking agents. For example, silicone, epoxy, neoprene, or polyvinyl chloride are all satisfactory binder materials for the blocking agents.

Sequentially, the frequency range of the radiation to be blocked is first determined. After the frequency range is determined, the desired absorption and blocking agent and/or agents and a particle size and/or sizes for the absorption and blocking agent is selected. The absorption and blocking agent is then mixed with the appropriate binder.

If a full 360 degree shield is used, such as shown in FIGS. 1, 2, 5, 6, 8 and 9, then the sheath will be made in two parts, a part which includes the absorption and blocking material and a part that is free of the absorption and blocking material, but only includes the binder. The two portions will then be appropriately joined together to define a full 360 degree sheath. When only a segmental shield is to be used, such as shown in FIGS. 4 and 5, then the extra, blocking free binder portion need not be made.

Figure 13:
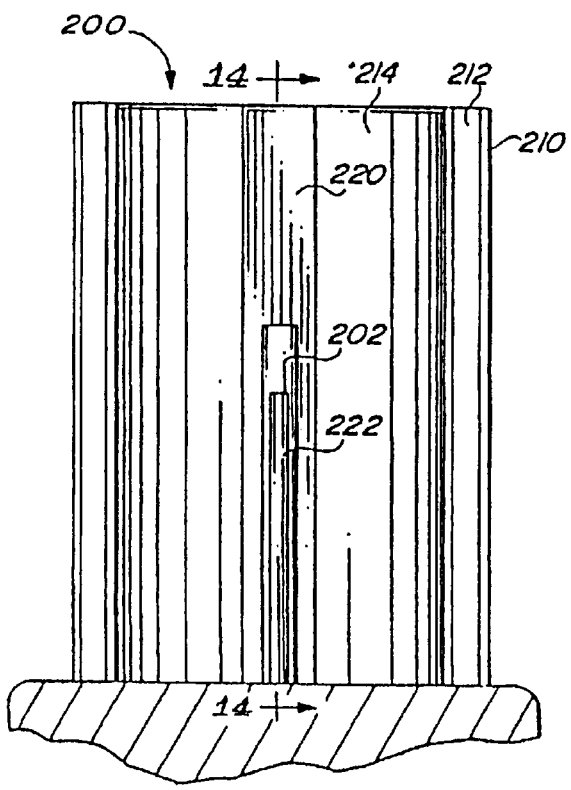
FIG. 13 is a side view of the apparatus of FIG. 12.
Figure 14:
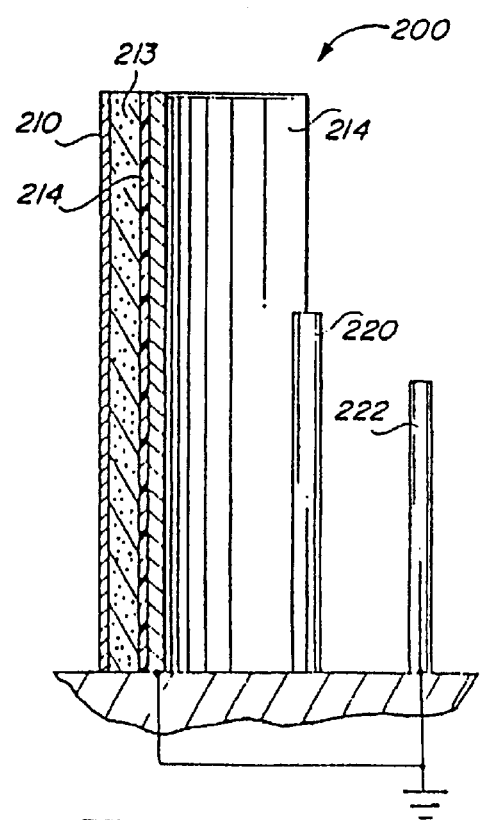
FIG. 14 is a view in partial section taken generally along line 14—14 of FIG. 13.
Figure 15:
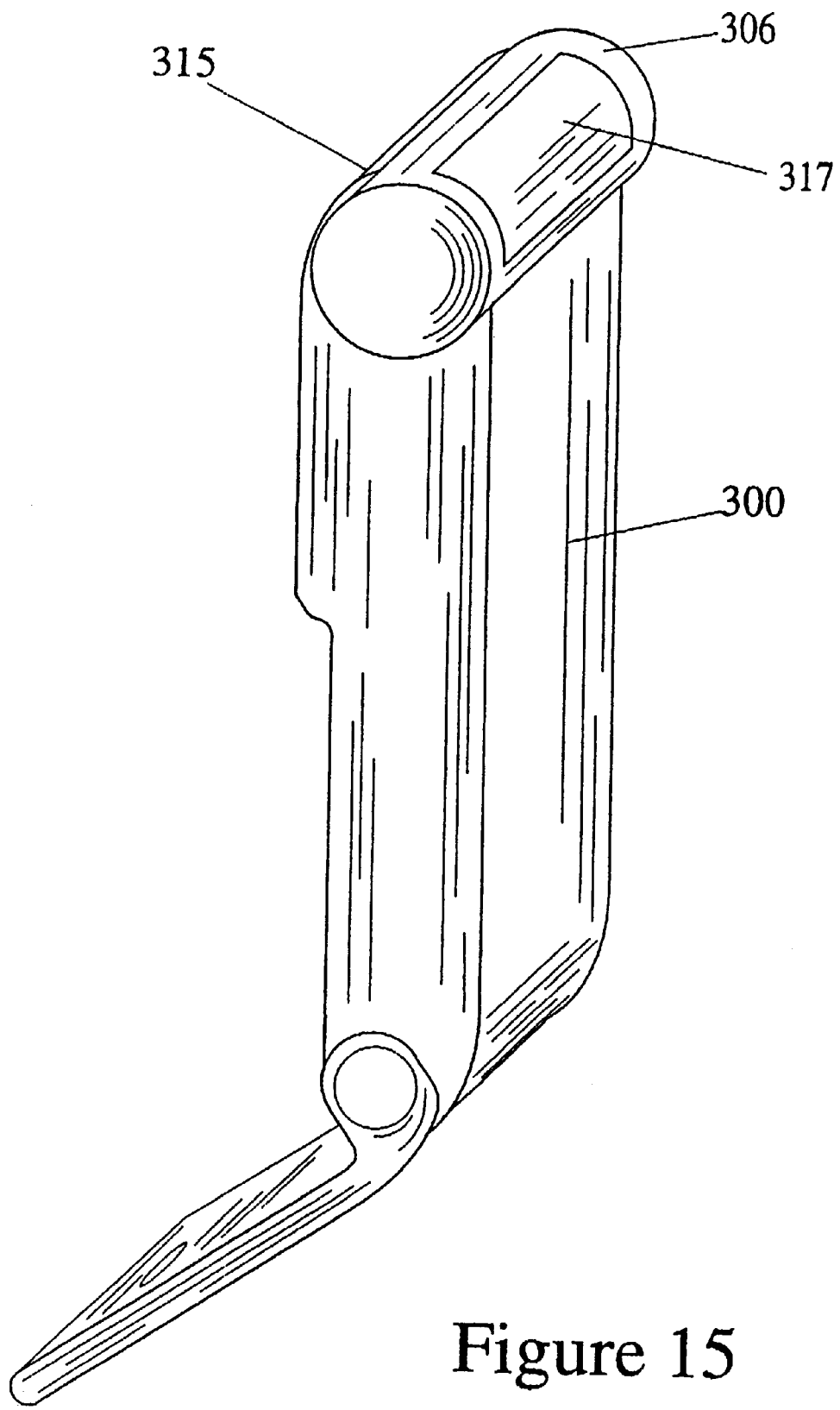
FIG. 15 is a perspective view of a hand-held radio telephone in accordance with the present invention.

FIG. 12 comprises a top view schematically illustrating an alternate embodiment of the shield apparatus of the present invention, comprising shield apparatus 200. FIG. 13 is essentially a front of the apparatus 200, taken generally along line 13—13 of FIG. 12. FIG. 14 is a side view in partial section of the shield apparatus 200, taken generally along line 14—14 of FIG. 13.

For the following discussion, reference will be made to FIGS. 12, 13 and 14.

The shield apparatus 200 is illustrated as a semicircular elongated element disposed about an antenna 202 for an arcuate distance of about 180 degrees. The antenna 202 is disposed at about the diameter of a circle of which the shield apparatus 200 comprises a semicircular portion. The shield apparatus 200 includes, with respect to the semicircular portion, three elements, an outer metallic shield 210, a ferromagnetic or non-microwave ferrite material layer 212 disposed against the outer shield layer 210, and an inner lining layer 214. The purpose of the inner lining layer 214 is merely to hold the ferrite material layer 212 in place against the outer shield 210.

One or two metallic parasite and microwave redirection elements, including a plate 220 which comprises an inner element, and an outer element 222, may each be employed separately or together and are shown aligned with the antenna 202. The elements 220 and/or 222 help to redirect the electromagnetic radiation emitted by the antenna 202 away from the user of the apparatus 200 and thus to extend the transmission range of the communications apparatus with which the shield 200 is being used.

When the outer element 222 is used, a line extending from the outer element 222, through the center of the antenna 202, bisects the plate 220, and also bisects the shield layers 210 and 212.

The inner parasitic element 220 comprises a flat plate appropriately secured to the inner lining 214. As best shown in FIGS. 13 and 14, the overall height of the inner parasitic element 220 is substantially the same as the outer shield 210 and the magnetic material layer 212.

The height of the antenna 202 is substantially less than the height of the parasitic element 220 and the shield layers 210 and 212. When used, the height of the outer parasitic element 222 is somewhat less than the height of the antenna 202. The relative heights may be understood from FIGS. 13 and 14.

As illustrated in FIG. 14, when employed together, the parasitic elements 220 and 222 are appropriately electrically connected together and extend to a circuit ground.

Figure 16:
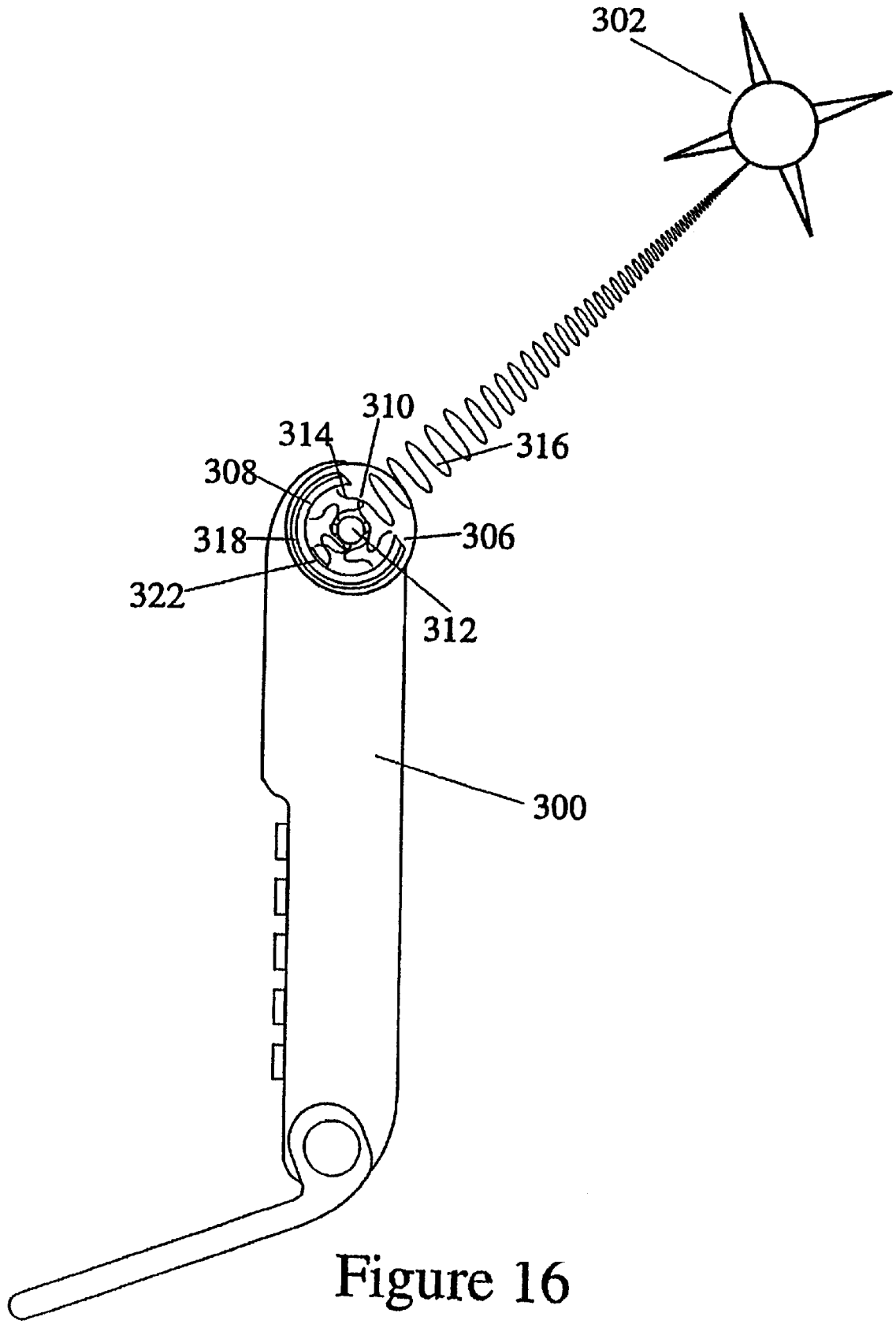
FIG. 16 is a schematic view of the inventive hand-held radio telephone transmitting to an orbiting satellite.

Referring now to FIGS. 15–28, an embodiment of an inventive hand-held radio telephone 300 having radiation shielding and signal range enhancement features is shown. This embodiment of the inventive hand-held radio telephone 300 is configured for radio communication through a remote receiver, and is particularly suited for communication via an orbiting satellite 302 (shown in FIG. 16) positioned in Earth orbit. With this form of radio communication, a radiation signal is emitted from the antenna 312 of the hand-held radio telephone 300 and the signal is transmitted to an orbiting satellite 302, where it is bounced or re-transmitted to an earthbound receiving station, usually at a remote distance from the hand-held radio telephone position. The signal is then sent from the earthbound station to a hardwire communications network, such as conventional telephone lines, or via radio signals to another receiver.

Figure 32:
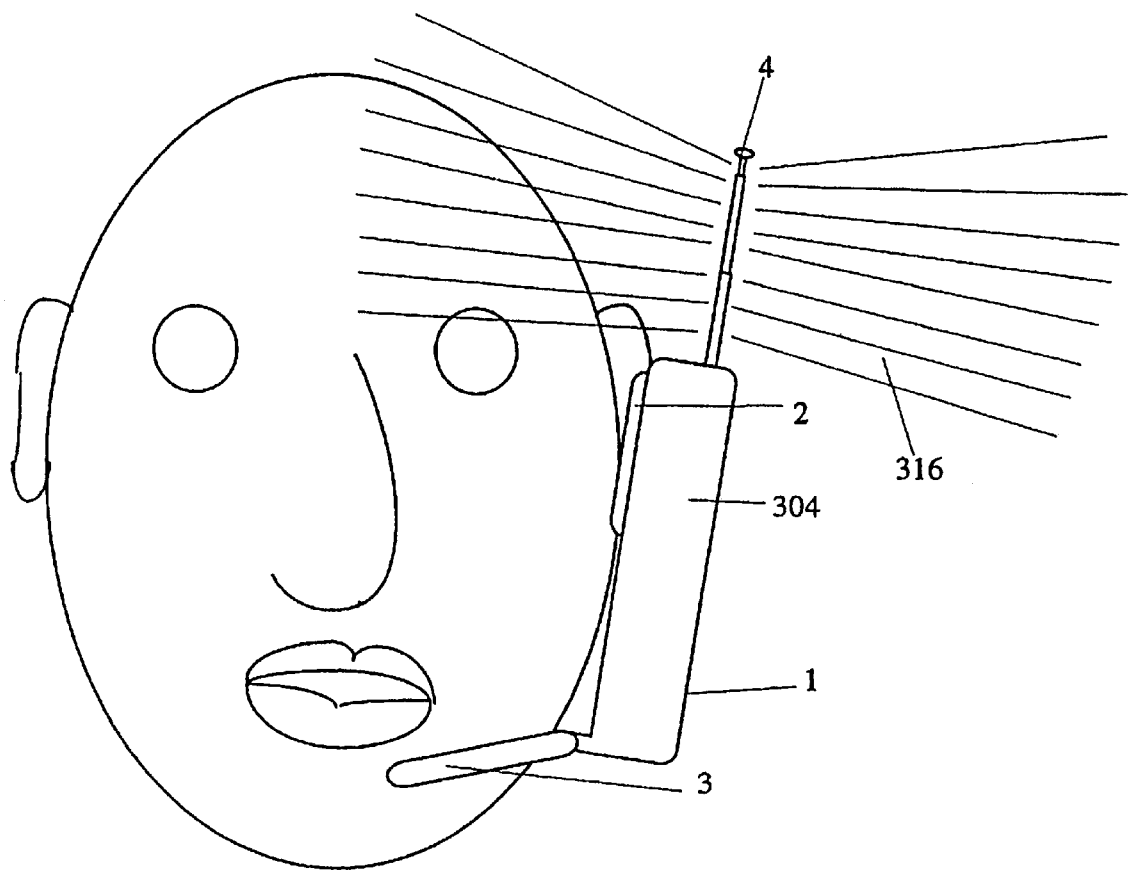
FIG. 32 shows a prior art conventional cellular telephone in use.

As shown in FIG. 32, a conventional cellular telephone 1, utilizing a conventional antenna configuration, transmits a radiation signal in directions which include the directions toward the head and body of the user. The transmitted radiation signal received by the head of the user has been shown to have detrimental effects and possibly cause tumors and other abnormalities in the head and body tissue of the user. Accordingly, the present inventive telephone has been devised having radiation shielding capabilities, and having signal range extension features.

Figure 17:
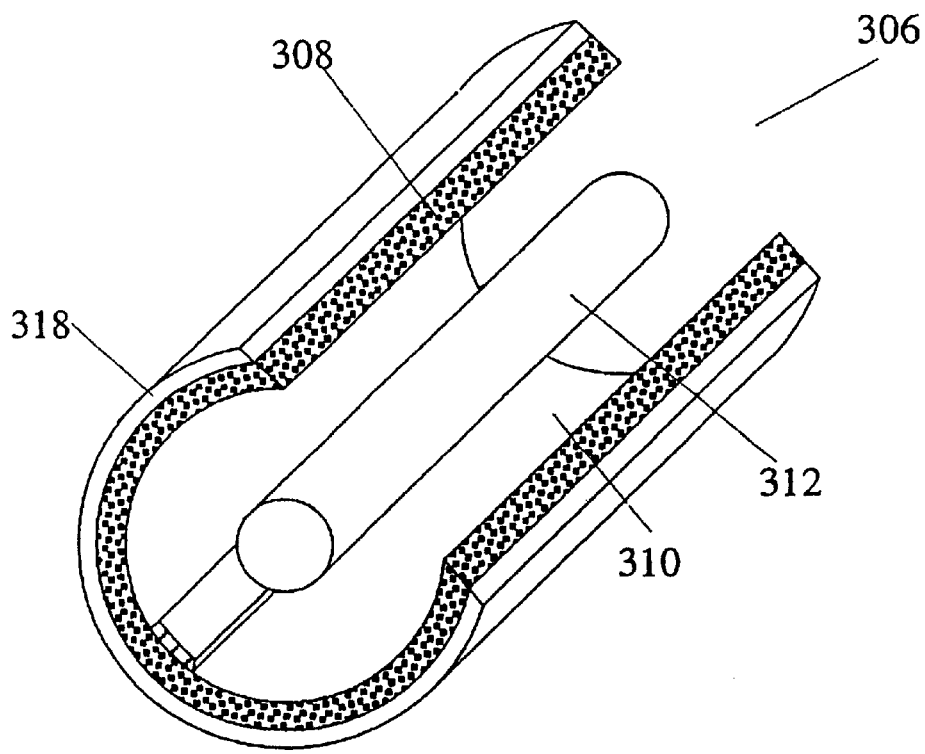
FIG. 17 is an isolated perspective view of the inventive antenna assembly.
Figure 18:
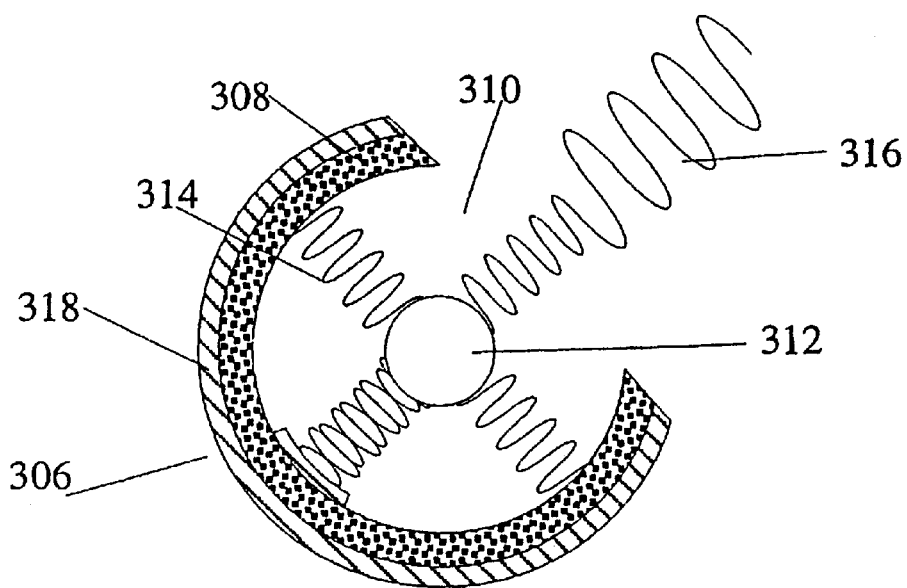
FIG. 18 is a cross sectional side view of the inventive antenna assembly shown in FIG. 17.
Figure 19:
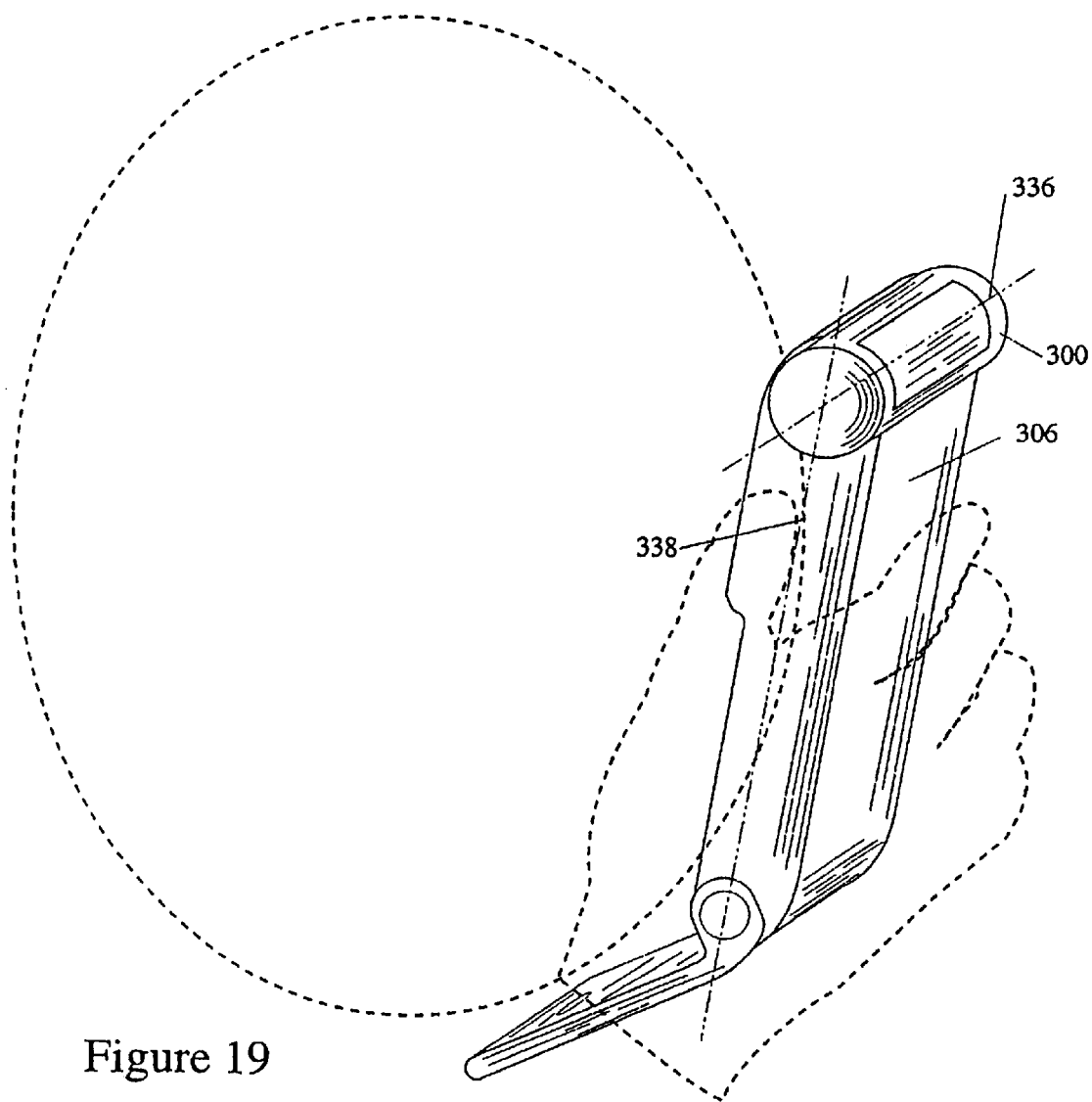
FIG. 19 schematically shows the inventive hand-held radio telephone disposed as in use.

Referring to FIGS. 15, 16, 17 and 18, the components of the inventive hand-held radio telephone 300 for radio communication through an orbiting satellite 302 are shown. An antenna assembly 306 is mounted and fixed within an antenna housing 315 that is integrally formed with the inventive hand-held radio telephone 300. A radiation-transparent window 317 may be provided for protecting the antenna assembly 306 from damage, while allowing for the transmission and reception of radiation signals. The antenna assembly 306 includes a radiation absorber 308. The radiation absorber 308 defines an open curved shape in cross section (shown in FIG. 18) so as to define an open transmission area 310. An antenna 312 is disposed adjacent to the open transmission area 310 so that during use of the hand-held radio telephone 300, a first portion 314 of a radiation signal emitted from the antenna 312 is absorbed by the radiation absorber 308. A second portion 316 of the radiation signal emitted from the antenna 312 is transmitted through the open transmission area 310 for reception by a remote receiver such as an orbiting satellite 302. The antenna assembly 306 is mounted and fixed in the hand-held radio telephone 300 so that during normal use the open transmission area 310 is disposed, relative to the antenna 312, in a direction away from the user, and the radiation absorber 308 is disposed, relative to the antenna 312, in a direction toward the user (as shown in FIG. 19). Thus, the second portion 316 of the radiation signal is transmitted through the open transmission area 310 of the antenna assembly 306, and is transmitted in a direction which is up and away from the user, and toward an orbiting satellite 302. At least some of the first portion 314 of the radiation signal is blocked from being transmitted to the user by the radiation absorber 308.

Stated otherwise, in accordance with the present invention, the radiation signal emitted from the antenna 312 and transmitted by the inventive hand-held radio telephone 300 is directed away from the user and in a direction toward a satellite 302 positioned in earth orbit. Thus, the hand-held radio telephone 300 is able to communicate via the orbiting satellite 302 with other telephone or radio communication systems that are also linked to the orbiting satellite 302. The potentially harmful radiation emitted from the antenna 312 in directions toward the user is blocked and absorbed by the radiation absorber 308. By this construction and orientation of the antenna assembly 306, the inventive hand-held radio telephone 300 is capable of effective communication, while the user is protected from the harmful effects of the radiation emitted by the antenna 312. Further, as shown in FIGS. 17 and 18, a support structure 318 may be provided to maintain the integrity and shape of the radiation absorber 308. The support structure 318 may be a metal member, having substantially the same shape as the radiation absorber 308 thereby acting as a supporting shell encasing the radiation absorber 308.

Figure 20:
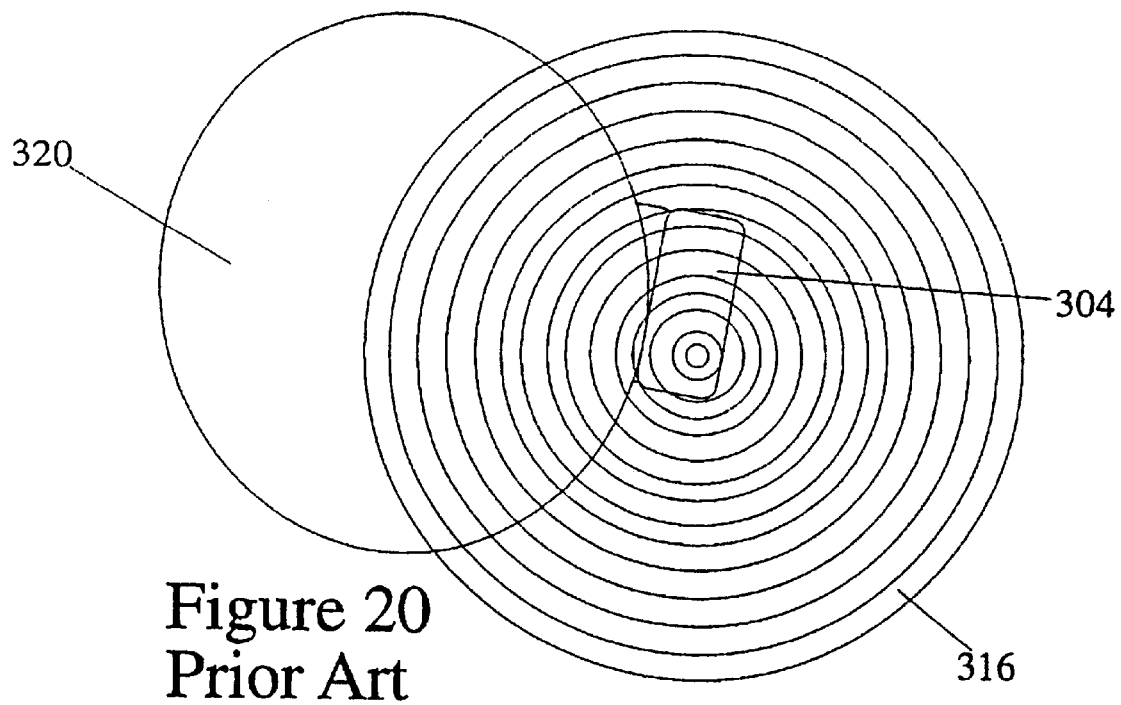
FIG. 20 shows the transmitted radiation pattern of a conventional cellular telephone.

FIG. 20 schematically shows a conventional cellular telephone 1 in use. This view shows the top of the user's head 320 and the top of the conventional cellular telephone 1. As shown, the conventional cellular telephone 1 emits a transmitted radiation pattern in all directions, with some of the transmitted radiation impinging on and being transmitted into and absorbed by the head of the user. The radiation which is absorbed by the body of the user is believed to have detrimental effects on the body tissue, and in particular, on the user's brain tissue. During use, the user's head 320 is in very close proximity to, if not touching, the radiation source (antenna) of the conventional cellular telephone 1. Recent evidence has shown that this proximity to the radiation source creates potential health hazards, since the radiation is not conventionally prevented from being absorbed by the head of the user. Also, the radiation that is absorbed by the head of the user is ineffective for communication, and thus attenuates the signal transmitted by the cellular telephone and received by a remote receiving unit, such as a ground-based cellular phone site or an orbiting antenna.

Figure 21:
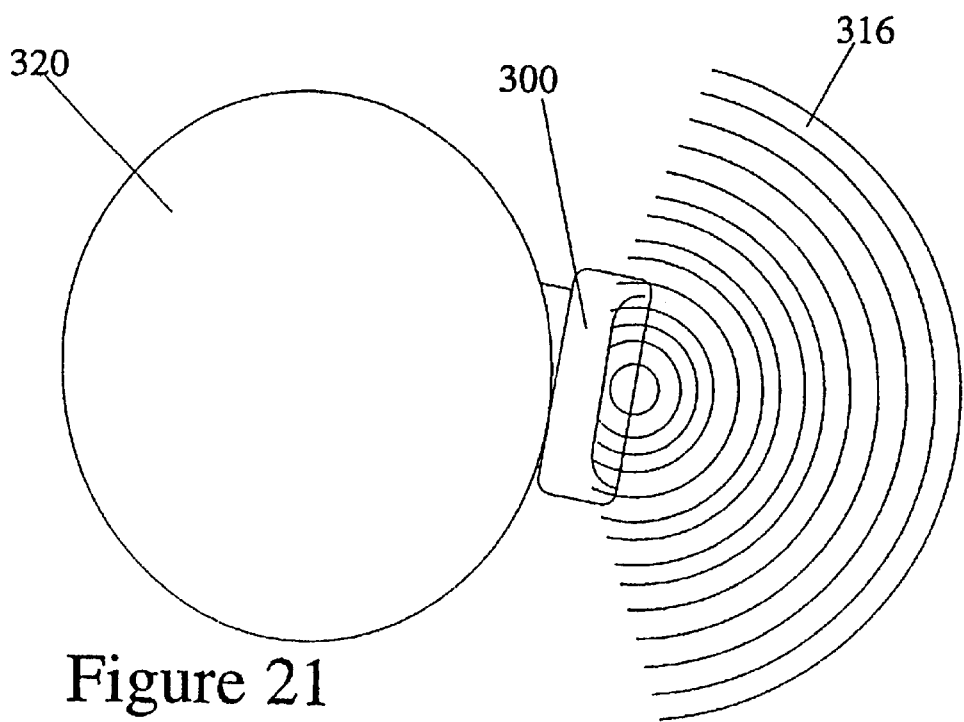
FIG. 21 shows the transmitted radiation pattern in accordance with the inventive hand-held radio telephone.

As shown schematically in FIG. 21, on the other hand, in accordance with the present invention, the inventive hand-held radio telephone 300 includes an antenna assembly 306 that effectively directs the transmission of radiation away from the user, while blocking and absorbing radiation emitted in directions towards the user. Thus, as shown, the transmitted radiation pattern of the cellular telephone in accordance with the present invention does not result in the absorption of the potentially hazardous radiation by the head and body parts of the user.

Figure 22:
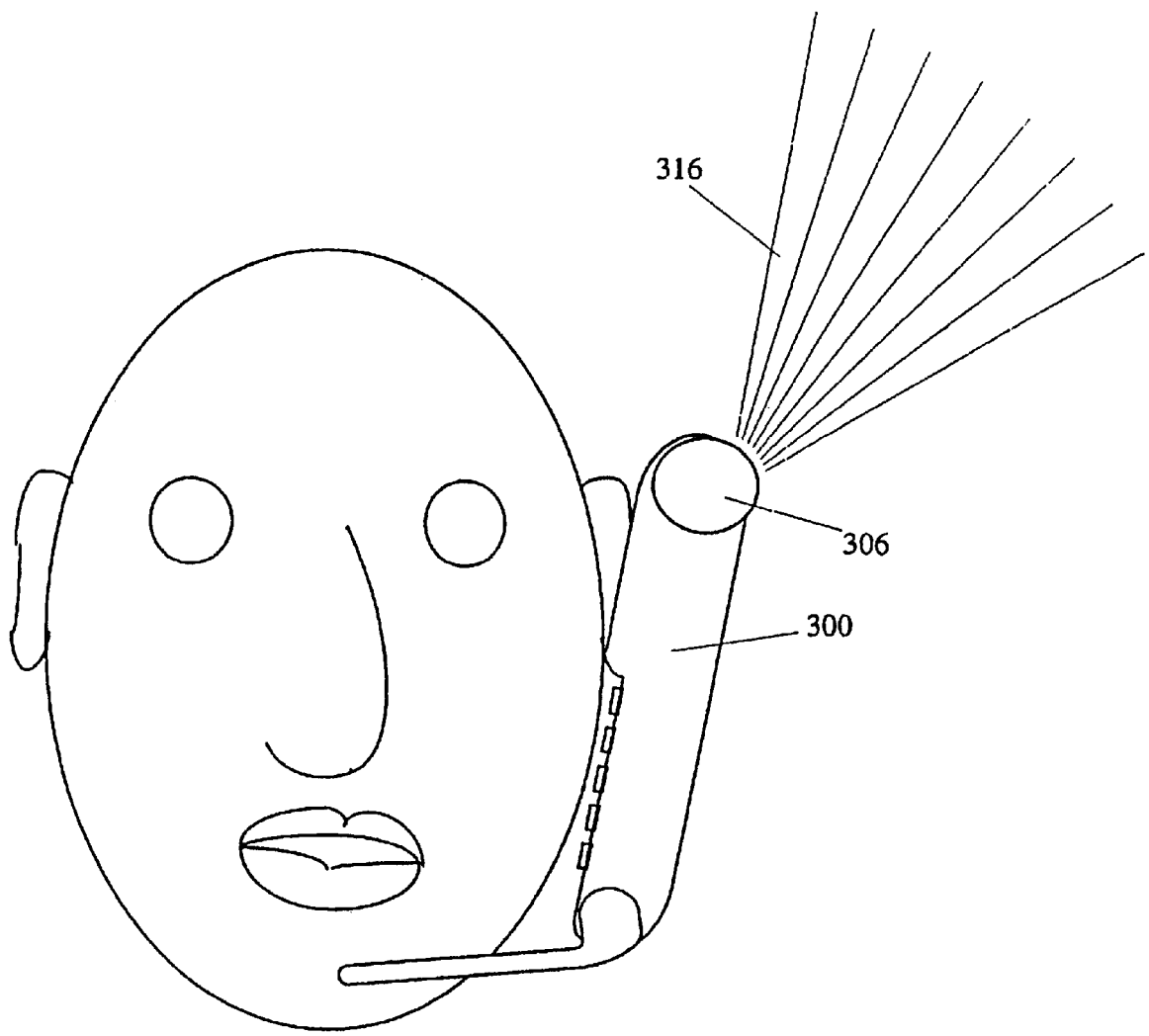
FIG. 22 shows the inventive hand-held radio telephone in use.

FIG. 22 shows the inventive hand-held radio telephone 300 in use. As shown, the user places the inventive radio telephone 300 so that the ear piece of the inventive handheld radio telephone 300 is against the user's ear, and the mouth piece is positioned close to the user's mouth, in a similar fashion as the use of a conventional cellular telephone 1 (shown, for example, in FIG. 32). However, unlike a conventional cellular telephone 1 which emits radiation in directions towards the head of the user, in accordance with the present invention, the transmitted radiation 316 is directed up and away from the user so as to be effective for communication with an orbiting satellite 302, while preventing harmful exposure to the user of the emitted radiation from the antenna 312. Also, as described in more detail below, in accordance with the present invention, an enhanced signal is directed toward the orbiting satellite 302, or other receiver such as a ground based cell site antenna, thus providing for range enhancement capabilities of the inventive hand-held radio telephone 300 as compared with the conventional art.

Referring again to FIGS. 16, 17 and 18, in accordance with the present invention, the strength of the signal emitted by the antenna assembly 306 of the inventive hand-held radio telephone 300 is enhanced through the use of at least one parasitic radiation re direction element 322. The construction is similar to that shown, for example, in FIGS. 12, 13 and 14. The parasitic radiation redirection element 322 receives radiation emitted from the antenna 312, and redirects the received radiation towards the open transmission are a 310 so as to extend the transmission range of the transmitted signal. Thus, as shown in FIG. 18, the radiation which may otherwise be transmit ted toward and absorbed by the body tissues is received by the parasitic radiation redirection element 322 is redirected towards the open transmission area 310 to thereby increase the effective signal strength of the transmitted radiation 316 directed towards the orbiting satellite 302. In accordance with this feature, in addition to preventing unwanted and potentially harmful exposure to radiation by the user, the inventive hand-held radio telephone 300 also has enhanced transmission capabilities.

Figure 23:
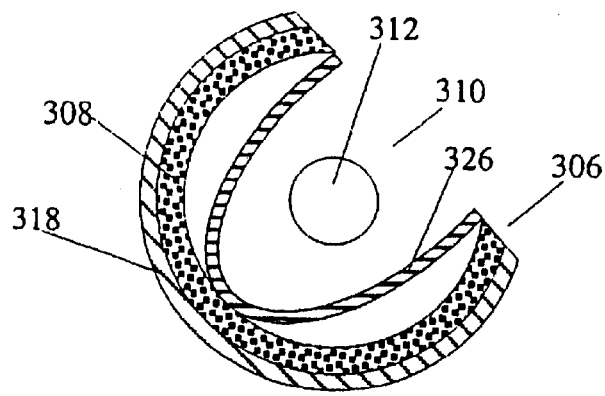
FIG. 23 shows an alternative configuration of the inventive antenna assembly.

As shown in FIG. 23, in accordance with another configuration of the inventive antenna assembly 306, a parabolic radiation reflection element 326 may be disposed adjacent to the antenna 312 for reflecting radiation emitted from the antenna 312 back towards the open transmission area 310 so as to extend the transmission range of the antenna assembly 306. The parabolic radiation reflection element 326 is configured and oriented so that radiation which may otherwise be transmitted towards the user and absorbed by the body tissues, is reflected and directed toward the open transmission area 310 so that the transmitted radiation signal directed towards the orbiting satellite 302 is enhanced and the transmission range is extended.

Figure 24:
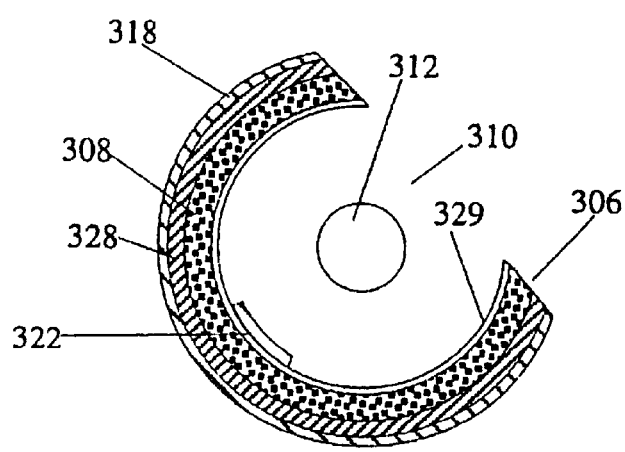
FIG. 24 shows another alternative configuration of the inventive antenna assembly.
Figure 25:
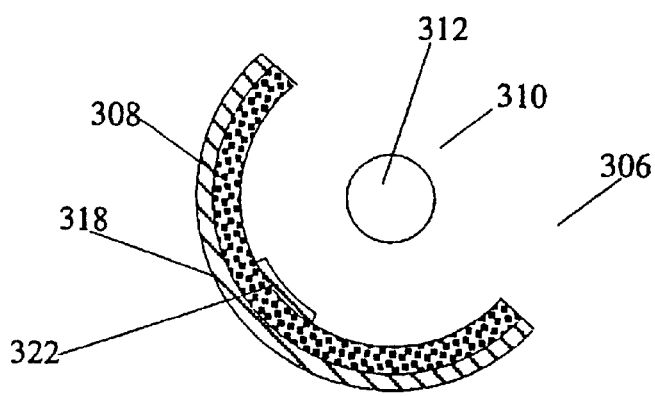
FIG. 25 shows another alternative configuration of the inventive antenna assembly.
Figure 26:
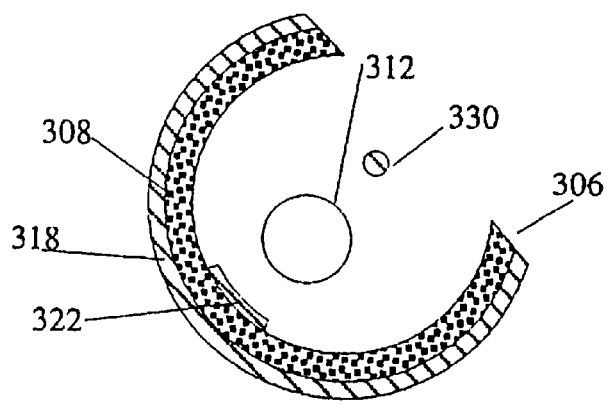
FIG. 26 shows another alternative configuration of the inventive antenna assembly.

As shown in FIG. 24, a radiation blocking layer 328 may be disposed between the antenna 312 and the user. The radiation blocking layer 328 may be comprised of a suitable material, such as lead, that is effective to prevent the transmission of cellular phone frequency radiation through it. Thus, any radiation that is not absorbed by the radiation blocker or reflected by the parasitic radiation redirection element 322 or parabolic reflector, is blocked from being transmitted to the body tissue of the user. Also, a surface layer 329, comprising a plating or thin layer of a metal, such as nickel, cobalt, aluminum, or gold may be provided to protect the radiation absorbing layer 308 from the effects of oxidation, and/or to provide a reflective surface to reflect the radiation signal emitted from the antenna back towards the open transmission area. As shown in FIG. 25, the configuration and dimensions of the elements of the inventive antenna assembly 306 may provide for a larger open transmission area 310, depending on the extent to which the emitted radiation is desired to be blocked or prevented from being transmitted. Alternatively, the open transmission area 310 may be decreased, if it is desired that the shielding effect of the inventive antenna assembly 306 is increased. As shown in FIG. 26, a second parasitic radiation redirection element 330 may be provided disposed at a position beyond the antenna assembly 306. The exact positions and number, as well as the configuration, composition and shape of the parasitic radiation redirection elements 322,330 will depend on the application and radiation transmission requirements.

Figure 27:
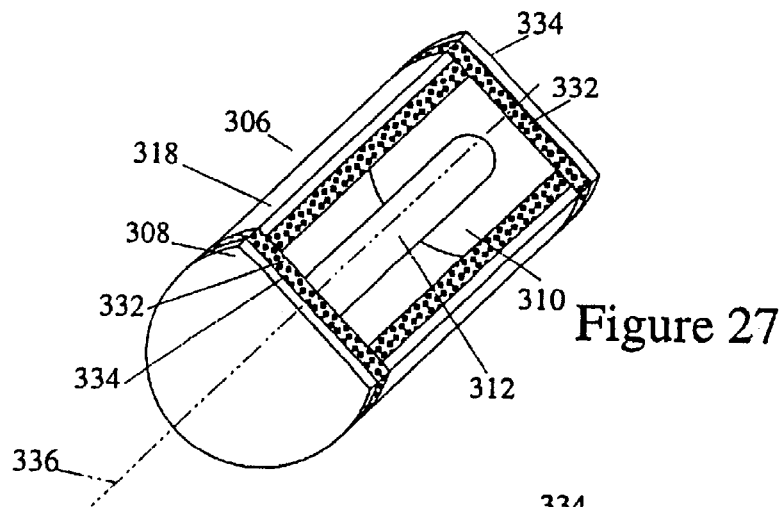
FIG. 27 shows the inventive antenna assembly and mounting means.

FIG. 27 shows an assembled antenna assembly 306, which further includes radiation absorber end portions 332 disposed at either side of the antenna 312, and mounting elements 334 for fixing and mounting the antenna assembly 306 to the inventive hand-held radio telephone 300. The antenna assembly 306 is mounted within an antenna housing 315 (shown, for example, in FIG. 15) so that during normal use of the hand-held radio telephone 300, the open transmission area 310 of the antenna assembly 306 is disposed relative to the antenna 312 in a direction away from the user, and the radiation absorber 308 is disposed relative to the antenna 312 in a direction toward the user. Thus, the portion of the radiation signal that is transmitted through the open transmission area 310 is directed in the direction of an orbiting satellite 302, and at least some of the radiation signal transmitted towards the user is blocked from being transmitted to the user. Thus, the antenna assembly 306 has a longitudinal axis 336 that is perpendicular to the cross section of the radiation absorber 308 (as shown in FIG. 19). The antenna assembly 306 is mounted within the antenna housing 315 of the inventive hand-held radio telephone 300 so that the longitudinal axis of the antenna assembly 306 is perpendicular to the longitudinal axis 338 of the hand-held radio telephone 300. By this configuration, the longitudinal axis of the antenna 312 is disposed at a generally horizontal orientation during use, and the open transmission area 310 faces at an angle upward and away from the user to effectively direct the transmitted radiation 316 away from the user and up towards an orbiting satellite 302. By this orientation, the user's body, including the head and hand, is protected from the conventionally occurring radiation exposure, and the enhance radiation signal is directed up towards it intended receiver, namely, an orbiting satellite.

Figure 28:
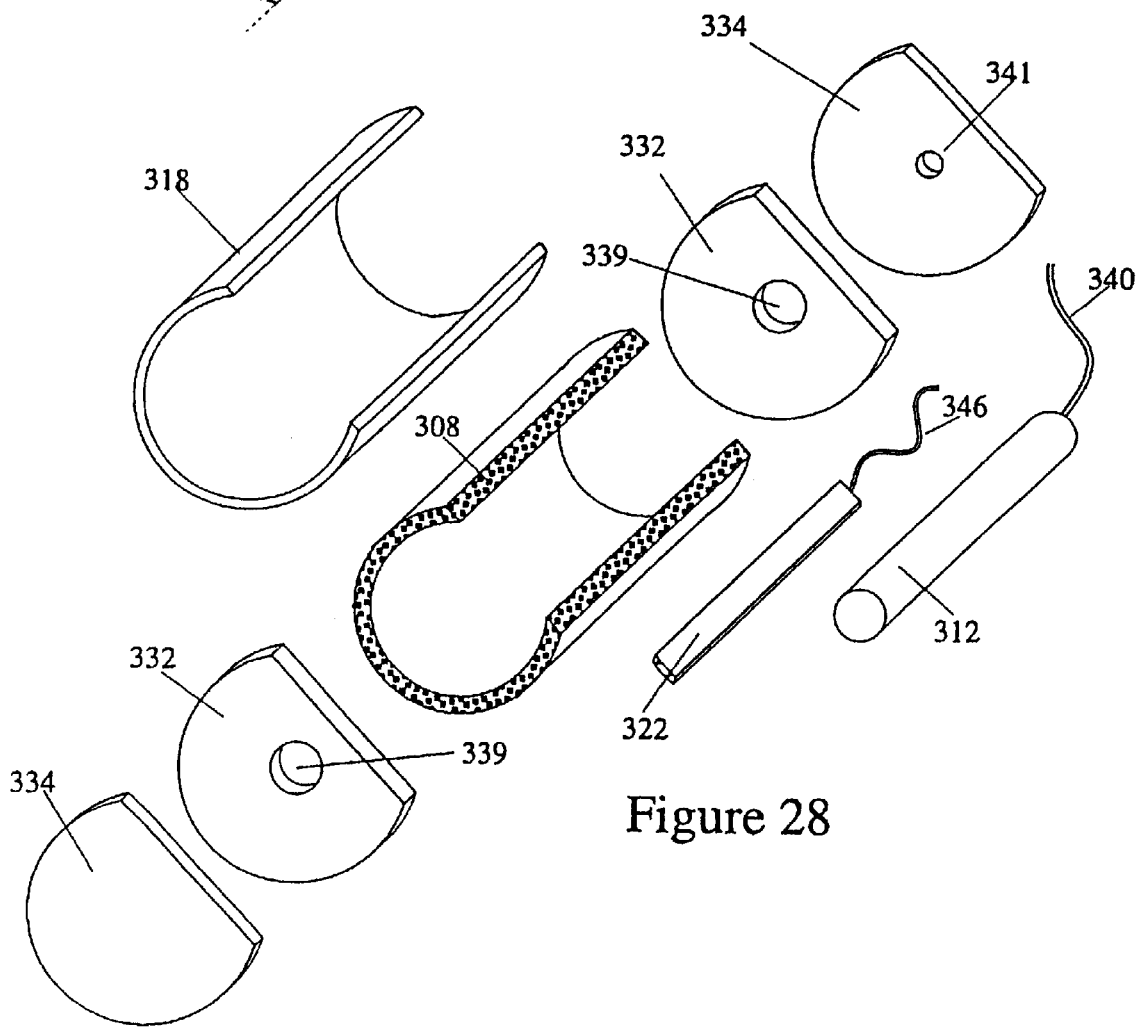
FIG. 28 shows the inventive antenna assembly and mounting means in an exploded view.

FIG. 28 shows an exploded view of the inventive antenna assembly 306. As shown, the antenna assembly 306 includes a radiation absorber 308 defining an open curved shape in cross section, so as to define an open transmission area 310. An antenna 312 is disposed adjacent to the open transmission area 310 and receives the radiation signal through a signal line 340 electrically connected to the appropriate circuit of the inventive hand-held radio telephone 300. The antenna 312 is supported by radiation absorber end portions 332. The antenna 312 is received by antenna through-holes 339 and supported by the radiation absorber end portions 332 disposed at either end of the antenna 312. The radiation absorber end portions 332 preferably have a composition that is effective at absorbing and/or blocking the transmission of radiation. A mounting element is fixed to each radiation absorber 308 end portion, and one of the mounting elements 334 has a signal line through-hole 341 through which the signal line 340 for the antenna 312 passes so that it can be in electrical contact with the appropriate circuits of the inventive hand-held radio telephone 300. Also, the parasitic radiation redirection element 322 includes a circuit ground line 346, which may also pass through the signal line through-hole 341. The circuit ground line 346 is preferably electrically connected with the circuit ground of the inventive hand-held radio telephone 300, so that the parasitic radiation redirection element 322 functions properly.

Figure 29A:
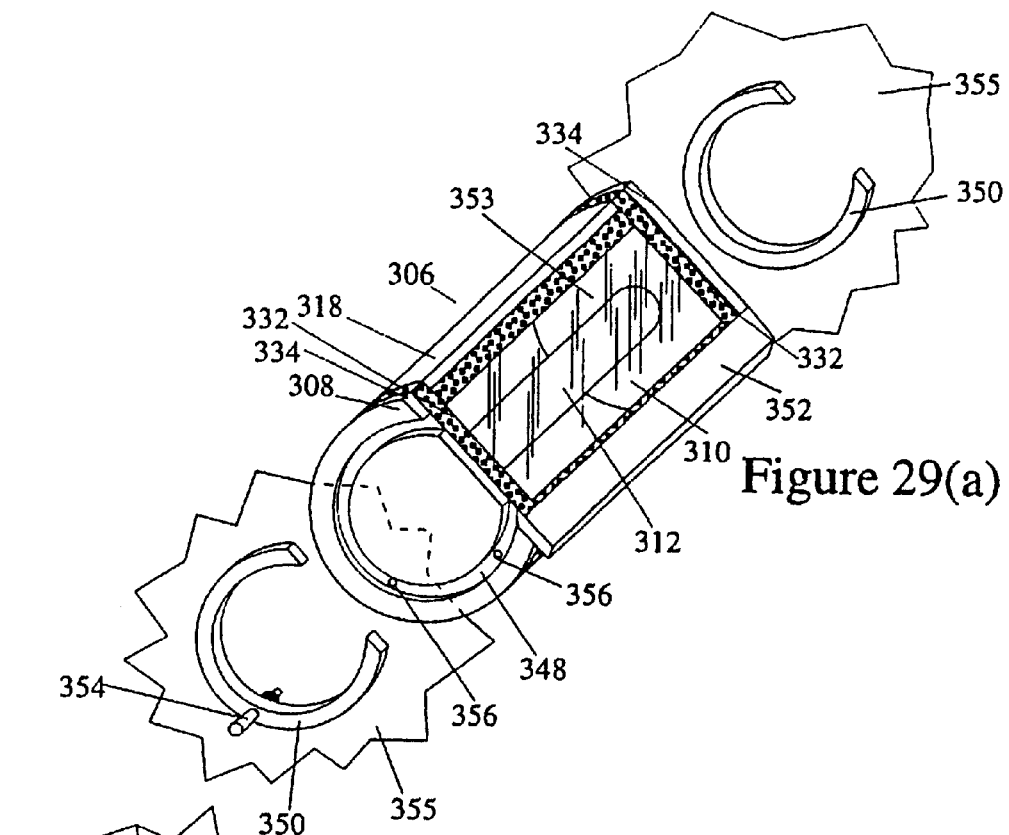
FIG. 29(a) show another embodiment of the inventive antenna assembly and mounting means.

FIG. 29(a) shows another embodiment of the inventive antenna assembly and mounting means. The mounting elements 346 each define a respective open curve receiving surface 348 for receiving a corresponding open curve engaging structure 350 (shown disengaged and removed from the antenna assembly 306 for clarity). The open curve engaging structures 350 are fixed to or integrally formed with the interior walls 355 (shown cut-away from the case 12 of the inventive hand-held radio telephone 300). The open curve engaging structures 350 rotatably support the antenna assembly 306 within the antenna housing 315, thereby allowing the antenna assembly to pivot. A flange 352 is provided fixed to the antenna assembly 306 or integrally formed with the support structure 318. The flange 352 extends from the antenna assembly 306 and provides a structure by which a user can rotate the antenna assembly around its longitudinal axis while being rotatably supported within the antenna housing 315 via the open curve engaging structures 350. A spring loaded pin 354 passes through a through-hole in the case 12 of the inventive telephone and through a through-hole 356 in one of the open curve engaging structures 350. The spring loaded pin 354 engages with a receiving hole 358 disposed in the corresponding open curve receiving surface 348 to lock the antenna assembly and prevent it from pivoting. In accordance with this construction, the angle at which the open transmission area 310 faces relative to the phone case 12 can be changed. To change the angle, the spring loaded pin 354 is pulled from its current receiving hole 358, allowing the antenna assembly 306 to pivot. The user presses down or lifts up on the flange 352 to cause the antenna assembly 306 to pivot so that the open transmission area 310 is disposed at a different angle. The spring loaded pin 354 then engages another receiving hole 358 to lock the antenna assembly 306. The construction described above is for illustrative purposes. However, the construction described above demonstrates a mechanism for allowing the change of an angle at which the open transmission area 310 faces. By this feature, the direction at which the directed radiation signal is transmitted by the inventive telephone is optimized. For example, when used for communication with an orbiting satellite, it may be more advantageous for the open transmission area 310 to face up and away from the user during use of the inventive telephone. On the other hand, when used for communication with a ground-based cell site antenna, it may be more advantageous for the open transmission area 310 to face perpendicular or out and away from the user during use of the inventive telephone. To protect the components of the antenna assembly 306, a window 353 covers the open transmission area 310. The window 353 is at least partially transparent to the radiation signal emitted from the antenna assembly 306.

Figure 29B:
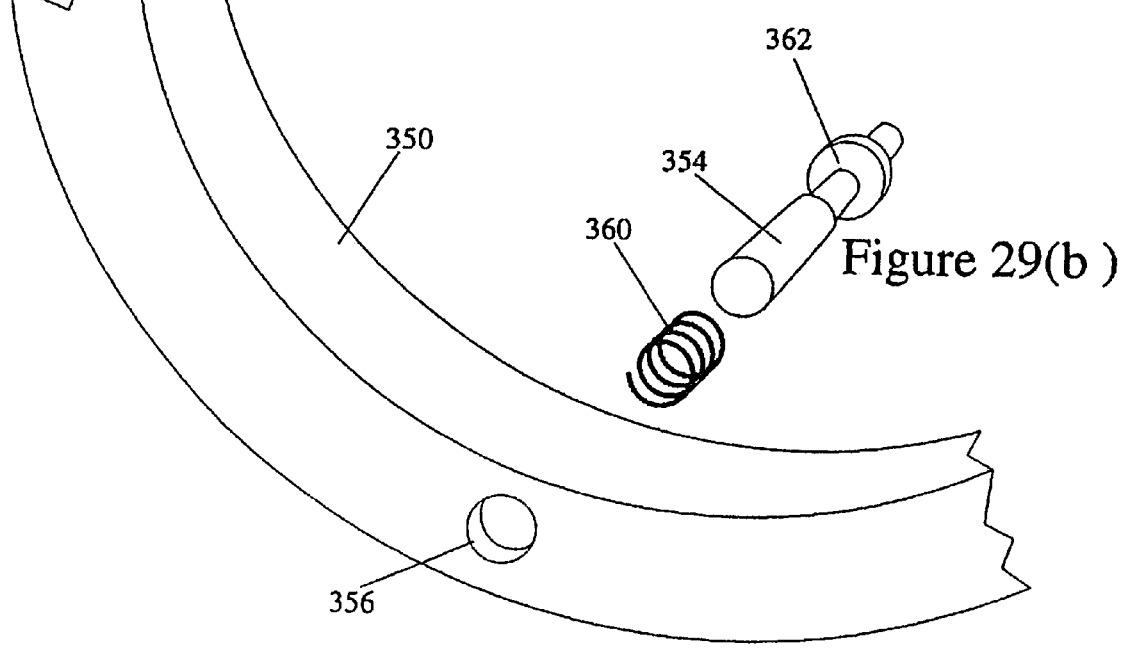
FIG. 29(b) is an enlarged isolated view of a spring loaded pin mechanism in accordance with the embodiment of the inventive antenna assembly and mounting means shown in FIG. 29(a)

FIG. 29(b) is an enlarged, isolated and exploded view of the spring loaded pin 354 and the open curve engaging structure 350 in accordance with the embodiment of the inventive antenna assembly and mounting means shown in FIG. 29(a). When assembled, the spring loaded pin 354 passes through a spring 360, through the through-hole 356 of the open curve engaging structure 350 and through the through-hole in the case 12 of the inventive telephone. When the spring loaded pin 354 is pulled, the spring 360 is compressed between the open curve engaging structure 350 and a contacting surface 362 of the spring loaded pin 354. To lock the antenna assembly 306, the spring loaded pin 354 is urged by the spring 360 into the receiving hole 358 of the open curve receiving surface 348 as described with reference to FIG. 29(a).

Figure 30A:
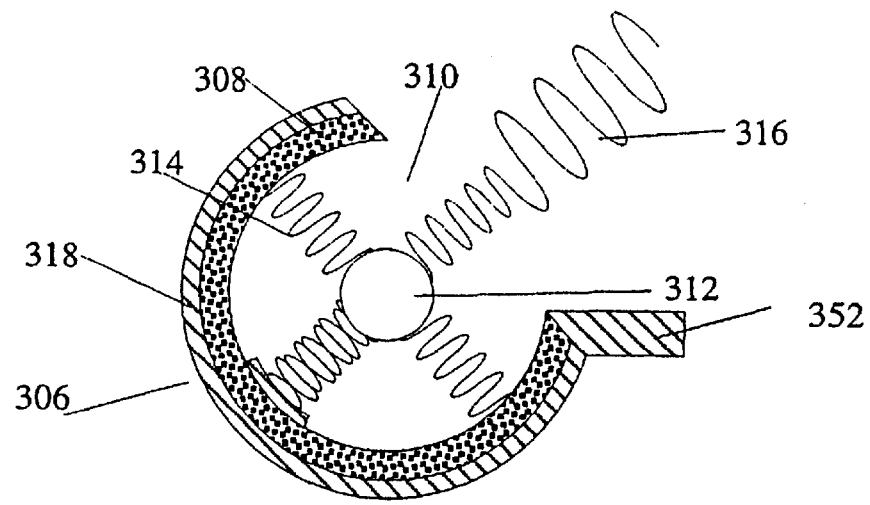
FIG. 30(a) is a cross sectional side view of the inventive antenna assembly shown in FIG. 29(a) disposed at an angle effective for communication with an orbiting satellite.
Figure 30B:
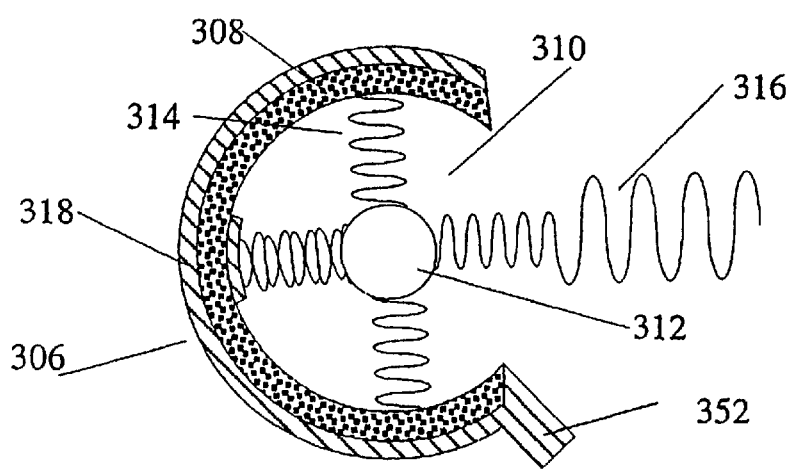
FIG. 30(b) is a cross sectional side view of the inventive antenna assembly shown in FIG. 29(a) disposed at an angle effective for communication with a ground-based cell site antenna.

FIG. 30(a) is a cross sectional side view of the inventive antenna assembly shown in FIG. 29(a) disposed at an angle effective for communication with an orbiting satellite. At this angle, the open transmission area 310 is disposed so that the transmitted radiation signal 316 is directed up and away from the user and towards an orbiting satellite. FIG. 30(b) is a cross sectional side view of the inventive antenna assembly shown in FIG. 29(a) disposed at an angle effective for communication with a ground-based cell site antenna. At this angle, the open transmission area 310 is disposed so that the transmitted radiation signal 316 is directed out and away from the user and towards a ground-based cell site.

FIG. 31(a) is a schematic view of an embodiment of the inventive hand-held radio telephone having the inventive antenna assembly and mounting means shown in FIG. 29(a) transmitting to an orbiting satellite. As shown, the flange 352 extending from the antenna assembly 306 has been disposed so that the open transmission area 310 is disposed so that the transmitted radiation signal 316 is directed up and away from the user and towards an orbiting satellite 302. FIG. 31(b) is a schematic view of the embodiment of the inventive hand-held radio telephone shown in FIG. 31(a) having the inventive antenna assembly and mounting means shown in FIG. 29(a) transmitting to a ground-based cell site antenna 364. As shown, the flange 352 has been disposed so that the open transmission area 310 is disposed so that the open transmission area 310 is disposed so that the transmitted radiation signal 316 is directed out and away from the user and towards a ground-based cell site antenna 354. Thus, by the construction described above, the user can change the angle at which the directed radiation signal is transmitted from the inventive telephone to optimize communication with an orbiting satellite or a ground-based cell site. Other mechanisms may be used to rotatably support and allow the antenna assembly 306 to pivot.

FIG. 33(a) is a cross-sectional view of an embodiment of an antenna assembly in accordance with another aspect of the present invention, and FIG. 33(b) is a cross-sectional view of the antenna assembly along line 33(b)—33(b). In accordance with this aspect of the present invention, an antenna 402 is provided for transmitting a radio signal from a radio signal transmitting device. The radio signal transmitting device may be, for example, a cellular telephone, a walkie-talkie, a ship-to-shore radio, or other radio devices capable of transmitting a radio signal. The radio signal is transmitted at a transmission side 404 of the antenna assembly, and is blocked from transmission through a shielding side 406 of the antenna assembly. A radiation absorber member 408 is disposed at the shielding side 406. The radiation absorber member 408 is disposed during use between the antenna 402 and a user of the radio signal transmitting device. A first parasitic element 410 is disposed during use between the antenna 402 and the user. A second parasitic element 412 is disposed at the transmission side 404. The second parasitic element 412 is disposed during use so that the antenna 402 is between the second parasitic element 412 and the user. Preferably, both the first parasitic element 410 and the second parasitic element 412 as disposed from the antenna 402 at a gap distance that is effective to direct a portion of the radio signal toward the transmission side 404 of the antenna assembly. A metal shell member 414 is disposed at the shielding side 406. The metal shell member 414 is disposed during use between the radiation absorber member 408 and the user. In accordance with the present invention, the radio signal transmitted from the antenna 402 is blocked at the shielding side 406 to prevent exposure of the user to the radio signal. The radio signal is transmitted at the transmitting side for effective communication with a remote receiver, such as a terrestrial cell site, a satellite orbiting the earth, or other radio signal receiver.

FIG. 34(a) is a cross-sectional view of another embodiment of the antenna assembly in accordance with the present invention. FIG. 34(b) is a cross-sectional view of the antenna assembly along line 34(b)—34(b). In accordance with this embodiment, a dielectric member 416 is disposed in the gap distance between the second parasitic element 412 and the antenna 402. The dielectric member 416 is disposed in a path of a portion of the radio signal propagating between the antenna 402 and the second parasitic element 412. The dielectric member 416 has a dielectric constant that is effective to reduce the gap distance to direct a portion of the radio signal toward the transmission side 404. The use of the dielectric member 416 reduces the overall size of the inventive antenna assembly, since the gap distance between the antenna 402 and the second parasitic element 412 can be substantially reduced as compared with the use of a free-space, or air, gap between the antenna 402 and the second parasitic element 412.

FIG. 35(a) is a cross-sectional view of another embodiment of the antenna assembly. FIG. 35(b) is a cross-sectional view of the antenna assembly along line 35(b)—35(b). In accordance with this embodiment, the dielectric member 416 is disposed between the antenna 402 and both the first and the second parasitic elements 412. The dielectric member 416 is disposed in the part of the portion of the radio signal that propagates between the antenna 402 and each of the first parasitic element 410 and the second parasitic element 412. The dielectric member 416 has a dielectric constant that is effective to reduce the gap distance so as to direct a portion of the radio signal towards the transmission side 404. In accordance with this construction, the overall size of the inventive antenna assembly can be further reduced since the gap distance necessary for directing the radio signal toward the transmission side 404 can be reduced as compared with a free-space, air, gap.

Figure 36:
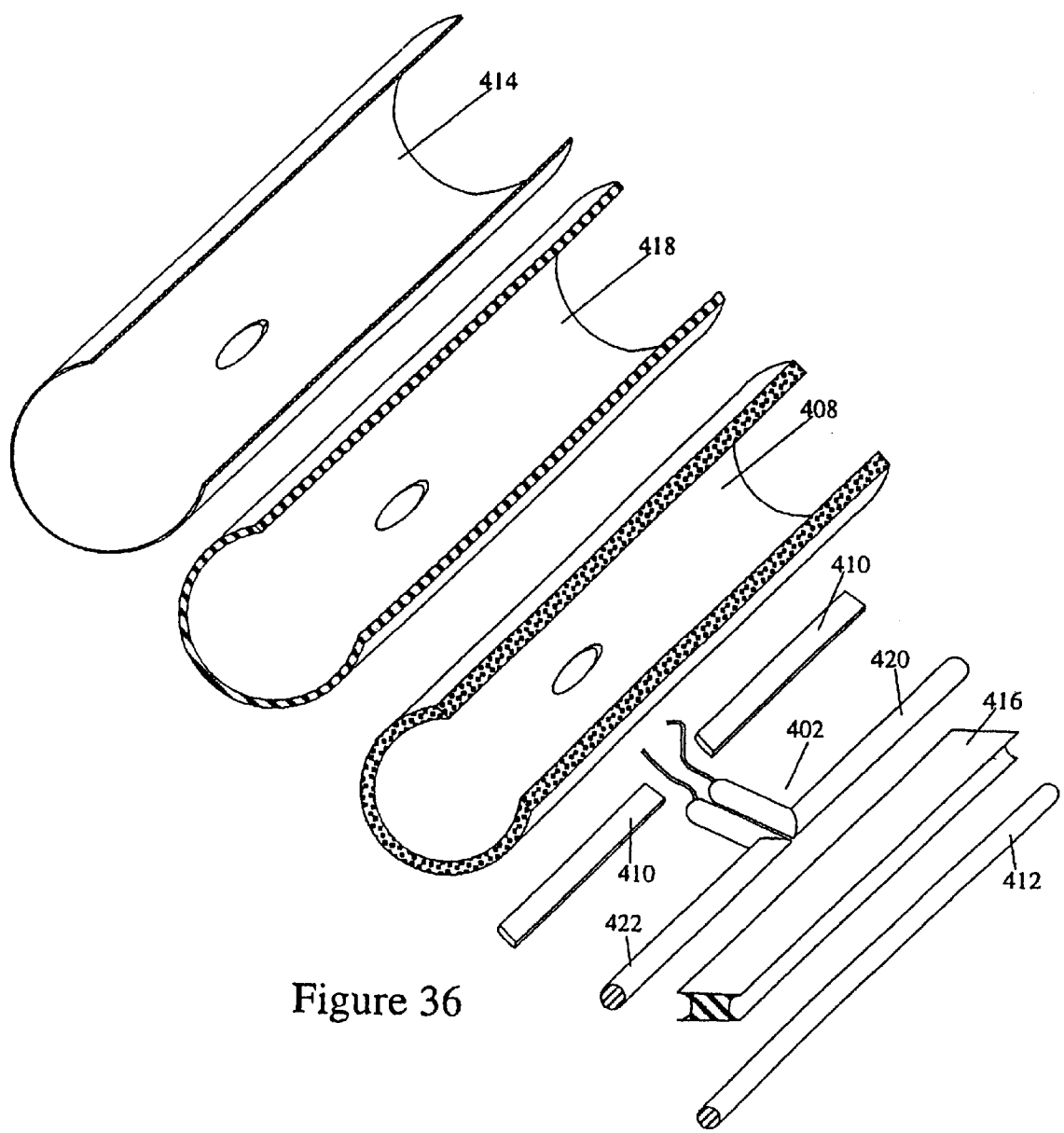
FIG. 36 is an exploded view of the inventive antenna assembly shown in FIG. 33(a)

FIG. 36 is an exploded view of the inventive antenna assembly shown in FIG. 33(a). In accordance with the present invention, the inventive antenna assembly is constructed by disposing a metal shell around a support element 418 that is lined with the radiation absorber member 408. In accordance with this embodiment, a dipole antenna 402 comprised of a first antenna 402 segment and a second antenna 402 segment is provided.

Figure 37A:
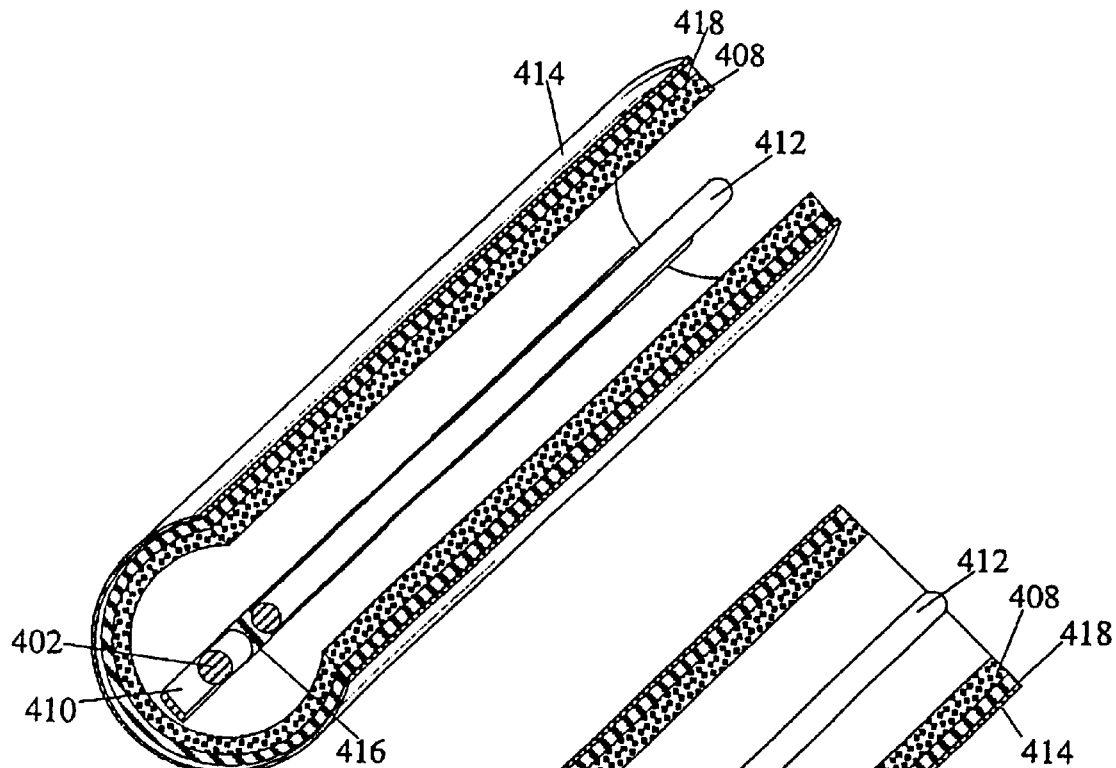
FIG. 37(a) is a perspective view of the antenna assembly shown in FIG. 33(a)
Figure 37B:
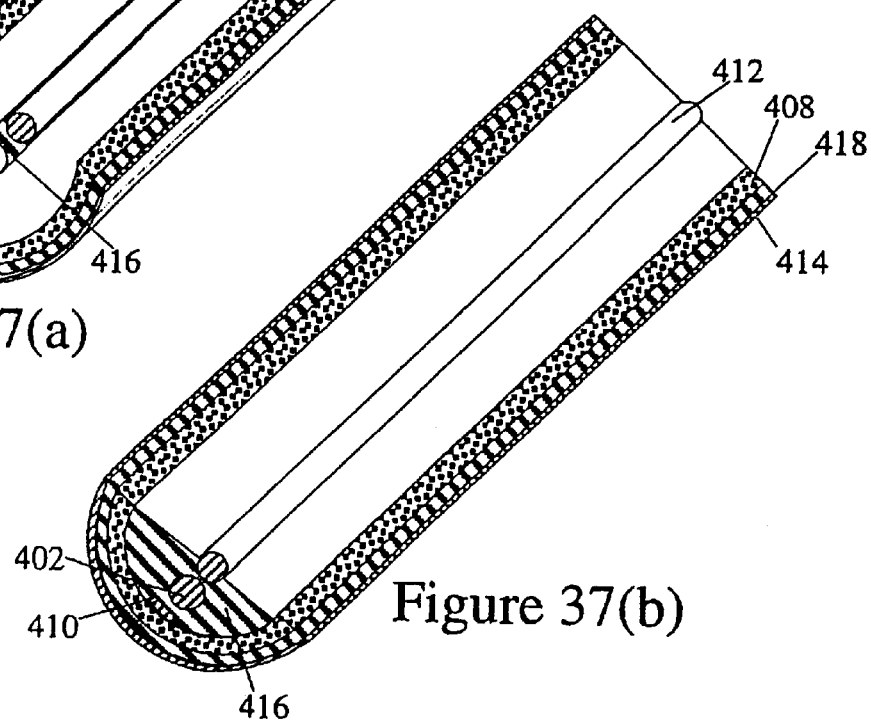
FIG. 37(b) is a perspective view of the antenna assembly shown in FIG. 35(a)

Preferably, each antenna 402 segment has an effective antenna 402 length of substantially ¼ of the wave length of the radio signal transmitted by the radio signal transmitting device. Thus, the antenna 402 has an effective length of substantially ½ of the wave length of the radio signal transmitted by the radio signal transmitting device. A first parasitic element 410 is disposed adjacent to the radiation absorber, and may be comprised of a first and second segment. Preferably, the overall effective length of the first parasitic element 410 is equal to substantially ½ of the wave length of the radio signal transmitted by the radio signal transmitting device. In accordance with this embodiment of the inventive antenna assembly, a dielectric standoff 416 is disposed between the second parasitic element 412 and the antenna 402 to maintain the second parasitic element 412 at its correct position relative to the antenna 402. Preferably, the second parasitic element 412 has an effective length that is substantially ½ of the wave length of the radio signal transmitted by the radio signal transmitting device. If the path that the radio signal propagates through between the second parasitic element 412 and the antenna 402 is substantially a free-space, air, gap, then preferably the second parasitic element 412 is disposed from the antenna 402 at a distance of ⅒th of the wave length of the radio signal transmitted by the radio signal transmitting device. FIG. 37(a) is a perspective view of an antenna assembly constructed in accordance with the antenna assembly shown in FIG. 33(a), and FIG. 37(b) is a perspective view of an antenna assembly constructed in accordance with the antenna assembly shown in FIG. 35(a). As shown, for example, in FIG. 33(a), a matching device 424 is provided for matching the antenna 402 impedance to the transmission line of the radio transmitting device. The antenna assembly is mounted on the radio transmitting device through the use of a standard connector 426. An antenna assembly was constructed in accordance with the embodiment shown in FIG. 37(a) (also shown in FIGS. 33(a), 33(b), and FIG. 36). This embodiment of the inventive antenna assembly was compared with a representative conventional antenna assembly selected from the commercially available cellular telephones. The radiation pattern of the antenna assembly of the commercially available cellular telephone was determined to obtain a comparison standard. The inventive antenna assembly was then substituted for the antenna assembly of the commercially available cellular telephone antenna 402 and its radiation pattern was then determined. The results of the experimental tests indicate that as compared with the conventional antenna assembly, the inventive antenna assembly obtains a 96.4% reduction in radiated power toward the user (towards the shielding side 406) and a 357% increase in radiated power forward (towards the transmission side 404), translating into an 88% range increase. Furthermore, when used as an antenna assembly of a cellular telephone, the inventive antenna assembly reduces the power output requirements for effective communication with a cell site. Thus, the battery time of the cellular telephone is increased, and a more distant cell site can be transmitted to, as compared with the use of a conventional antenna assembly. Also, a reduction of at least −14 db, or approximately 96%, of the radiation exposure of the user is obtained as compared with the conventional antenna assembly.

To further enhance the performance of the inventive antenna assembly, the support element 418 supporting the radiation absorber and/or the metal shell member 414 may be formed of a dielectric material. The dielectric material preferably has a dielectric constant that is effective to approximate a gap distance between the metal shell member 414 and the radiation absorber as being a free space, air gap distance of ½ of the wave length of the radio signal transmitted by the radio signal transmitting device. In accordance with this aspect of the invention, a portion of the radio signal that is not absorbed by the radiation absorber member 408 (and thus transmits towards the user) is reflected by the metal shell back towards the transmission side 404 of the antenna assembly as a reinforcing wave propagated through the dielectric support element 418.

Figure 38A:
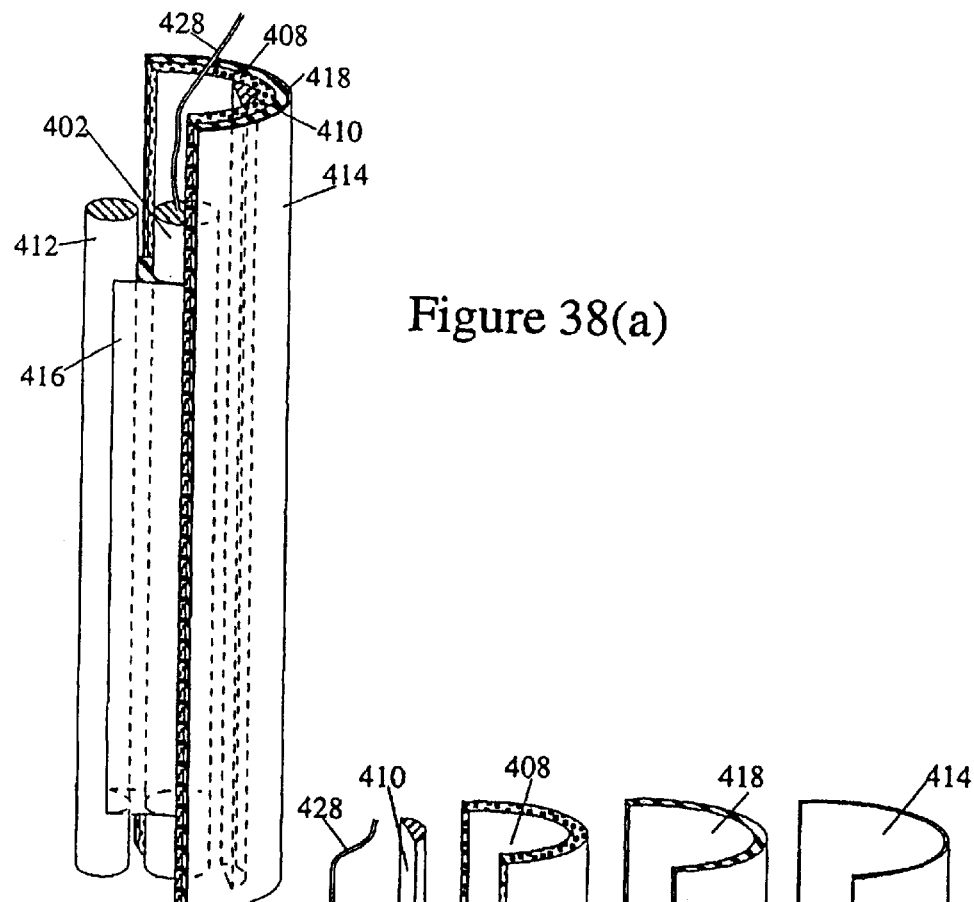
FIG. 38(a) is a perspective view of an embodiment of an antenna assembly comprising one half of an inventive dual antenna assembly.
Figure 38B:
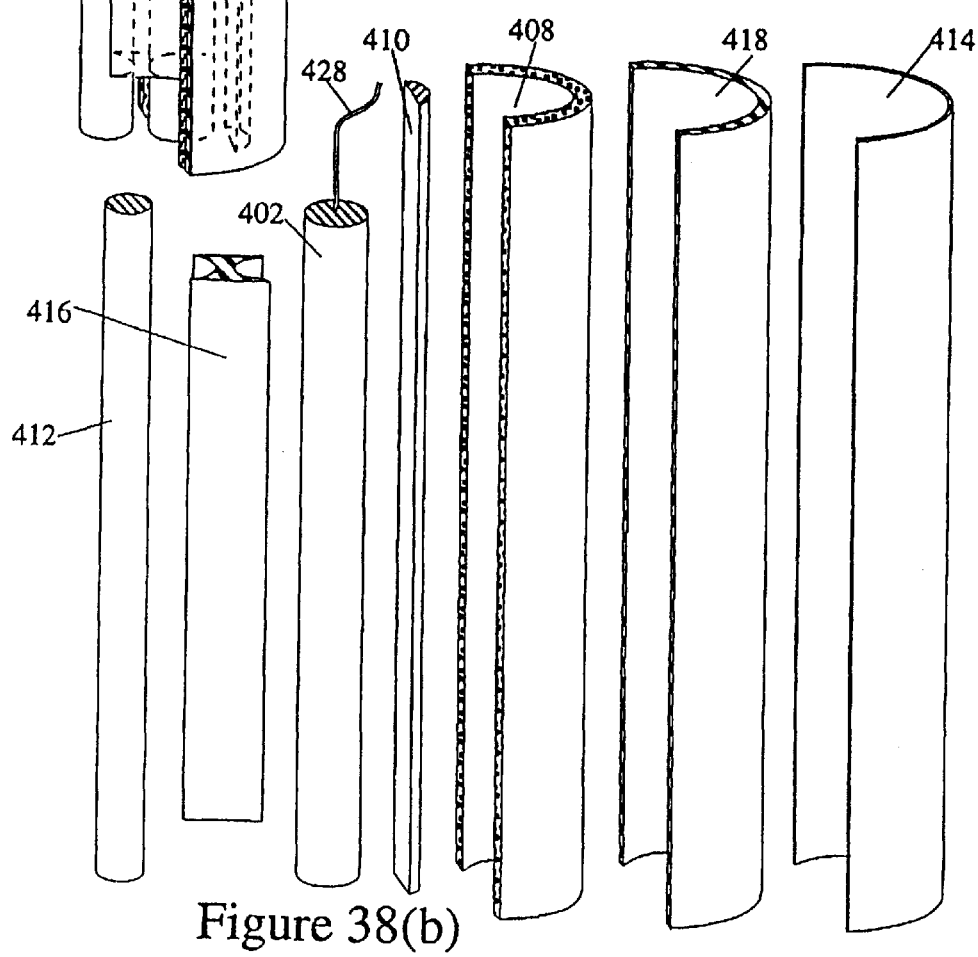
FIG. 38(b) is an exploded view of the antenna assembly shown in FIG. 38(a)

FIG. 38 is a perspective view of an embodiment of an antenna assembly comprising ½ of an inventive dual antenna assembly. In accordance with this aspect of the invention, a dual antenna assembly includes a first and second antenna assembly, each comprising ½ of a dipole antenna system. Each antenna assembly includes an antenna 402 for transmitting a radio signal from a radio signal transmitting device, such as a cellular telephone, walkie-talkie, ship-to-shore radio, or other radio communication system. The radio signal is transmitted at a transmission side 404 of the antenna assembly, and is blocked from transmission from a shielding side 406 of the antenna assembly. A radiation absorber member 408 is disposed at the shielding side 406. The radiation absorber member 408 is disposed during use between the antenna 402 and a user of the radio signal transmitting device. A first parasitic element 410 is disposed during use between the antenna 402 and the user. As shown, the first parasitic element 410 may be disposed adjacent to the absorber member 408. A second parasitic element 412 is disposed at the transmission side 404. The second parasitic element 412 is disposed during use so that the antenna 402 is between the second parasitic element 412 and the user. At least one of the first and the second parasitic elements 412 is disposed from the antenna 402 at a gap distance effective to direct a portion of the radio signal toward the transmission side 404. A metal shell member 414 is disposed at the shielding side 406, and is disposed during use between the radiation absorber member 408 and the user. The radio signal transmitted from the antenna 402 is blocked at the shielding side 406 to prevent exposure of the user to the radio signal. The radio signal is transmitted at the transmitting side for effective communication with a remote receiver. Each of the antenna assemblies of the dual antenna assembly includes an antenna 402 lead for connecting the respective antenna assembly to a transmission circuit of the radio transmitting device. As shown in FIGS. 38(a) and 38(b), each of the first and the second antenna assembly of the dual antenna assembly may be constructed similarly with the construction of the antenna assembly shown, for example, in FIG. 33(a) and FIG. 36. However, in accordance with this aspect of the invention, each of the first and the second antenna assembly has a respective monopole antenna 402 element, so that the respective antennas 402 of the first and the second antenna assembly can co-act in the manner of a dipole antenna 402.

FIGS. 39(a) and 39(b) are perspective and exploded views of an antenna assembly utilizing the size reduction capabilities of a dielectric member 416. As described above, if the path by which a radio signal propagates between the antenna 402 and the first and/or second parasitic element 412 it is through an appropriate dielectric material, the overall size of the antenna assembly can be reduced as compared with the use of an air gap.

FIG. 40(a) shows the antenna assembly shown in FIG. 39(a) having radiation absorber end caps 430 and metal end caps 432 to further enhance the performance of the inventive antenna assembly. Appropriate through-holes are provided in the radiation absorber and metal end caps 432 to allow passage of an antenna 402 lead line. As shown in FIG. 40(b), each antenna assembly of the inventive dual antenna assembly may be housed within an assembly housing 436, which can easily be formed through an injection molding process or the like. Before being installed in the assembly housing 436, the metal end caps 432 are secured in place through the use of an adhesive, or as shown through the use of an adhesive tape 438. Of course, other fastening methods may be utilized, and the metal caps and/or the radiation absorber end caps 430 may be integrally formed with their respective corresponding component of the antenna assembly. A radio signal transmissive window 440 may be provided for preventing damage to the antenna assembly. Thus, as shown in FIG. 40(c), once assembled the inventive antenna assembly has a shielding side 406 enclosed by an assembly housing 436, and a transmission side 404 protected by a radio signal transmissive window 440.

Figure 41A:
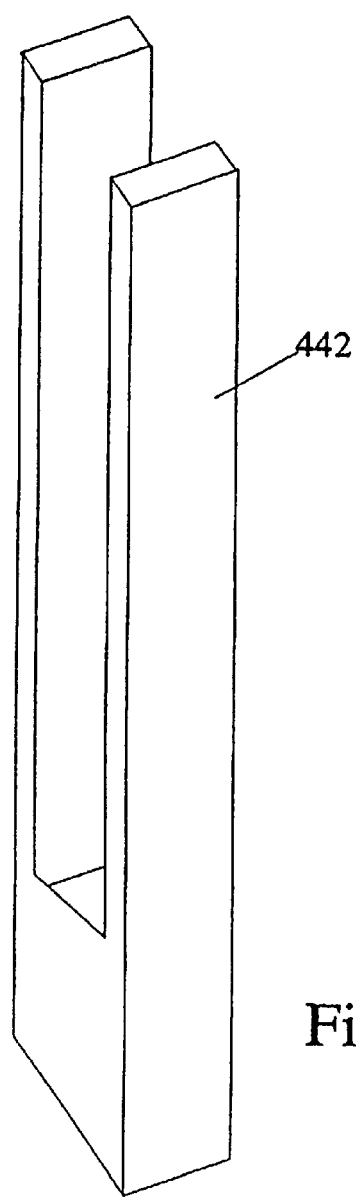
FIG. 41(a) is a perspective view of an external rechargeable battery pack.
Figure 41B:
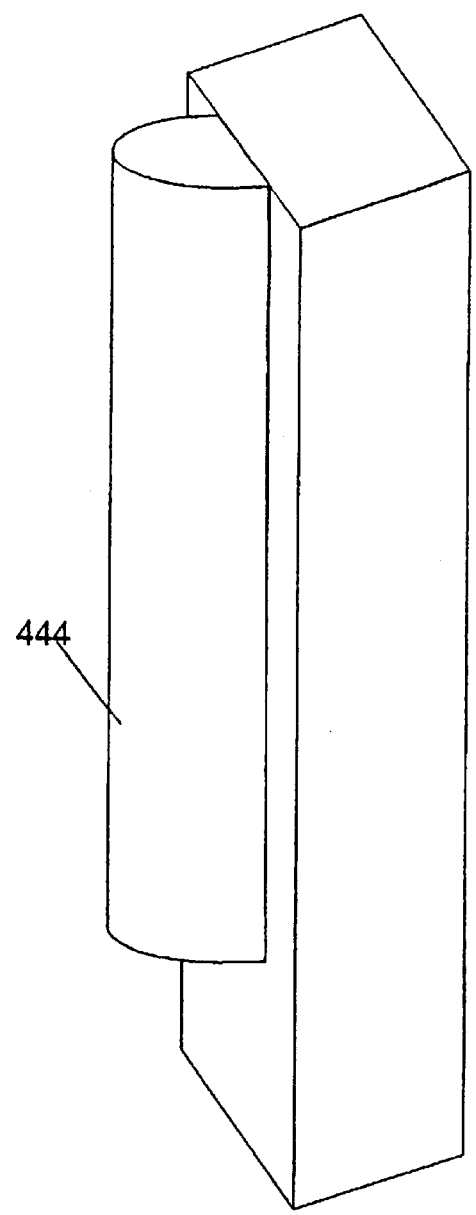
FIG. 41(b) is a perspective view of a radio transmitting device having an embodiment of the inventive dual antenna assembly.
Figure 43A:
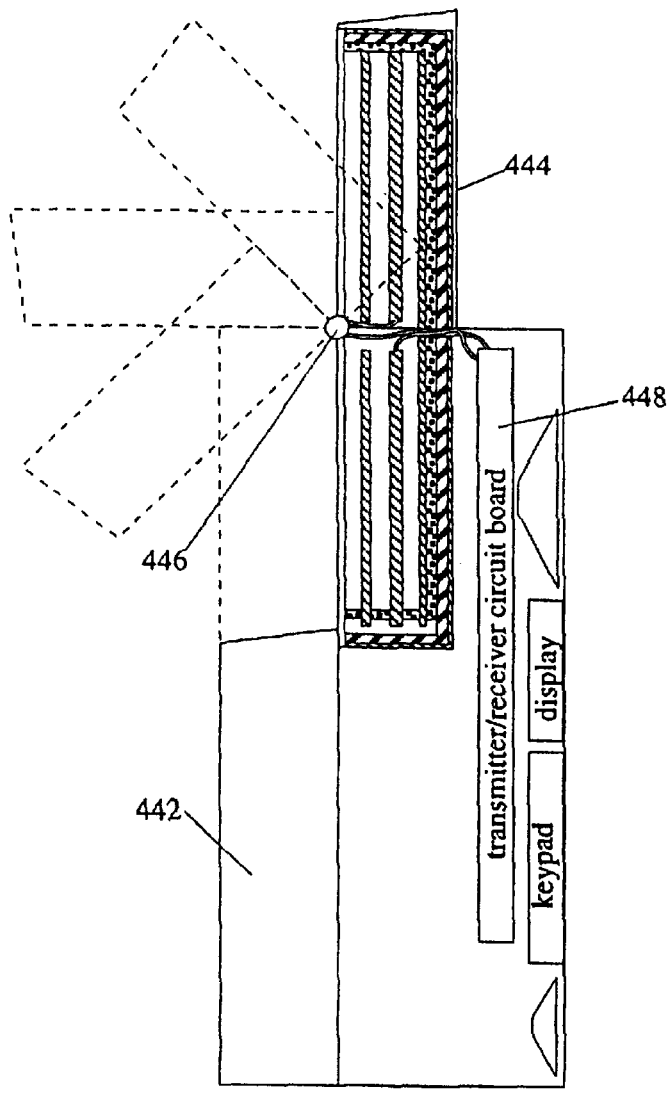
FIG. 43(a) is a schematic view of a radio transmitting device having the inventive dual antenna assembly in an open, in-use position.
Figure 43B:
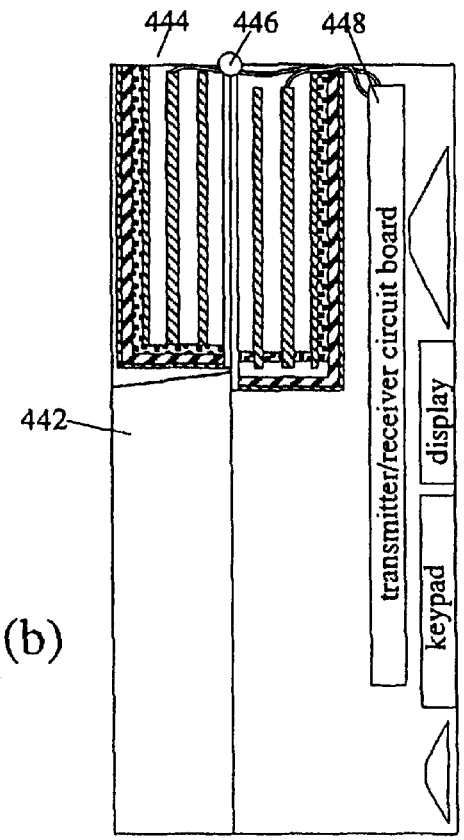
FIG. 43(b) is a schematic view of the radio transmitting device shown in FIG. 43(b) having the inventive dual antenna assembly in a closed position.

FIG. 41(a) is a perspective view of a rechargeable battery pack 442 for use with a radio transmitting device, such as a cellular telephone. FIG. 41(b) shows a perspective view of a radio signal transmitting device, such as a cellular telephone, having an embodiment of the inventive dual antenna assembly. FIG. 42(a) is a perspective view of the radio transmitting device shown in FIG. 41(b) having installed on it the battery pack 442 shown in FIG. 41(a). In this view, the radio transmitting device is shown having the inventive dual antenna assembly disposed in a closed position. FIG. 42(b) is a perspective view of the radio transmitting device having the inventive dual antenna assembly disposed in an open, in-use position. During times when the radio transmitting device is not in use or is in a standby mode, the user may desire to reduce the overall size of the device, thus, during these times the inventive dual antenna assembly can be folded down in a closed position. A separate receiving antenna 402 may be provided for receiving transmission signals from a remote sender, such as a cell site. Thus, even if the dual antenna assembly is in the closed position, the signals from the cell site may be received. The dual antenna assembly is disposed on the radio transmitting device so that a first antenna assembly is enclosed within the radio transmitting device body, and the second antenna assembly is pivotally fixed to the radio signal transmitting device body. In this case, pivoting means (hinge 446, or the like) is provided for pivoting the first antenna assembly relative to the second antenna assembly. Thus, as shown in FIG. 43(a), to position the inventive dual antenna assembly in an open, in-use position, the user pivots the first antenna assembly relative to the second antenna assembly into the open position. In this open position, the transmission side 404 of the dual antenna assembly is disposed pointing away from the user during use of the radio transmitting device, and the shielding side 406 of the dual antenna assembly is disposed facing the user. Thus, the range enhancing aspects of the inventive antenna assembly can be utilized for effective communication with a remote receiver, while preventing exposure of the user to the potentially harmful effects of the emitted radiation. As shown in FIG. 43(b), to dispose the dual antenna assembly in the closed position, the user pivots the first antenna assembly back downwards towards the body of the radio transmitting device.

In accordance with this aspect of the present invention, signal applying means (transmitter/receiver circuit board 448) of the radio signal transmitting device simultaneously applies a radio signal from the transmission circuit to both the first and the second antenna assembly. In this case, a frequency is applied to the first and the second antenna assembly via respective first and second antenna 402 leads. Thus, the two antenna 402 elements of the first antenna assembly and the second antenna assembly, respectively, act in combination as an antenna 402 having an effective antenna 402 length equal to the sum of the effective antenna 402 length of the respective antenna 402 of the first and second antenna assembly. Stated otherwise, in this use, the dual antenna assembly acts as a dipole antenna 402, with each of the poles of the dipole being constituted by the respective antenna 402 element of the first and second antenna assemblies. Thus, for example, when used for communication via a terrestrial cellular telephone network, the frequency of the radio signal is typically on the order 830 ± MHz. In this case, the effective antenna 402 length should be equal to or less than the physical equivalent of ½ or ¼ of the wave length of the radio signal.

Furthermore, the inventive dual antenna assembly can be utilized for communication with a terrestrial cell site having a predetermined frequency, and also with a satellite based communication system having a frequency which is twice that of the cell site frequency. In this case, the signal applying means applies a radio signal from the transmission circuit having a second frequency to either of the first and the second antenna assemblies via the respective first and second antenna 402 lead, so that either the antenna 402 of the first antenna assembly or the antenna 402 of the second antenna assembly acts separately as an antenna 402 having an effective antenna 402 length that is equal to the effective antenna 402 length of the antenna 402. Stated otherwise, since the satellite based communication system utilizes a frequency that is twice that of the frequency used for terrestrial based cellular communication, the wave length of the radio signal used for satellite communication will be ½ or ¼ of the wave length of the radio signal used for terrestrial cellular communication. Therefore, in accordance with the present invention, by utilizing only one antenna assembly (applying the radio signal to one antenna 402 element), thus antenna 402 element acts effectively as a monopole antenna 402 for communication. Thus, the same dual antenna assembly can be utilized for both terrestrial cellular base communication and satellite based communication to thereby greatly enhance the usefulness of the radio communication device. Thus, the antenna is considered a dual band antenna.

Figures 44A, 44B:
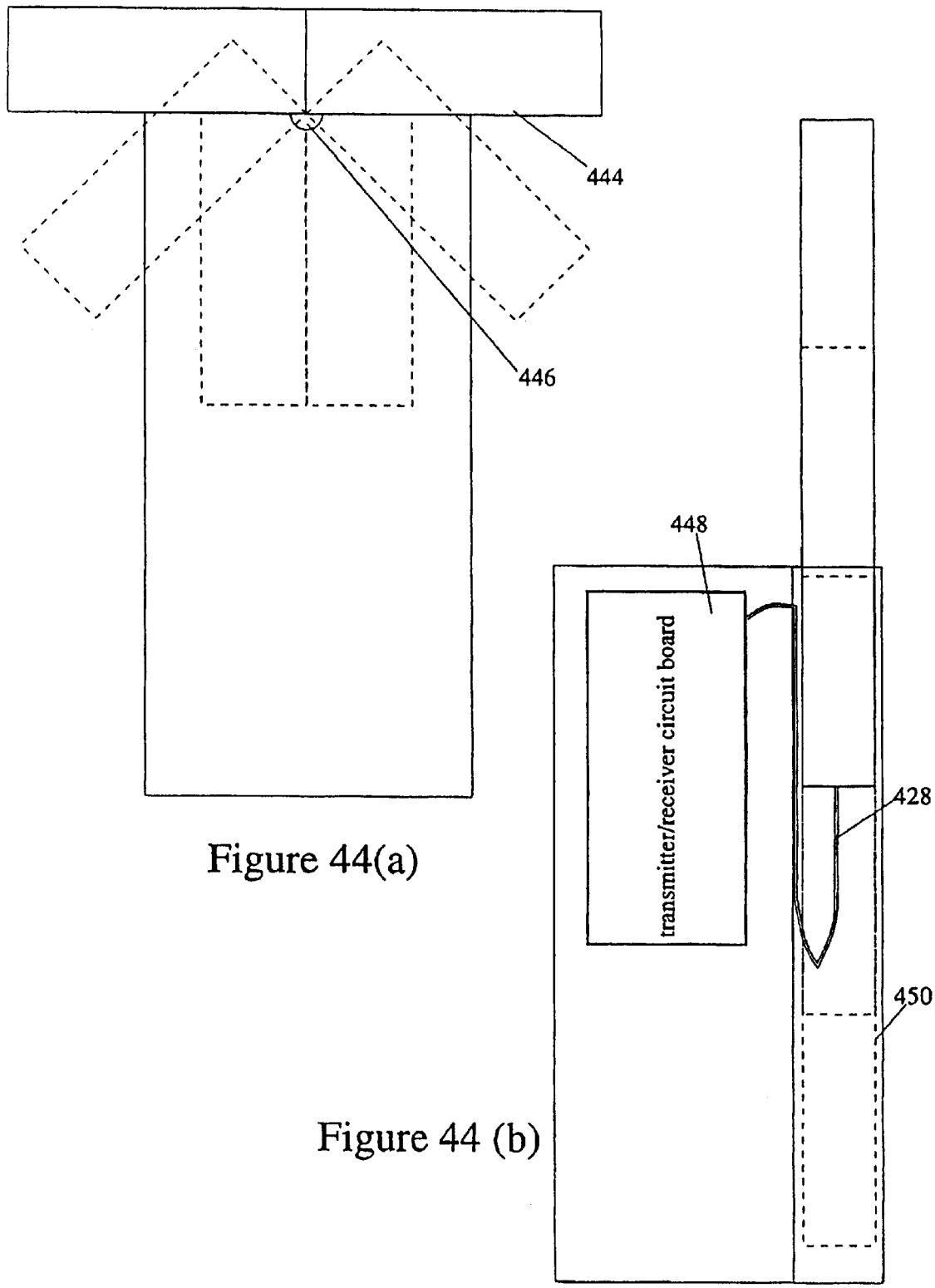
FIG. 44(a) is a schematic view of an alternative configuration of the inventive dual antenna assembly disposed on a radio transmitting device.
FIG. 44(b) is a schematic view of an embodiment of the inventive antenna assembly disposed on a radio transmitting device.

FIG. 44(a) schematically shows an alternative configuration of the inventive dual antenna assembly disposed on a radio transmitting device. In this case, the first antenna assembly and the second antenna assembly are disposed side by side at the back of the radio transmitting device and are hinged together by a pivoting means supported on the body of the radio transmitting device. To place the inventive dual antenna assembly in the in-use open position, the first antenna assembly and the second antenna assembly are swung up into the position shown. For storage, the first antenna assembly and the second antenna assembly can be pivoted into the side-by-side relationship shown by the dotted lines. FIG. 44(b) schematically shows an embodiment of the inventive antenna assembly disposed on a radio transmitting device. In this case, the antenna assembly (such as that shown in FIG. 33(a) is received within a receiving channel 450 disposed within the body of the radio transmitting device. During use, the inventive antenna assembly is extended from the cavity.

Figure 45:
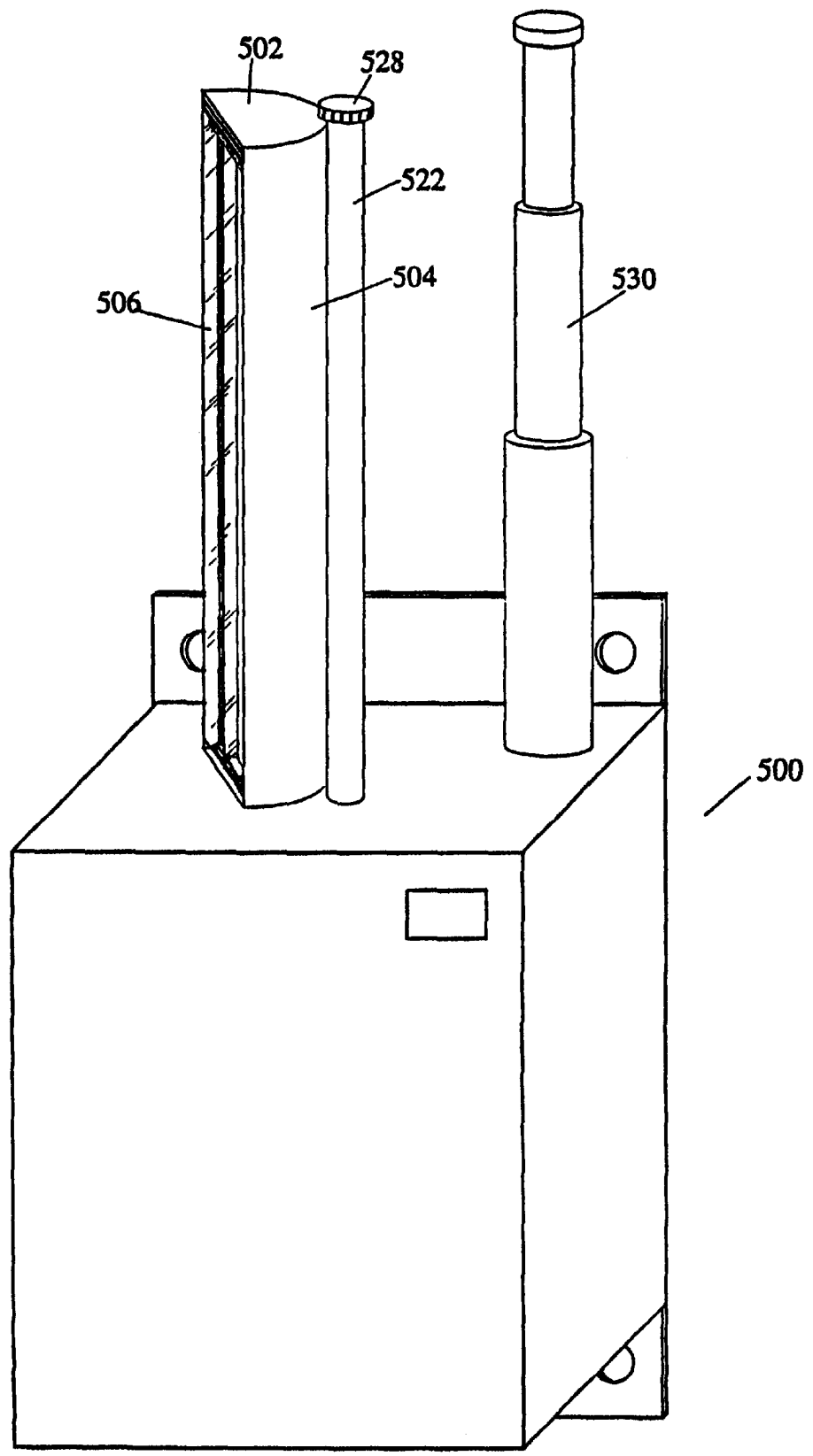
FIG. 45 is a perspective view of an inventive radio signal transmitting/receiving unit for use with a radio communication system.

FIG. 45 is a perspective view of an inventive radio signal transmitting/receiving unit 500 for use with a radio communication system. In accordance with this aspect of the invention, the radio signal transmitting/receiving unit 500 transmits a radio signal to a mobile receiver, such as a hand-held cellular telephone, or the like. The inventive radio signal transmitting/receiving unit 500 transmits the radio signal via an antenna assembly 502. The radio communication system includes at least one of the inventive radio signal transmitting/receiving units 500. For example, the radio communication system may be a distributed array in which a plurality of radio signal transmitting/receiving units 500 are linked in communication with a base station or other telephone network system, such as a ground-based cell site antenna tower or orbiting satellite. The inventive antenna assembly 502 includes a shielding side 504 comprised of at least one shielding material. The shielding material is effective to prevent the transmission of at least a portion of a radio signal. A transmission side 506 is defined by the shielding material. The transmission side 506 of the inventive antenna assembly 502 is effective to allow the transmission of at least a portion of the radio signal to the mobile receiver. A driven antenna member 508 (shown in FIGS. 47(a)–(c)) is driven by a communication circuit of the radio signal transmitting/receiving unit 500. The driven antenna member 508 transmits the radio signal to the mobile receiver, such as a hand held cellular telephone, or car telephone. The radio signal is transmitted at the transmission side 506 of the antenna assembly 502 and is blocked from transmission through the shielding side 504 of the antenna assembly 502. Further, directing means direct at least a portion of the radio signal toward the transmission side 506, so as to control a radiation pattern of the radio signal transmitted from the antenna.

Figure 47A:
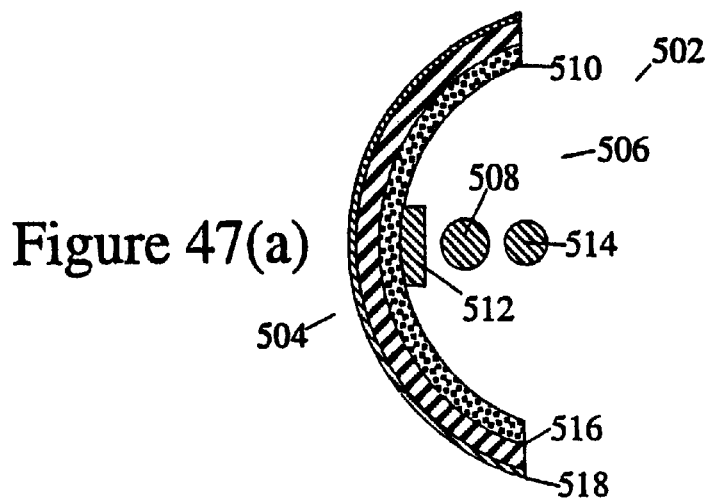
FIG. 47(a) is a cross-sectional view of an inventive antenna assembly showing a shielding side construction.
Figure 47B:
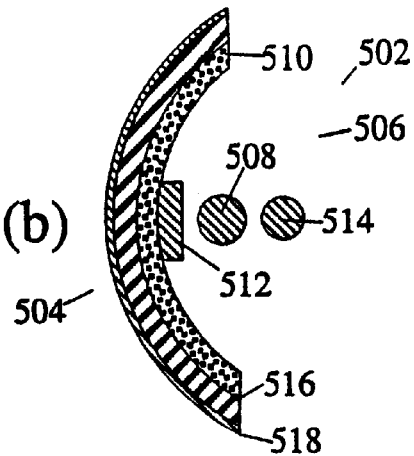
FIG. 47(b) is a cross-sectional view of an inventive antenna assembly having a relatively smaller shielding side construction as compared with the construction shown in FIG. 47(a)
Figure 47C:
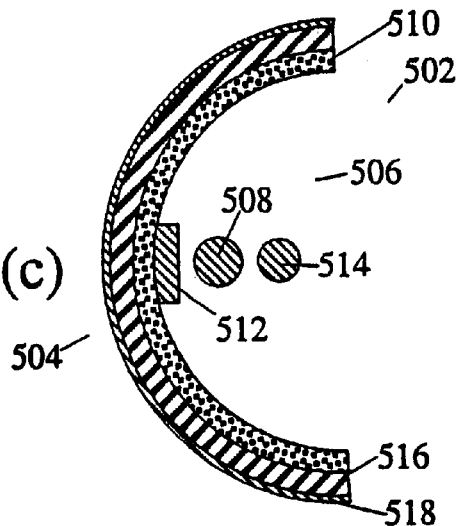
FIG. 47(c) is a cross-sectional view of an inventive antenna assembly having a relatively larger shielding side construction as compared with the construction shown in FIG. 47(a)

Referring to FIGS. 47(a)–47(c), applicants have experimentally determined that an antenna assembly 502 constricted substantially as shown is effective to provide a reduction in the radiation pattern emitted from the driven antenna member 508 toward the shielding side 504 of the antenna assembly 502, while obtaining an enhanced radiation pattern of the radio signal transmitted through the transmission side 506 of the antenna assembly 502. Thus, in accordance with the inventive antenna assembly 502, the shielding material comprises a radiation absorber member 510 disposed at the shielding side 504. Further, the directing means comprises at least one of a first parasitic element 512 disposed between the driven antenna member 508 and the radiation absorber member 510, and a second parasitic element 514 disposed at the transmission side 506. At least one of the first and the second parasitic elements 512,514 is disposed from the drive antenna member 508 at a gap distance that is effective to direct a portion of the radio signal toward the transmission side 506. Preferably, if the gap is an air gap, this gap distance has the nominal proportion of ¹⁄₁₀th of the wave length of the transmitted radio signal. However, as described above with reference to, for example, FIG. 34(a), this gap distance can be reduced by disposing a dielectric member in the gap distance between at least one of the first and the second parasitic elements 512,514 and the driven antenna member 508. The dielectric member has a dielectric constant that is effective to reduce the gap distance necessary to direct the portion of the radio signal toward the transmission side 506. Also, the shielding material located at the shielding side 504 of the inventive antenna assembly 502 may also include a support element 516 and a conductive shell member 518 disposed at the shielding side 504. The degree to which the shielding side elements wrap around the antenna elements can be varied depending on the anticipated use of the antenna assembly 502, and the desired radiation pattern to be emitted. For example, the shielding side elements of FIG. 47(b) wrap less around the antenna elements as compared with FIG. 47(a). The antenna assembly 502 of FIG. 47(b) will emit a radiation pattern having a broader spread, and thus produce a wider zone of coverage. On the other hand, the shielding side elements of the antenna assembly 502 shown in FIG. 47(c) wrap farther around the antenna elements as compared with FIG. 47(a). In this case, a narrower radiation pattern will be emitted, having a narrower zone of coverage. Thus, in accordance with the present invention, a radiation pattern can be obtained having predetermined characteristics.

The radiation pattern obtained from an antenna assembly constructed as described herein has a number of advantages over the prior art. The front to back ratio, as graphically illustrated in FIGS. 57(a) and 57(c), demonstrates the directionality of the radio signal emanating forward away from the radio signal transmitting device, and thus directly away from the user. This directionality has been empirically shown to enhance the transmitted signal as compared with the conventional art.

A conventional radio signal transmitting device, such as a cellular telephone or PCS telephone typically utilize a monopole antenna design. A monopole antenna provides an omni-directional radiation pattern, transmitting the radio signal more or less equally in all directions. However, the use of an antenna that produces an omni-directional antenna pattern has now been shown to have deleterious effects, due to the absorption of the radiation emitted by the antenna by the body, particularly, the head, of the user. The body and particulalry the head of the user is known to absorb a significant portion of the radiation signal transmitted from a conventional antenna of a radio signal transmitting device, such as a cellular telephone. This absorbed portion of the radio signal reduces the effectiveness of the wireless communication with a remote receiver, such as a terrestrial cell site antenna. This absorbed portion of the radio signal also squanders the limited supply of energy available from battery of the radio signal transmitting device. Further, there is a growing body of evidence suggesting that this absorbed radiation has potentially serious health consequences for the user.

Conventionally, directionality of a radio signal transmitted (or received) by an antenna of a radio signal transmitting device, such as a PCS or cellular telephone, is considered less desirable than an omni-directional signal (such as that obtained by a conventionally used monopole antenna). However, the inventive antenna assembly has been experimentally shown to have superior performance characteristics as compared with a standard laboratory monopole antenna, and due to the directionality of the signal emitted and shielding, to prevent unwanted exposure of the user to radiation.

Figure 46A:
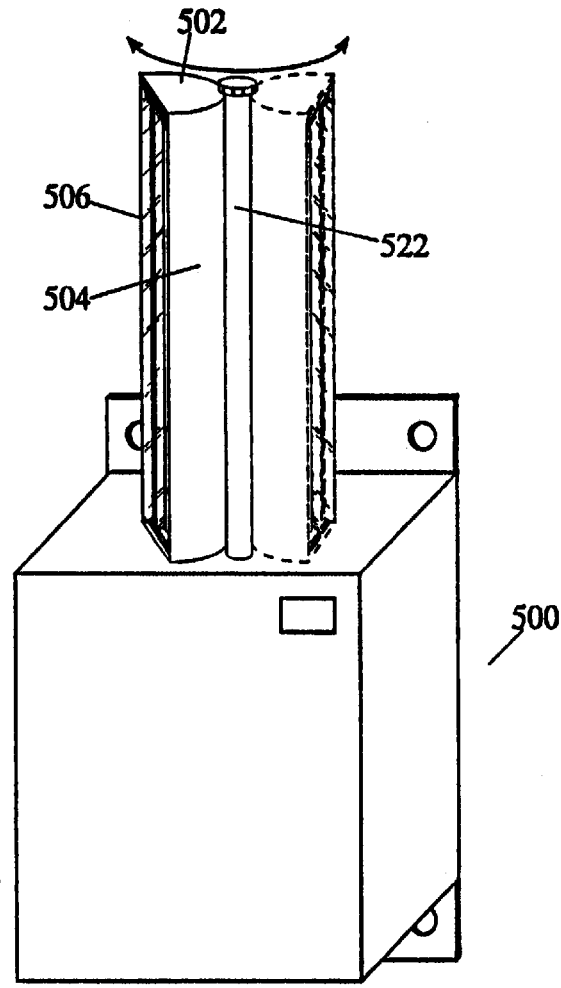
FIG. 46(a) is a perspective view of an embodiment of the inventive radio transmitting/receiving unit having a pivotally mounted inventive antenna assembly.
Figure 48:
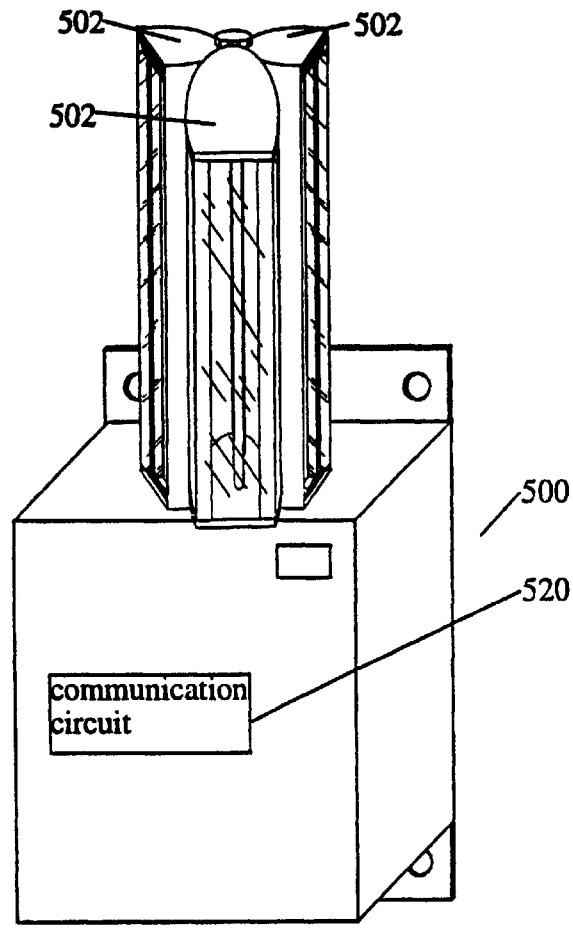
FIG. 48 is a perspective view of an inventive radio signal transmitting/receiving unit having a plurality of mounted inventive antenna assemblies.

As shown in FIG. 48, in accordance with the inventive radio signal transmitting/receiving unit 500, a communication circuit 520 is provided for generating a radio signal to be transmitted to at least one mobile receiver. The inventive antenna assembly 502 is mounted on the radio signal transmitting/receiving unit 500 and includes a driven antenna member 508 that is driven by the communication circuit 520 for transmitting the radio signal to the mobile receiver. The antenna assembly 502 further includes radiation controlling means for controlling the radiation pattern of the radio signal transmitted by the antenna. The radiation controlling means comprises at least one radiation shielding material disposed at the shielding side 504 of the antenna assembly 502. The shielding material is effective to prevent the transmission of at least a portion of the radio signal in an unwanted direction. The shielding material comprises at least one of a radiation blocker, a radiation absorber, and a radiation reflector. The radiation controlling means may comprise directing means for directing at least a portion of the radio signal toward the transmission side 506 of the antenna assembly 502 so as to control the radiation pattern of the radio signal transmitted from the antenna. The advantages of this approach include providing an antenna assembly having a superior front-to-back ratio (as demonstrated experimentally and shown in FIGS. 57(a) and 57(b)). The front-to-back ratio allows the transmitting/receiving unit 500 to reject signals originating from unwanted directions which would interfere with the reception of desired signals. The directing means comprises at least one of a first parasitic element 512 (acting as a reflector) disposed between the antenna and the shielding side 504, and a second parasitic element 514 (acting as a director) disposed at the transmission side 506. At least one of the first and the second parasitic elements 512,514 are disposed from the antenna at a gap distance effective to direct a portion of the radio signal toward the transmission side 506. As shown in FIG. 46(a), the inventive radio signal transmitting/receiving unit 500 may further include mounting means 522 for mounting the antenna assembly 502. The mounting means 522 includes at least one pivoting joint 524 for pivotally supporting the antenna assembly 502 to enable adjustment of the directionality of the radio signal transmitted from the antenna at the transmission side 506. Thus, as shown in FIG. 46(a), the antenna assembly 502 may be moved into a selected position so as to direct the radio signal emitted from the antenna in a particularly advantageous direction.

Figure 46B:
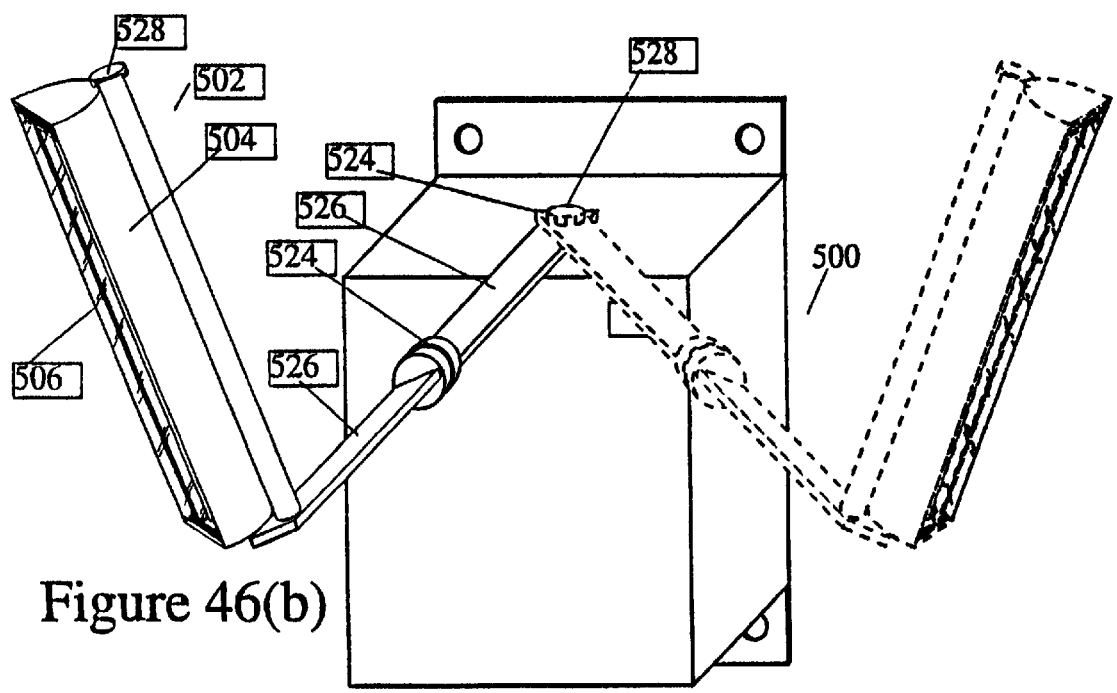
FIG. 46(b) is a perspective view of an embodiment of the inventive radio transmitting/receiving unit having a pivotally mounted extension arm for supporting a pivotally mounted inventive antenna assembly.

Further, as shown in FIG. 46(b), the antenna assembly 502 may be mounted on an extension arm 526 which is mounted on the radio signal transmitting/receiving unit 500 at a pivoting joint 524. An adjustment knob 528 may be provided for adjusting the position of the extension arm 526 relative to the radio signal transmitting/receiving unit 500. Another pivoting joint 524 may be provided on the extension arm 526 for allowing one portion of the extension arm 526 to pivot relative to the other portion of the extension 526. The inventive antenna assembly 502 may be mounted to the extension arm 526 by another pivoting joint 524, thus allowing for a high degree of flexibility in the positioning of the antenna assembly 502, while disposing the antenna assembly 502 at an appropriate distance from, for example, a wall on which the radio signal transmitting/receiving unit 500 is mounted. Referring again to FIG. 48, mounting means 522 can be provided for mounting a first antenna assembly 502 and at least one additional antenna assembly 502. Each antenna assembly 502 has a respective antenna driven by the communication circuit 520 for transmitting a radio signal to a mobile receiver. Each antenna assembly 502 has a respective radiation controlling means, such as the shielding material, for controlling the radiation pattern of the radio signal transmitted to the mobile receiver. Each of the antenna assemblies 502 is mounted on the radio signal transmitting/receiving unit 500 so that at least a portion of the radio signal transmitted from the antenna of the first antenna assembly 502 and at least a portion of the radio signal transmitted from the respective antenna of each additional antenna assembly 502 are directed in different directions relative to each other. This enables simultaneous radio communication using a same radio frequency between the antenna assembly 502 and the first mobile receiver, and between each additional antenna assembly 502 and additional mobile receivers. Further, as shown in FIG. 45, a separate receiving antenna 530 may be electrically connected to the communication circuit 520 for receiving a radio signal from the mobile receiver.

Figure 49:
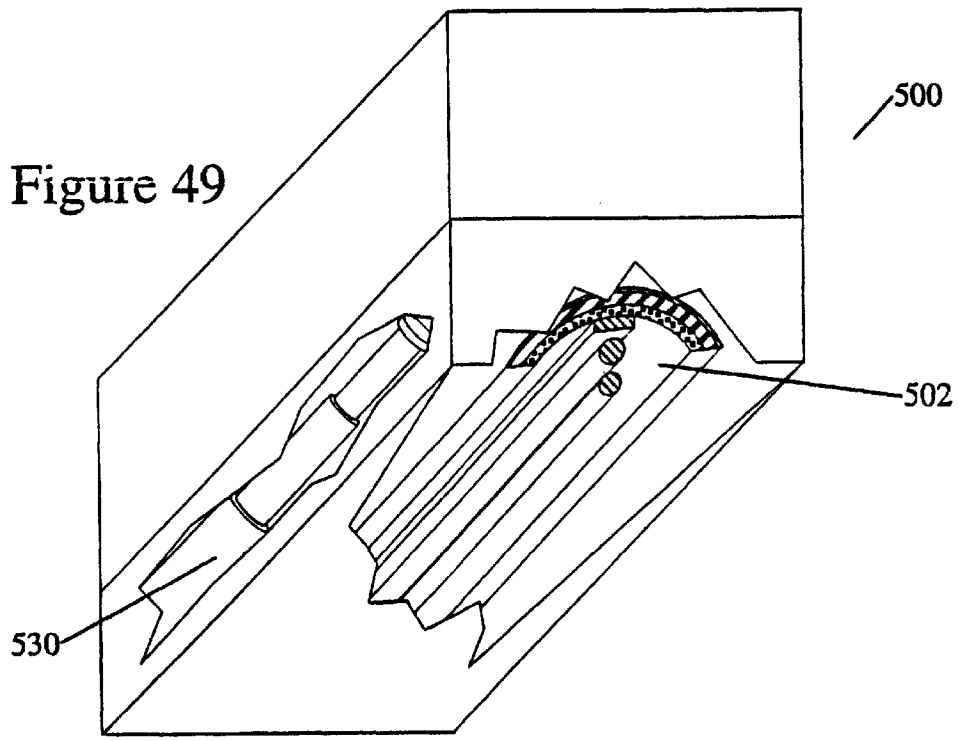
FIG. 49 is a cut-away perspective view of another embodiment of an inventive radio signal transmitting/receiving unit for use with a telephone-pole-based radio communication system.
Figure 51:
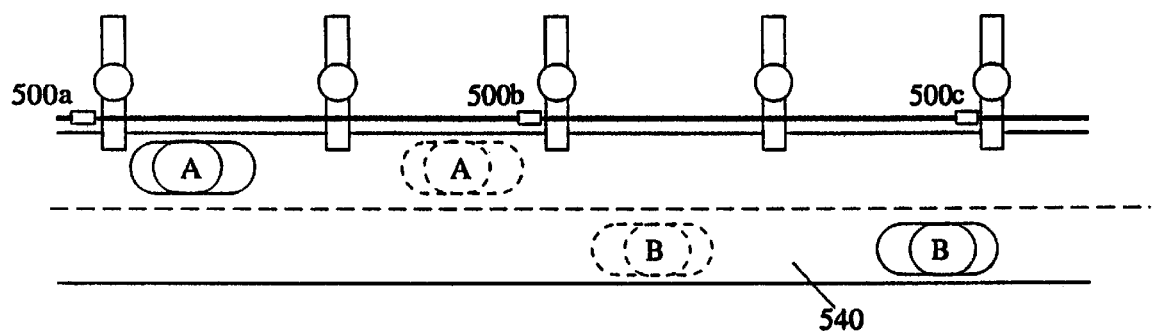
FIG. 51(a) is an illustration schematically showing the use of a telephone-pole-based radio communication system having a plurality of inventive radio signal transmitting/receiving units as shown in FIG. 49.

FIG. 49 is a cut-away perspective view of another embodiment of an inventive radio signal transmitting/receiving unit 500 for use with a telephone-pole-based radio communication system. In accordance with this aspect of the invention, an antenna assembly 502 constructed as shown, for example, in FIGS. 47(a)–47(c), is used for the transmission of a radio signal to mobile receivers. A directed radio signal is transmitted through the transmission side 506 of the antenna assembly 502. This embodiment of the inventive radio signal transmitting/receiving unit 500 is hung from wires (telephone, electrical, cable television) supported by telephone poles. An array of such radio signal transmitting/receiving units 500 forms an interconnected network to enable communication via mobile units (hand-held telephones). There are many places where a ground-based cell site antenna 364 (shown in FIG. 31(a)) is impractical for communication purposes. Often times a structure, such as a mountain or building, prevents a clear radio signal to be transmitted from a ground-based cell site antenna 364 to a mobile receiver. It may not be practical to erect another ground-based cell site antenna tower to increase communication coverage due to prohibitive costs or lack of a suitable location to place the tower. In such cases, as will be described in more detail with reference to FIG. 51, the inventive radio signal transmitting/receiving unit 500 shown in FIG. 49 provides an effective solution.

Figure 50A:
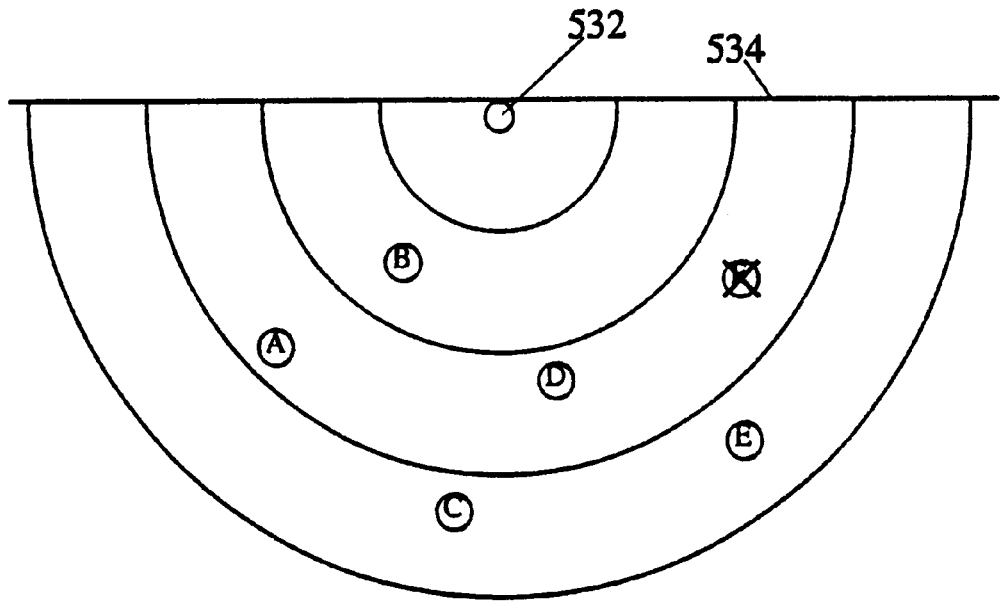
FIG. 50(a) is a illustration schematically showing the use of a conventional prior art radio signal transmitting/receiving unit.

FIG. 50(a) is an illustration schematically showing the use of a conventional prior art radio signal transmitting/receiving unit of a distributed antenna array (DAA) used in a wireless personal communication service (PCS). Typically, a PCS system is installed to provide communication coverage where a cellular telephone system using a ground-based cell site antenna, for example, is lacking. An example of a conventional radio signal transmitting/receiving unit used in a PCS system is marketed by PCS Wireless, Inc., Vancouver, B.C. Canada. The conventional unit includes an omni-direction driven antenna member 532 for transmitting to mobile receivers. The radiation pattern of the radio signal emitted by the omni-directional drive antenna member 532 extends in all directions. A zone of coverage of the omni-directional radio signal is dependent on such things as the power used to drive the antenna member 532, the proximity to structures, such as walls and ceilings, and the proximity to other radio signal transmitting/receiving units of the same DAA. In FIG. 50(a), the conventional omni-directional driven antenna member 532 is shown disposed against a wall 534, such as it may be when used as part of a DAA system installed in a shopping mall, underground train station or office building. Since there is a finite radio frequency spectrum available for a PCS system, there is a finite capacity of the number of users who can simultaneously communicate via each radio signal transmitting/receiving unit of a DAA. In the example schematically shown in FIG. 50(a), the capacity of the radio frequency spectrum is five simultaneous users. Each user receives a radio signal from the driven antenna member 532 having a different frequency. Therefore, users A–E can simultaneous communicate using the radio signal transmitting/receiving unit having the omni-directional driven antenna member 532. Since the radio frequency, in this example, is saturated with users A–E, another user (user F) is unable to use the PCS system unless he goes into the coverage zone of another radio signal transmitting/receiving unit of the DAA, or waits until one of the users A–E is off the system.

Figure 50B:
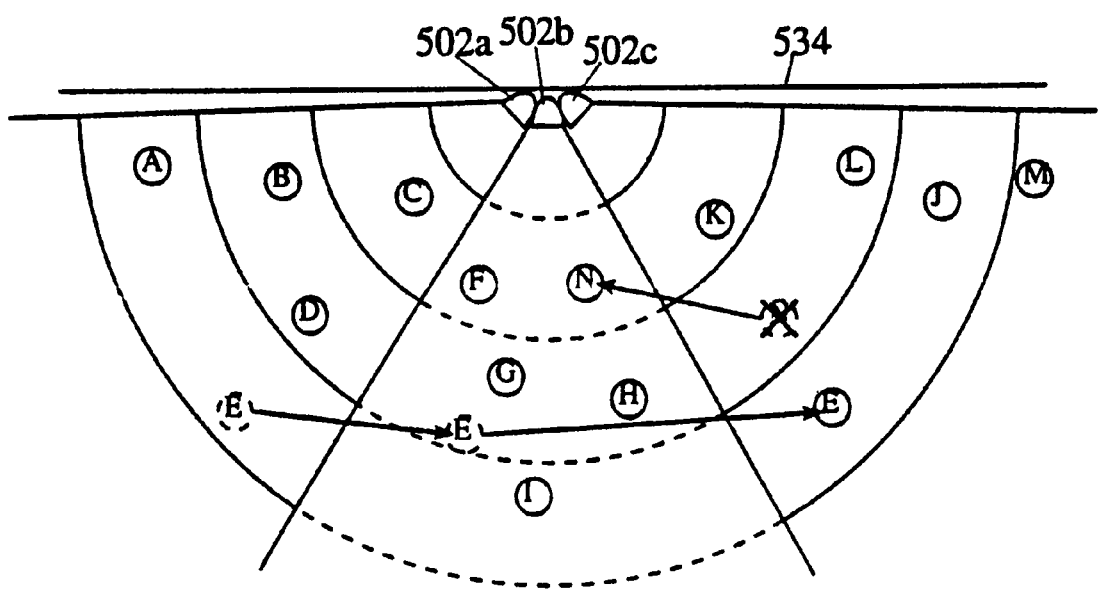
FIG. 50(b) is an illustration schematically showing the user of the embodiment of the inventive radio signal transmitting/receiving unit shown in FIG. 48.

In accordance with the present invention, the directional nature of the radio signal transmitted by the inventive antenna assembly 502 enables a substantial increase in the number of simultaneous users within a zone of coverage of each radio signal transmitting receiving unit of a DAA. As schematically shown in FIG. 50(b), the zone of coverage of the inventive radio signal transmitting/receiving unit shown in FIG. 48 includes two or more (in this example, three) sub-zones, each associated with one of the three antenna assemblies 502a–502c. Since the radio signal transmitted by each antenna assembly 502 is directional, each respective sub-zone can accommodate the same number of users as is accommodated within the single zone of coverage of the conventional omni-directional driven antenna member 532 shown in FIG. 50(a). In the example shown, the radio frequency spectrum has a capacity of five simultaneous users. Thus, in accordance with the present invention, the three antenna assemblies 502a–502c of the inventive radio signal transmitting/receiving unit 500 can accommodate a total of fifteen simultaneous users.

In the example schematically shown in FIG. 50(b), the antenna assembly 502a has users A–D within it sub-zone of coverage. User E starts out in the sub-zone of the antenna assembly 502a, but then walked into the sub-zone covered by the antenna assembly 502b. This sub-zone already had users F–I, and since the capacity of five simultaneous users was not yet reached, user E was handed-off from the antenna assembly 502a to the antenna assembly 502b. The hand-off operation is similar to that of a typical cellular telephone hand-off, and will not be discussed in much detail here. In the case of a digital PCS system, the radio signal transmitted by each user (mobile unit) to the radio signal transmitting/receiving unit includes a packet of digitally encoded hand-shake information unique to the mobile unit. During the hand-off, this hand-shake information is used to seamlessly transfer the user between the antenna assemblies 502a–502c. The communication circuit 520 of the inventive radio signal transmitting/receiving unit 500 drives each antenna assembly 52a–502c to allow the required hand-offs. Thus, as user E continues walking into the sub-zone covered by the antenna assembly 502c, another hand-off occurs from the antenna assembly 502b. The antenna assembly 502 c now has simultaneous users E and K–M using it for communication. Thus, the capacity of this sub-zone is saturated with five simultaneous users. When user N attempts to make a call, he cannot be in the sub-zone of the antenna assembly 502c. However, since the capacity of the sub-zone covered by the antenna assembly 502 b is not saturated, user N simply has to walk a few steps to make his call.

The above example illustrates the advantages of the inventive antenna assembly 502 (and antenna assembly 600, described below), which enables an increase in system capacity over the conventionally art. The key to this increase is the superior front-to-back ratio, which eliminates, for example, user M from interfering with users A–D. The inventive antenna assembly 502 (or antenna assembly 600) obtains superior performance characteristics (empirically measured for antenna assembly 600, and graphically illustrated in FIGS. 57(a)–57(d)) in a smaller size than that conventionally required.

FIG. 51(a) is an illustration schematically showing the use of a telephone-pole-based radio communication system having a DAA consisting of a plurality of the inventive radio signal transmitting/receiving units 500 shown in FIG. 49. The transmitting/receiving units 500a–500c are hung from a wire 536 supported on a series of telephone poles 538 lining a street 540. Since the inventive antenna assembly 502 transmits a directional signal, signal strength that would be ineffective for communication (i.e., transmitted from a conventional omni-directional antenna skyward) is not wasted. Rather, the radio signal is directed toward the intended coverage zone, in this case, the portion of the street 540 that is below the respective radio signal transmitting/receiving units 500a–500b. In this example, car A travels the street 540 from left to right and car B travels from left to right. Car A is initially in the zone of coverage of radio signal transmitting/receiving unit 500a, but at a later time enters the zone of coverage of radio signal transmitting/receiving unit 500b (shown in dashed lines). Thus, as car A leaves the zone of coverage of radio signal transmitting/receiving unit 500a it is handed-off to radio signal transmitting/receiving unit 500b as car A. A similar hand-off occurs between radio signal transmitting/receiving unit 500c and radio signal transmitting/receiving unit 500b for car B. By disposing a plurality of radio signal transmitting/receiving unit 500 in a DAA of a PCS, communication coverage can be provided where it is not practical to erect a ground-based cell site antenna. This system can be disposed in specific regions, such along river valleys, in rural areas, or within tunnels, where it has typically not been practical to extend cellular telephone capabilities by erecting addition towers. The PCS system thus formed can communicate with an existing cellular telephone system via radio signal using a home-base unit associated with the DAA of radio signal transmitting/receiving units 500, or can be directly wired to the telephone or cable TV wires supported by the line of telephone poles.

Figures 54A, 54B:
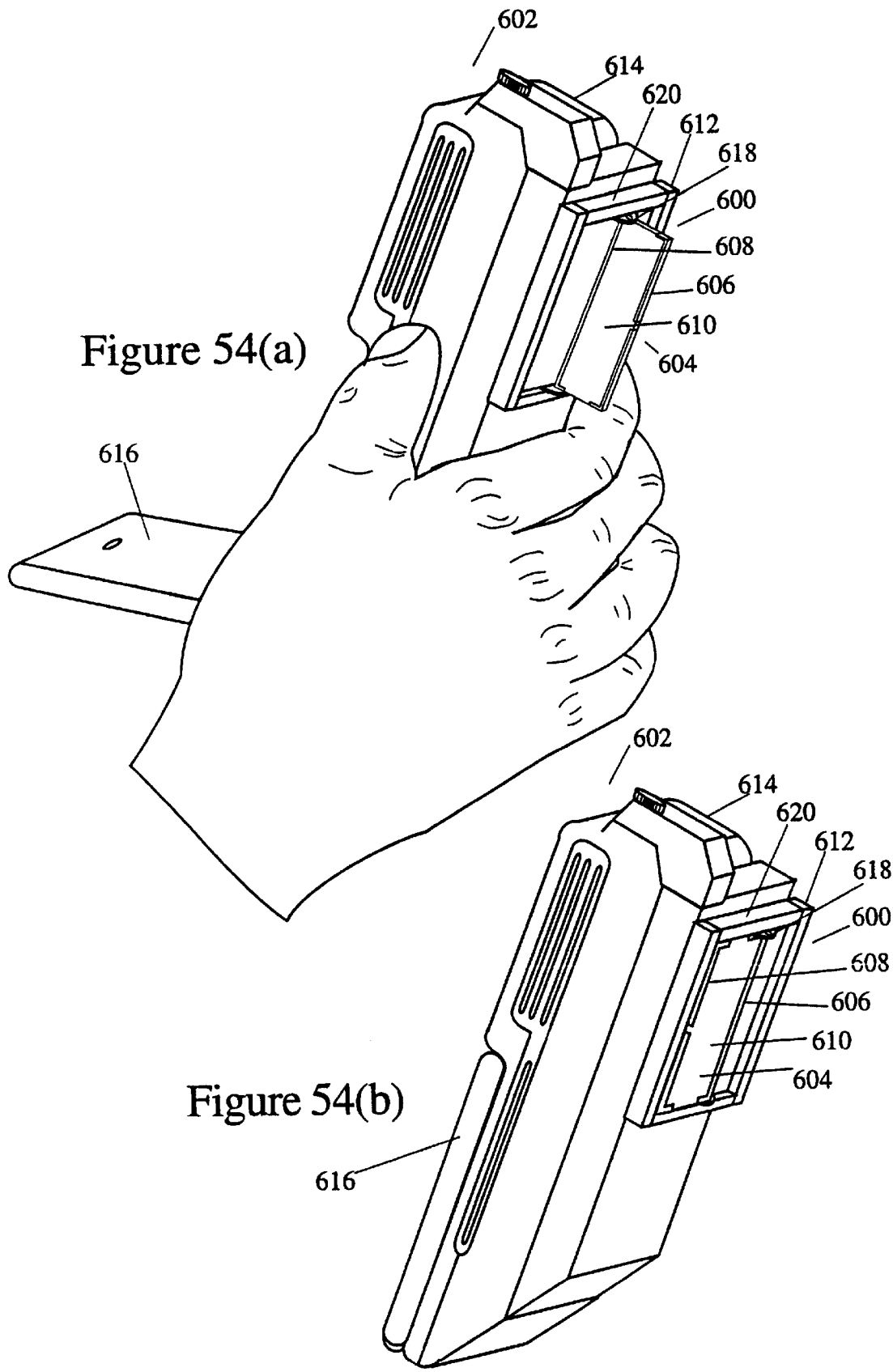
FIG. 54(a) is a perspective view of an embodiment of an inventive antenna assembly retrofitted on a radio signal transmitting device, such as a cellular telephone, the mouthpiece of the radio signal transmitting device and the antenna assembly being in in-use, deployed positions.
FIG. 54(b) is a perspective view of the embodiment of the inventive antenna assembly shown in FIG. 52(a), the mouthpiece of the radio signal transmitting device and the antenna assembly being in stand-by, stowed positions.

Referring to FIGS. 52(*a*)–52(*d*), an embodiment of an antenna unit 604 of an inventive antenna assembly 600 is shown. The inventive antenna assembly 600 is for transmitting a radio signal from a radio signal transmitting device 602, such as a cellular telephone 614, PCS handset, handheld radio, walkie-talkie or the like (shown in FIGS. 54(*a*) and 54(*b*)). The antenna unit 604 is comprised of a driven antenna member 606 for transmitting a radio signal from the radio signal transmitting device 602. A radiation reflector 608 reflects the radio signal transmitted by the driven antenna member 606. Support member 610 supports the driven antenna member 606 and the radiation reflector 608 so that a predetermined gap is maintained therebetween. A coax cable 621 couples the driven antenna member 606 with a signal generation circuit of the radio signal transmitting device 602. The coax cable 621 may pass through a through-hole in the support member 610 and soldered or mechanically fixed to the driven antenna member 606. In the embodiment shown in FIGS. 52(*a*) and 52(*b*), both the driven antenna member 606 and the radiation reflector 608 are formed of a thin foil fixed to the support member 610. In the embodiment shown in FIGS. 52(*c*) and 52(*d*), the driven antenna member 606 is formed of a thin foil, and the radiation reflector 608 is formed of a thin metallic wire. Alternatively, both the driven antenna member 606 and the radiation reflector 608 may be formed of a metallic wire, or the driven antenna member 606 may be a metallic wire and the radiation reflector 608 a thin foil. Other embodiments include a double-sided printed circuit board having an metal layer forming the radiation reflector 608 and driven antenna member 606. The embodiments of the inventive antenna assembly 600 tested by the applicants have a thin foil driven antenna member 606 and a metallic wire radiation reflector 608. A wide range of conductive material, such as metal foils and wires, conductive polymers, etc., can be utilized in forming the radiation reflector 608 and driven antenna member 606 elements. Specific embodiments of the inventive antenna assembly 600 have been constructed and tested by applicants. The specific construction and a summary of the test results is provided herein with reference to FIGS. 57(*a*)–57(*d*).

As shown in FIGS. 53(*a*) and 53(*b*), a shielding member 612 is provided for shielding a portion of the radio signal transmitted by the driven antenna member 606 in a direction towards the shielding member 612. The radio signal transmitted from the driven antenna member 606 at radiates in directions both towards the radiation reflector 608 and away from the radiation reflector 608. Unlike a conventional monopole cellular or PCS antenna which have an omnidirectional radiation pattern, in accordance with the present invention, the radiation that propagates toward the radiation reflector 608 is reflected back towards the driven antenna member 606. Radiation that propagates towards the radiation reflector 608 that is not reflected back is blocked by the shielding member 612 to prevent exposure of the user of the radio signal transmitting device 602.

The inventive antenna assembly 600 shown in FIGS. 53(*a*) and 53(*b*) consist of a dipole driven antenna member 606 and radiation reflector 608 that are mounted on a dielectric support member 610, thus forming the antenna unit 604. The antenna unit 604 is backed with a metal shield 617 and radiation absorber 619 sandwich (shielding member 612), which can be flat (FIG. 53(*a*)) or curved (FIG. 53(*b*)). A flat shielding member 612 allows for a thinner profile when the antenna unit 604 is folded to the stowed position, while a curved shielding member 612 may have advantages in blocking and/or reflecting radiation emitted in a direction toward the user. The dimensions of the inventive antenna assembly for cellular telephone implementation in the frequency range of about 800 to 900 MHz is approximately twice that as the dimensions for PCS communication purposes in the frequency is about 1.8 to 1.9 GHz. The dipole driven antenna member 606 is center fed with the coaxial cable 621 which may be soldered to the elements of the dipole driven antenna member 606. The inventive antenna assembly may be interfaced with the radio signal transmitting device through a matching network, if necessary. However, applicants have discovered that an antenna assembly 600 constructed as described herein typically does not require a matching network when coupled with a conventional communication circuit of a cellular telephone or PCS telephone. This achievement is due to the appropriately selected materials, geometry and positions of the various elements of the inventive antenna assembly 600, and has the great advantages of reducing the cost and size of the radio signal transmitting device. As an example, applicants have demonstrated a ½ wave dipole assembly that operates very effectively in the cellular frequency range between 800 and 900 MHz (around 830 MHz during transmission), with a length of only 4 inches verses 6.25 inches normally expected or considered state of the prior art. Applicants expect that a length of about 3 inches is achievable with the appropriate selection of materials.

Most importantly, applicants have achieved a significant size reduction as compared with the conventional art. For example, a typical conventional ½ wave dipole antenna for cellular frequency transmission/reception has a length of approximately 6.25 inches. In accordance with the present invention, an effective transmission/reception antenna for the same 800 to 900 MHz wavelength has a length of 4 inches, or less. Similar relative size reduction has been demonstrated for a PCS antenna. This considerable size reduction allows for a more compact radio signal transmitting device, an especially important consideration for portable hand-held communication devices, such as cellular or PCS telephones.

The design of the inventive antenna assembly 600 is optimized by taking into consideration the effects of the radio signal transmitting device that it will be used with. Conventionally, an antenna must be designed for use with a radio signal transmitting device 602 taking into consideration the effect the user will have on the antenna performance characteristics. Stated otherwise, simply taking into account the effects of the handset of a radio signal transmitting device 602 is not enough when properly designing an antenna. Since the user is in very close proximity to the antenna when it transmits a radio signal, the effects of absorption, reflection, etc. of the radio signal by the user's body (which may vary between users) must conventionally be taken into consideration to obtain the most effective antenna design.

In accordance with the present invention, on the other hand, the user is isolated from the driven antenna member 606 by the shielding member 612, and further, the radio signal is directed away from the user by the radiation reflector 608. Thus, the presence of the user does not have the same implications in the optimization of the antenna assembly 600, as compared with the conventional art. This greatly simplifies the variables (such as the geometry, placement and material composition of the components such as the driven antenna member 606, the radiation reflector 608, etc.) which must be taken into consideration when matching the design of the inventive antenna assembly 600 to a particular type of radio signal transmitting device 602. In accordance with the present invention, the exact design of the inventive antenna assembly is adjusted to match the characteristics of a particular type of radio signal transmitting device 602. For example, some cellular telephones include a metallic circuit shielding layer on the inside surfaces of the handset housing. This metallic layer affects the performance of an antenna associated with the cellular telephone. Applicants have discovered that the performance of the antenna member 606 when it is associated with a particular type of radio signal transmitting device 602 can be optimized by adjusting the relative positions, geometry and material composition of the various components of their inventive antenna assembly 600. In many applications, the optimization available with the design of the inventive antenna assembly 600 can eliminate the traditionally required matching circuit for matching the antenna to the impedance characteristics of the particular type of radio signal transmitting device 602. This elimination of the need for a matching circuit reduces the cost, complexity and overall size of the device.

As shown, the antenna unit 604 is mounted on pivotal mounts 622, so as to allow it to be folded to the back of the radio signal transmitting device 602 to facilitate carrying when not in use or when in the stand-by mode. The antenna unit 604 is mounted to a housing 625 which may be made of plastic, and which contains the shielding member 612 comprised of the radiation absorber 619 and metallic shield 617.

As shown in FIGS. 53(*a*) and 53(*b*), the coaxial cable 621 is electrically connected to the driven antenna member 606 to provide the radio signal from a transmission/reception circuit of the radio signal transmitting device 602. The driven antenna member 606 is preferably a dipole antenna that includes a first segment 613 and a second segment 615. As shown in FIG. 53(*a*), the first segment 613 and the second segment 615 may have a folded portion 627 and an unfolded portion 629. The folded portion 627 is effective for reducing the overall length of the dipole driven antenna member 606, while providing an effective antenna length for transmitting the radio signal. Stated otherwise, the effective electrical length of the driven antenna member 606 is substantially ¼ of the wave length of the transmitted radio signal (i.e., the driven antenna member 606 behaves like a conventional ¼ wave dipole antenna), while the overall length (due to the folded portions 627) is less than that of the effective length. Also, the radiation reflector 608 may have an unfolded portion 631 and a folded portion 633. The folded portion 633 of the radiation reflector 608 is effective for reducing the overall size of the radiation reflector 608, while providing an effective length for reflecting the radio signal transmitted by the driven antenna member 606. These features allow for substantial size reduction in the antenna assembly 600, which is a major consideration for a handheld radio signal transmitting device 602, such as a cellular telephone or PCS handset. Preferably, the length of the radiation reflector 608 is about 4% longer than the overall length of the driven antenna member 606. In the embodiment shown in FIGS. 52(*c*) and 52(*d*), the radiation reflector 608 comprises a metallic wire, such as copper wire, with the folded portion 633 oriented perpendicular to the width of the driven antenna member 606. Alternatively, the radiation reflector 608 may be oriented so that the folded portion 633 is parallel to the width of the driven antenna member 606. The driven antenna member 606 is comprised of a thin metallic foil, such as copper or aluminum. The support member 610 may comprise a dielectric material, such as a polymer, printed circuit board substrate, glass, plastic or the like.

The support member 610 provides the necessary support along the length of the radiation reflector 608 and driven antenna member 606, so that the critical gap distance between these two elements is maintained. This allows the use of a thin metal foil driven antenna member 606 and thin metallic wire radiation reflector 608.

As shown in FIGS. 54(*a*) and 54(*b*), in accordance with the present invention, an antenna assembly 600 is provided which can be retrofitted on a radio signal transmitting device 602, such as a cellular telephone 614. As shown in FIG. 54(*a*), the mouthpiece 616 of the radio signal transmitting device 602 (cellular telephone 614) and the antenna assembly 600 are in an in-use, deployed position. In this position, the mouthpiece 616 of the cellular telephone 614 is in an open position for communication. The antenna unit 604 is disposed in a position whereby the driven antenna member 606 is extended away from the shielding member 612, and the orientation of the driven antenna member 606 and the radiation reflector 608 is such that the radiation reflected by the radiation reflector 608 is directed away from the user of the cellular telephone 614. In accordance with the inventive antenna assembly 600, pivotal mounting means 618 pivotally mounts the antenna unit 604, so that the antenna unit 604 is disposable at selectable positions relative to the shielding member 612.

As shown in FIG. 54(*a*), the mouthpiece 616 and the antenna assembly 600 are both disposed in their deployed positions. As shown in FIG. 54(*b*), the mouthpiece 616 of the radio signal transmitting device 602 and the antenna assembly 600 can be disposed in their stand-by, stowed positions. In these positions, the mouthpiece 616 of the radio signal transmitting device 602 is flipped closed, making the cellular telephone 614 ineffective for communication as far as a transmitted signal is concerned, but still effective for receiving an incoming signal. The antenna unit 604 of the inventive antenna assembly 600 is folded against the shielding member 612, so that radiation emitted by the driven antenna member 606 is not as effectively directed away from the user, as in the open, deployed position shown in FIG. 54(*a*). However, even when in the stand-by, stowed position, the driven antenna member 606 is still effective for the reception of a received radio signal. Further, as described below, in accordance with the inventive antenna assembly 600, the driven antenna member 606 may be available for transmitting when the antenna unit 604 is in the stowed position. In accordance with one aspect of the invention, the driven antenna member 606 does not transmit when in the stowed position, so as to protect the user from radiation emitted when the orientation of the antenna unit 604 relative to the handset is not optimum (i.e., not at the deployed position). However, in accordance with another aspect of the invention, the driven antenna member 606 is able to transmit when the antenna unit 604 is in the stowed position. To protect the user from unwanted exposure, the maximum transmittable signal power can be controlled depending on the orientation of the antenna unit 604, as described herein below.

As shown in FIGS. 54(*a*) and 54(*b*), the shielding member 612 can be configured so that it forms a well into which the antenna unit 604 folds. The shielding member 612 has walls 620 that extend in an open-box like manner into which the antenna unit 604 is received in the stowed position. If the walls 620 contain radiation shielding material, this configuration of the shielding member 612 can provide additional protection to the user against unwanted exposure when the driven antenna member 606 transmits a radio signal when in the stowed position. Alternatively, the wall 620 may be comprised of a material, such as a plastic, that allows transmission of radio waves, so that reception of a radio signal by the driven antenna member 606 is not hindered by the walls 620 when in the stowed position. The antenna assembly 600 may be disposed on the surface (as shown) of the cellular telephone 602, or may be incorporated within the housing of the cellular telephone. Additional shielding may be available for preventing unwanted exposure of the user, if the inner surfaces of the housing are plated, as is conventionally done to limit externally generated circuit noise from interfering with the radio signal transmitting device. The user is protected from unwanted radiation exposure since the inventive antenna assembly directs the radiation signal from the driven antenna member 606 away from the head and hand, and the shielding member blocks the passage of radiation that is not reflected.

FIGS. 55(a) though 55(d) show various views of the inventive antenna assembly 600 which is usable for a radio signal transmitting device 602 such as a cellular telephone 614. FIG. 55(a) is a front plan view of the inventive antenna assembly 600 having the antenna unit 604 in a deployed position. FIG. 55(b) is a front plan view of the inventive antenna assembly 600 having the antenna unit 604 in a stowed position, FIG. 55(c) is a partially cross sectional, side plan view of the inventive antenna assembly 600, and FIG. 55(d) is a partially cross sectional, top plan view of the inventive antenna assembly 600. The antenna unit 604 is positioned to one side of the shielding member 612 so that it folds flat against the shielding member 612. The support member 610 has a length $l_{sup}$ (shown in FIG. 55(c)) and a width $w_{sup}$ (shown in FIG. 55(b)). The driven antenna member 606 is supported at a face of the support member 610 at one end of the width $w_{sup}$. The radiation reflector 608 is supported at an opposing face of the support member 610 at an opposite end of the width $w_{sup}$. The shielding member 612 also has a length $l_{shd}$ (shown in FIG. 55(a)) and a width $w_{shd}$ (shown in FIG. 55(d)). In accordance with the invention, the pivotal mounting means 618 pivotally mounts the antenna unit 604 so that the width $w_{sup}$ of the support member 610 is disposable at a first position (shown in FIG. 55(b)). At this first position, the width $w_{sup}$ of the support member 610 is relatively more parallel to the width $w_{shd}$ of the shielding member 612, and preferably folds flat against the shielding member 612 so as to reduce the stowed size of the antenna assembly 600. At the first position, the driven antenna member 606 is relatively closer to the shielding member 612. At this first position, the antenna assembly 600 is disposed in the stand-by, stowed position shown, for example, in FIG. 54(b).

Figure 55J:
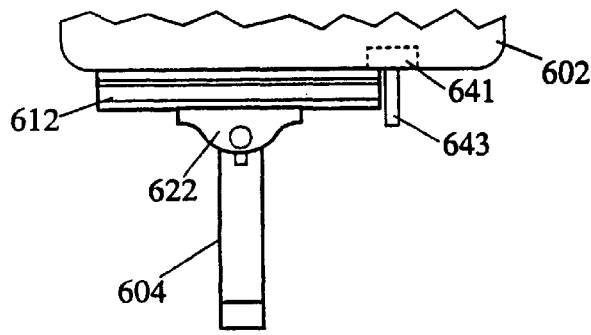
FIG. 55(j) is a top view of the inventive antenna assembly mounted on a radio signal transmitting device having the antenna unit in the deployed position, and showing a microswitch for determining the position of the antenna unit.
Figure 55K:
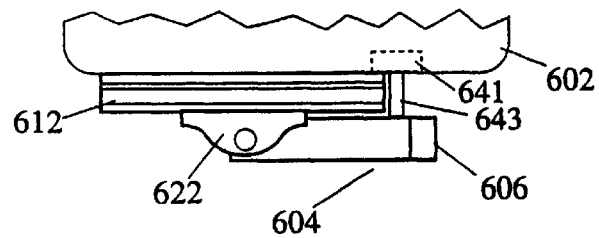
FIG. 55(k) is a top view of the inventive antenna assembly mounted on a radio signal transmitting device having the antenna unit in the stowed position, and showing a microswitch for determining the position of the antenna unit.
Figure 55L:
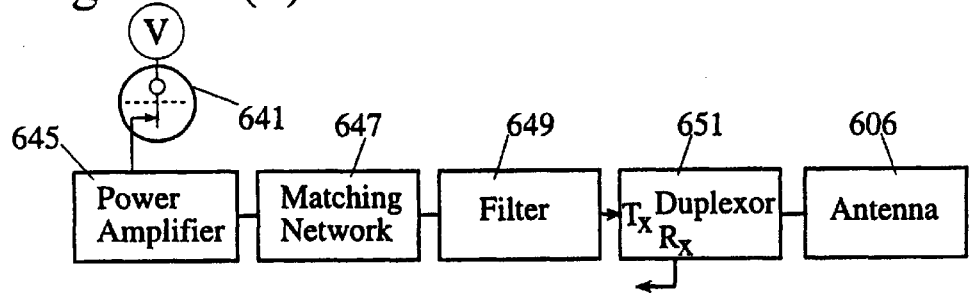
FIG. 55(l) is a block diagram of a portion of a controlling circuit utilizing the microswitch for determining the position of the antenna unit.
Figure 55M:
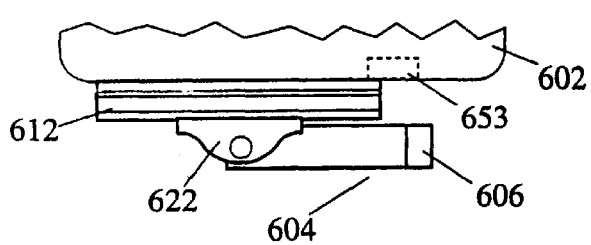
FIG. 55(m) is a top view of the inventive antenna assembly mounted on a radio signal transmitting device having the antenna unit in the stowed position, and showing a proximity detector for determining the position of the antenna unit.
Figure 55N:
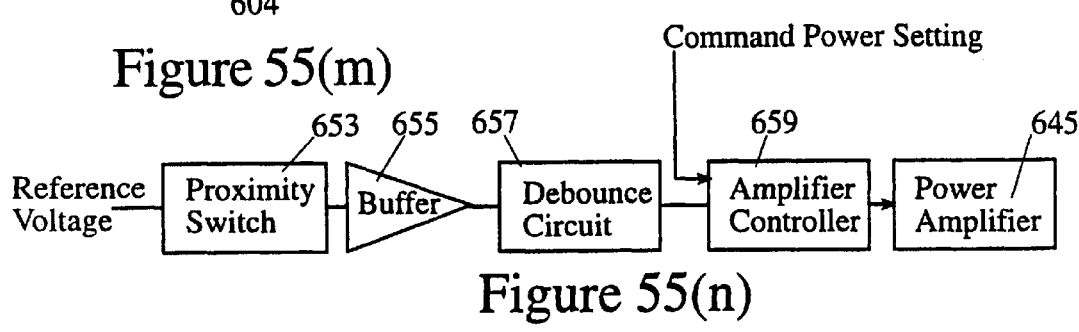
FIG. 55(n) is a block diagram of a portion of a controlling circuit utilizing the proximity detector for determining the position of the antenna unit.

As shown in FIG. 55(b), in accordance with a one configuration of the antenna assembly 600, when the antenna unit 604 is disposed at the stowed position, the driven antenna member 606 extends past the shielding member 612. By this construction, radio signals that are received by the driven antenna member 606 are not shielded by the shielding member, whether or not the antenna unit 604 is in the stowed or deployed position. Thus, when in the stand-by mode, with the antenna unit 604 in the stowed position, the radio signal transmitting device 602 can still receive incoming signals to initiate communication. As described below with reference to FIGS. 55(h)–55(n), the ability of the antenna unit 604 to transmit a radio signal can be appropriately controlled to protect the user of the radio signal transmitting device 602.

At a second position, the width $w_{sup}$ of the support member 610 is relatively more perpendicular to the width $w_{shd}$ of the shielding member 612 (shown, for example, in FIGS. 55(a), 55(c) and 55(d)). At this second position, the driven antenna member 606 is relatively farther from the shielding member 612, as shown, for example, in FIG. 54(a). In this position, the antenna assembly 600 is in the in-use, deployed position. In the in-use, deployed position, the driven antenna member 606 and the radiation reflector 608 are disposed such that the transmission of the radio signal from the driven antenna member 606 is directed away from the user of the radio signal transmitting device 602 and is most effective for communication with a remote receiver, such as a terrestrial cell site, satellite receiver, or other radio signal receiving devices.

FIG. 55(e) is an exploded view of one possible configuration of the inventive antenna assembly 600. In this configuration, the antenna unit 604 is spring loaded to facilitate disposing the antenna assembly 600 to the position shown in FIG. 54(a), at which it is most effective for communication purposes. The antenna assembly 600 includes pivotal mounts 622 having through-holes for receiving posts 624 that are integrally formed with the support member 610. Urging springs 626 are disposed around the posts 624 and fixed to both the support member 610 and the pivotal mounts 622. By this construction, the antenna unit 604 is able to swing from the first position in which the width $w_{sup}$ of the support member 610 is substantially parallel with the width $w_{shd}$ of the shielding member 612 (as shown in FIG. 55(f)). To retain the antenna unit 604 at this first position against the urging force of urging springs 626, a latch mechanism 628 may be provided. This latch mechanism 628 is schematically shown, and for clarity, only a few of the essential components are depicted. The latch mechanism 628 includes a retaining surface 630 that is fixed to an arm 634. A latch spring 636 urges the retaining surface 630 in a downward direction so that when the antenna unit 604 is brought into the first position, the retaining surface 630 is first pressed upward against the urging of the latch spring 636 to allow the antenna unit 604 to be brought into the first position, and then urged downward by the latch spring 636 into a receiving hole 637 on the support member 610. Of course, various mechanisms can be constructed for performing this position retaining function, the latch mechanism 628 depicted herein illustrates one effective construction. When the antenna unit 604 is to be deployed, the arm 634 of the latch mechanism 628 is pulled upward against the urging force of the latch spring 636, so as to remove the retaining surface 630 from within the receiving hole 637, allowing the antenna unit 604 to swing open by the exertion of the urging springs 626 around each post 624 of the antenna unit 604 (shown in exploded view in FIG. 55(e)). This latch mechanism 628 may be linked with the mouthpiece 616 (shown in FIG. 54(a)) so that when the mouthpiece 616 is flipped open, the antenna unit 604 is automatically swung into its deployed position.

In accordance with the present invention, controlling means 638 may be provided for controlling a maximum signal power transmitted by the driven antenna member 606. Typically, the terrestrial cell site or other remote receiver/transmitter sends a power level signal to the radio signal transmitting device 602. This power level signal instructs the radio signal transmitting device 602 as to what transmission signal strength is required for effective communication with the remote receiver/transmitter. The maximum signal power transmittable when the antenna unit 604 is disposed at the second position (deployed) can be controlled to be relatively greater than the maximum signal power transmittable when the antenna unit 604 is disposed at the first position (stowed). When the antenna unit 604 is disposed at the deployed position, it is most effective for providing a radio signal that is directed away from the user of the radio signal transmitting device 602. Thus, due to concerns of the potential health related hazards posed by the absorption of the microwave radiation signal transmitted by a cellular or PCS handset, it is prudent to reduce or prevent exposure of the user to the emitted radiation. At times, it may be desirable to leave the antenna unit 604 in the stowed position, so that the overall size of the cellular telephone 614 is kept to a minimum and so that the antenna unit 604 is not protruding from the back of the handset. For example, when within close range of a terrestrial cell site tower, or when using a PCS system where the PCS transmitter/receiver is in close proximity, it is probable that the driven antenna member 606 can transmit an effective radio signal at a relatively low signal power. In this case, to prevent the user of the radio signal transmitting device 602 from being exposed to unnecessary radiation, the maximum transmittable power can be set at a predetermined relatively low value. Since the terrestrial cell site, satellite or PCS transmitter/receiver typically sends the power level signal to the handheld unit thereby controlling the transmitted signal power from the antenna unit 604, a greater transmittable signal power will be called for when radio communication is hampered due to distance or interference. To prevent unwanted exposure of emitted radiation to the user, the inventive antenna assembly 600 is constructed so that a relatively lower maximum signal power is available when the antenna unit 604 is in the stowed position. When the antenna unit 604 is in the stowed position, in accordance with the present invention, the controlling means 638 controls the maximum signal power that can be transmitted from the antenna member. This maximum transmittable power is maintained at a safe level. However, when the user is at a far distance from the receiving site, terrestrial cell site, or PCS unit, or when there is radio interference, it is desirable to have a stronger transmittable signal available.

In this case, the antenna unit 604 is brought to its deployed position, so that the driven antenna member 606 it farther away from the shielding member 612, and the driven antenna member 606 and the radiation reflector 608 are oriented so that the radiation signal transmitted by the driven antenna member 606 is directed away from the user. At this position, a higher transmittable power level can be utilized since the energy is directed away from the user, and the user will not be exposed to the harmful effects of the radiation.

FIGS. 55(*h*) and 55(*i*) schematically show position determining means for determining the position of the antenna unit 604. Electrical circuit contacts 640 form a switch that enables the controlling means 638 to determine when the antenna unit 604 is in the deployed position. The antenna unit 604 has an electrical bridge contact 642 that bridges the gap between the circuit contacts, thus forming a position detection circuit for detecting when the antenna unit 604 is in the deployed position (shown in FIG. 55(*h*). When in this position, the controlling means 638 controls a signal generation circuit 644 to enable a higher relative signal power transmittable by the driven antenna member 606. However, as shown in FIG. 55(*i*), when the antenna unit 604 is in the stand-by, stowed position, the contacts 640 are not bridged and the controlling means 638 controls the signal generation circuit 644 to make the maximum signal power transmittable by the antenna member to be at the relatively lower level. The signal generation circuit 644 may be of a construction used in the communication circuitry of a typical prior art radio signal transmitting device 602. The controlling means 638 includes a power level circuit, such as that used in the communication circuitry of a typical prior art radio signal transmitting device 602. However, in accordance with the present invention, the maximum signal power available from the power level circuit is only obtained when the antenna unit 604 is in the deployed position. This feature of the controlling means 638 can be accomplished, for example, by making the maximum power available when the antenna unit 604 is in the stowed position to be a percentage of the maximum power available when the antenna unit 604 is in the deployed position through the use of a resistor circuit, variable power supply, or other electronic circuit configuration.

Preferably, the controlling means 638 is provided for controlling the transmission of the radio signal so that when the antenna unit 604 is in the closed or stowed position, it is unable to transmit radiation (but may still be available for receiving an incoming radio signal). The controlling means 638 can control the transmission of the radio signal so that the antenna unit 604 is capable of transmitting only when in the open or deployed position. This limits the transmission of radiation from the driven antenna member 606 to only times when the antenna unit 604 is disposed so that the radio signal is directed away from the user. Further, the radio signal may be transmitted from the driven antenna member 606 when the antenna unit 604 is at any position, and thus can transmit both in the stowed and deployed positions (up to the maximum transmittable power available from the radio signal transmitting device 602).

FIGS. 55(*j*)–55(*k*) schematically show another type of position determining means for determining the position of the antenna unit 604. In this case, a microswitch 641 is electrically connected with the controlling means 638 to enable the appropriate control of the radio signal transmitted by the driven antenna member 606. When the antenna unit 604 is in the deployed position (FIG. 55(*j*)), the microswitch 641 closes the circuit between a voltage source V and a power amplifier 645 of the radio signal transmitting device communication circuitry (FIG. 55(*l*)). The power amplifier 645 is electrically connected to the driven antenna member 606 through an appropriate circuit, which may include a matching network 647 (if necessary), a filter 649 and a duplexor 651. When the antenna unit 604 is brought into the closed or stowed position (FIG. 55(*k*)), a microswitch post 643 is depressed, opening the contacts of the microswitch 641, and thus preventing the power amplifier 645 from being powered by the voltage source V. Thus, in this case, the driven antenna member 606 is prevented from transmitting radiation when the antenna unit 604 is in the closed or stowed position, but is still able to receive an incoming radio signal.

FIGS. 55(*j*)–55(*k*) schematically show yet another type of position determining means for determining the position of the antenna unit 604. In this case, a proximity switch 653 is utilized to sense the existence of the antenna unit 604. The use of the proximity switch has the advantage of not influencing the antenna performance in the ways the metal contacts 640, etc. can (FIGS. 55(*h*) and 55(*i*)). The proximity switch 653 receives a reference voltage and is connected to the power amplifier 645 through an appropriate circuit which may include a buffer 655, a debounce circuit 657 and an amplifier controller 659. The proximity switch 653 thus enables the determination of the position of the antenna unit 604.

FIGS. 56(a)–56(f) show another configuration of the inventive antenna assembly 600. This configuration is particularly suited for use in a PCS communications system. The PCS radio spectrum is around 1.8–1.9 gigahertz, and thus the wavelength of the radio signal transmitted by the driven antenna member is relatively small. Because of this small wavelength, the driven antenna member 606 and/or the reflector 608 do not necessarily have to be folded. However, they can be folded to reduce the size of the inventive antenna assembly.

Figure 56B:
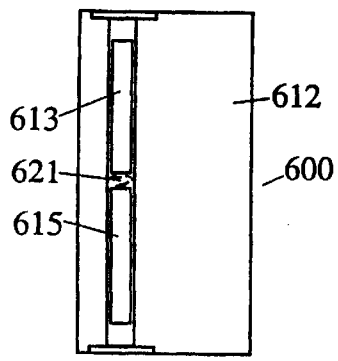
FIG. 56(b) is a front plan view of the inventive antenna assembly shown in FIG. 56(a), having the antenna unit in a deployed position.
Figure 56C:
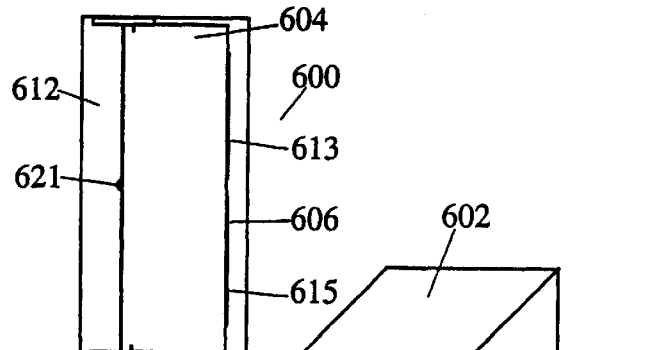
FIG. 56(c) is a front plan view of the inventive antenna assembly shown in FIG. 56(a), having the antenna unit in a stand-by, stowed position.
Figure 56D:
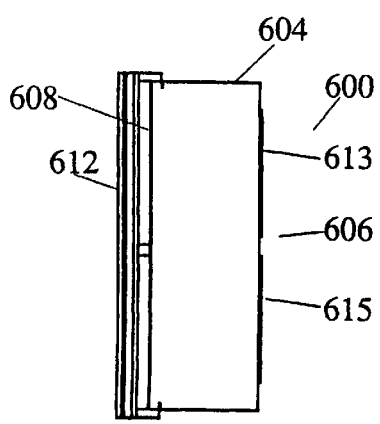
FIG. 56(d) is a partially cross sectional, side plan view of the inventive antenna assembly shown in FIG. 56(a)
Figure 56E:
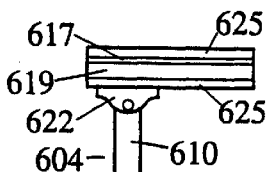
FIG. 56(e) is a partially cross sectional, top plan view of the inventive antenna assembly shown in FIG. 56(a)
Figure 56F:
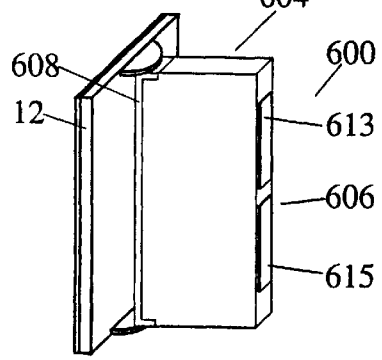
FIG. 56(f) is an isolated perspective view of the inventive antenna assembly shown in FIG. 56(a)
Figure 56G:
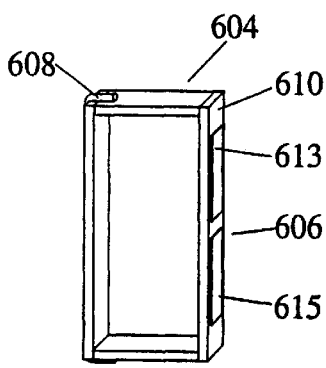
FIG. 56(a) is a perspective view of another embodiment of the inventive antenna assembly retrofitted on a radio signal transmitting device, such as a PCS telephone, the antenna assembly being enclosed in a protective housing.
FIG. 56(h) is a perspective view of an inventive transmitting/receiving unit of a PCS communication system having a plurality of mounted inventive antenna assemblies.
Figure 56A:
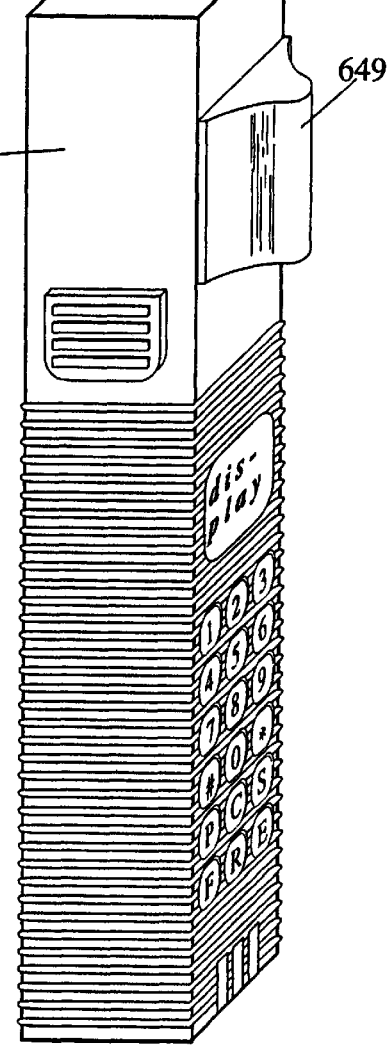

FIG. 56(a) is a perspective view of another embodiment of the inventive antenna assembly 600 retrofitted on a radio signal transmitting device 602, such as a PCS telephone 648. In this view, the antenna unit 604 is rigidly fixed to the shielding member 612, and the antenna assembly 600 is encased within a protective housing 649. The protective housing 649 may be made from any suitable material, such as plastic, fiberglass or rubber, which allows the radio signal emitted by the antenna unit 604 to pass through it. The inventive antenna assembly 600 is similarly constructed as that described above for a cellular telephone 614, shown for example, in FIG. 53(a) and 53(b). However, in this case the antenna assembly 600 is used for communicating at a higher radio frequency, and thus the overall dimensions of the antenna assembly 600 are reduced accordingly. The inventive antenna assembly 600 has a broad bandwidth, and thus functions extremely well as both a transmitting and receiving antenna, making it most useful for two-way radio communication. The driven antenna member 606 is comprised of a first segment 613 and a second segment 615, which may be formed from a thin foil or foil mesh adhered to a face of the support member 610. Alternatively, the driven antenna member 606 can be a thin metallic film formed on the face of the support member 610 utilizing conventional printed circuit board manufacturing techniques, such as screen printing, etching, vapor deposition, etc. A radiation reflector 608 can be similarly formed using printed circuit board techniques, or formed by fixing a thin metallic wire to the opposite face of the support member 610. The antenna unit 604 can be pivotally mounted to enable it to be positioned between the stowed and deployed positions described above, or may be rigidly supported at the position perpendicular to the shielding member 612. The shielding member 612 is constructed from one or more layers of a radiation absorber 619 backed by a metallic shield 617 which are sandwiched between walls of a plastic housing 625. The first segment 613 and the second segment 615 are electrically connected with the communication circuitry of the PCS telephone 648 via a coax cable 621.

In the construction shown above with regard to FIGS. 55(a)–55(g), the driven antenna member 606 transmits a signal having a frequency within the cellular telephone range, which is substantially between 800 MHz and 900 MHz. Thus, the predetermined gap between the driven antenna member 606 and the radiation reflector 608 is substantially 1.25 inches. The overall length of the dipole antenna is substantially 4 inches. Applicants have discovered that an antenna assembly 600 having such dimensions is most effective at providing a high efficiency radio frequency transmitter having the important features of directing the radio energy away from the user of the cellular telephone 614.

In the embodiments shown in FIGS. 56(a)–56(h), the driven antenna member 606 transmits the radio signal having a frequency within the PCS telephone range, which is substantially between 1.83 GHz and 1.91 GHz. In this case, the predetermined gap between the driven antenna member 606 and the radiation reflector 608 is substantially 0.625 inches, and the overall length of the dipole antenna is substantially 2 inches. Applicants have discovered that an antenna assembly 600 configured as described herein is particularly effective for use with a PCS communication system, due to small size obtained for the antenna assembly 600, and the great advantageous of enhanced range and lower battery consumption as compared with the conventional art. In general, applicants have discovered that when the predetermined gap between the radiation reflector 608 and the driven antenna member 606 is maintained by the support member 610 at about one tenth of the wave length of the radio signal transmitted by the driven antenna member 606 and the effective electrical length of the driven antenna member 606 is substantially ¼ of the wave length of the transmitted radio frequency, the antenna assembly 600 is most effective for transmitting the radio signal away from the user of the radio signal transmitting device 602. This allows the inventive antenna assembly 600 to have the enhanced features of an extended transmission range as compared with a conventional antenna assembly 600, reduced battery consumption due to the fact that very little if any of the radiation transmitted by the antenna is absorbed by the body tissues of the user, and the user is protected from the potentially harmful health effects caused by the absorption of microwave frequency radiation.

As shown in FIG. 56(g), the support member 610 may comprise a hollow frame on which is supported the driven antenna member 606 and the radiation reflector 608. In the example shown, the support member 610 is a box-shaped rectangle and has a pair of vertical sides for supporting, respectively, the driven antenna member 606 and the radiation reflector 608. The support member has a pair of horizontal members for precisely maintaining the gap distance between the driven antenna member 606 and the radiation reflector 608.

Figure 56H:
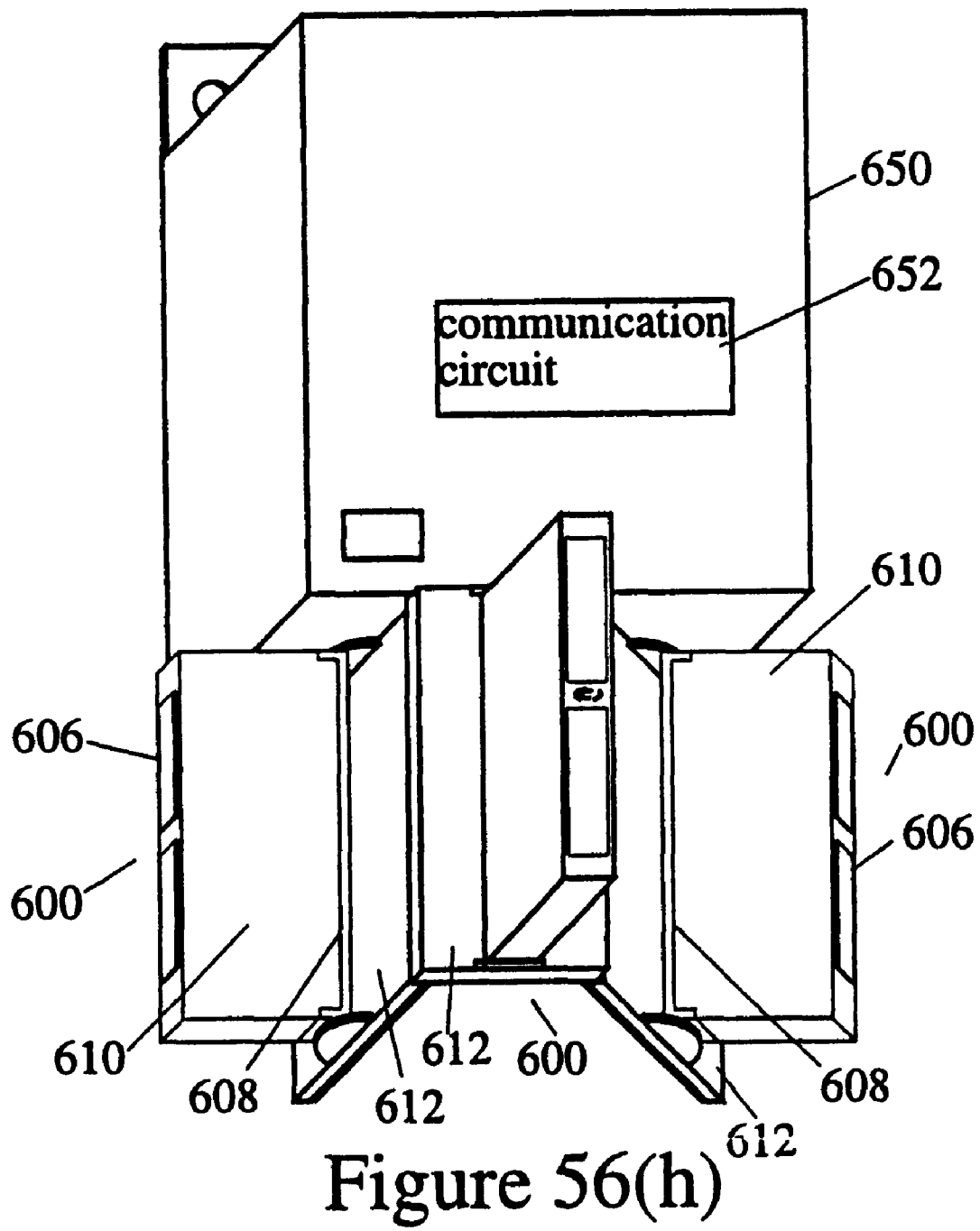

As shown in FIG. 56(h), in accordance with the present invention, a radio signal transmitting/receiving unit 650, such as for a PCS communication system can be provided having the advantages of the inventive antenna assembly 600. A communication circuit 652 is provided for generating a radio signal to be transmitted to at least one mobile receiver. The inventive antenna assembly 600 is mounted on the radio signal transmitting/receiving unit 650. A plurality of antenna assemblies 600 may be provided, as described above with reference to FIG. 48. In this embodiment, however, the configuration of the inventive antenna assembly 600 described, for example, in FIGS. 56(a)–56(f) is utilized. Each antenna assembly 600 has a respective driven antenna member 606 that receives signals from the communication circuit 652 for transmitting a radio signal to a mobile receiver. Each antenna assembly 600 has a respective radiation controlling means, such as the shielding member 612, for controlling the radiation pattern of the radio signal transmitted to the mobile receiver. As described above with reference to FIGS. 48–50(b), the antenna assemblies are mounted on the radio signal transmitting/receiving unit 650, so that at least a portion of the radio signal transmitted from the driven antenna member 606 of each antenna assembly 600 is directed in different directions relative to each other. This enables simultaneous radio communication using a same radio frequency between the antenna assemblies and respective mobile receivers.

FIGS. 57(a)–57(d) are graphical illustrations of empirical data obtained when testing the inventive antenna assembly 600. Two configurations of the inventive antenna assembly 600 were tested, one being constructed for use with a PCS telephone communication system, and the other being constructed for use with a cellular telephone communication system.

Figure 57A:
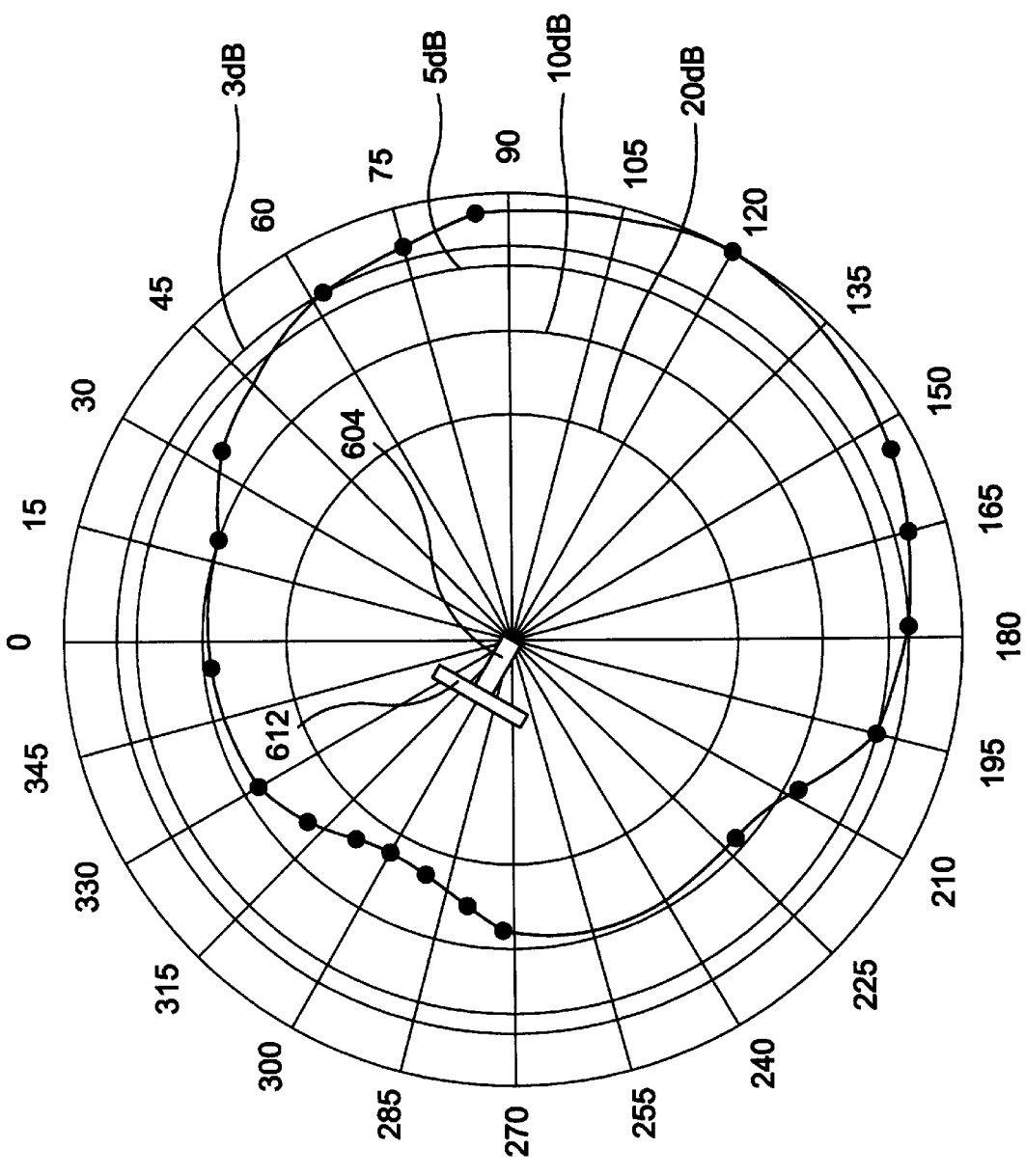
FIG. 57(a) is a graphical representation of test results showing the radiation pattern obtained using a construction of the inventive antenna assembly configured for a PCS telephone.

FIG. 57(a) shows the radiation pattern of the tested antenna assembly 600 constructed for PCS telephone use. The orientation of the inventive antenna assembly is schematically shown. FIG. 57(b) shows the VSWR (voltage standing wave ratio) of the inventive antenna assembly 600 within the frequency range used for PCS communication.

The constructed and tested antenna assembly 600 had a dipole driven antenna member 606 formed from a brass mesh foil with a length of 2.067 inches and a width of 0.2118 inches. A 0.015 inch diameter copper wire with a length of 2.825 inches was used as a radiation reflector 608. A gap of 0.625 inches was maintained between the driven antenna member 606 and the radiation reflector 608 by the support member 610, comprised of printed circuit board substrate material. The shielding member 612 was comprised of two 0.05 inch sheets of a radiation absorber 619 and a foil metallic shield 617. To simulate actual performance parameters, the constructed antenna assembly 600 was mounted on a Model PTR 830 cellular telephone manufactured by JRC International of Fortworth, Tex. An external signal generator producing a PCS range signal was electrically coupled with the tested antenna assembly, since this type of radio signal transmitting device operates in the cellular telephone frequency range.

As can be seen from FIG. 57(a), the inventive antenna assembly 600 has an excellent front to back ratio averaging 13 to 15 dB, providing for the protection of the user from the possibly harmful effects of absorbed radiation, and providing an enhanced signal range, since the energy conventionally absorbed by the head and body is directed away from the user. As can be seen from FIG. 57(b), the VSWR of the tested antenna assembly 600 is excellent. The bandwidth of the PCS communications systems is between 1.8 and 1.9 GHz which is marked on the graph by triangles 1, 2 and 3. Within this bandwidth, the inventive antenna assembly has a VSWR below 1.5:1 at the low end of the band and about 1.2:1 at the high end, which translates into excellent performance characteristics and allows the inventive antenna assembly 600 to act efficiently as both a transmitting and receiving antenna for a PCS telephone. The measure gain exceed 3 db over a standard laboratory dipole.

Figure 57C:
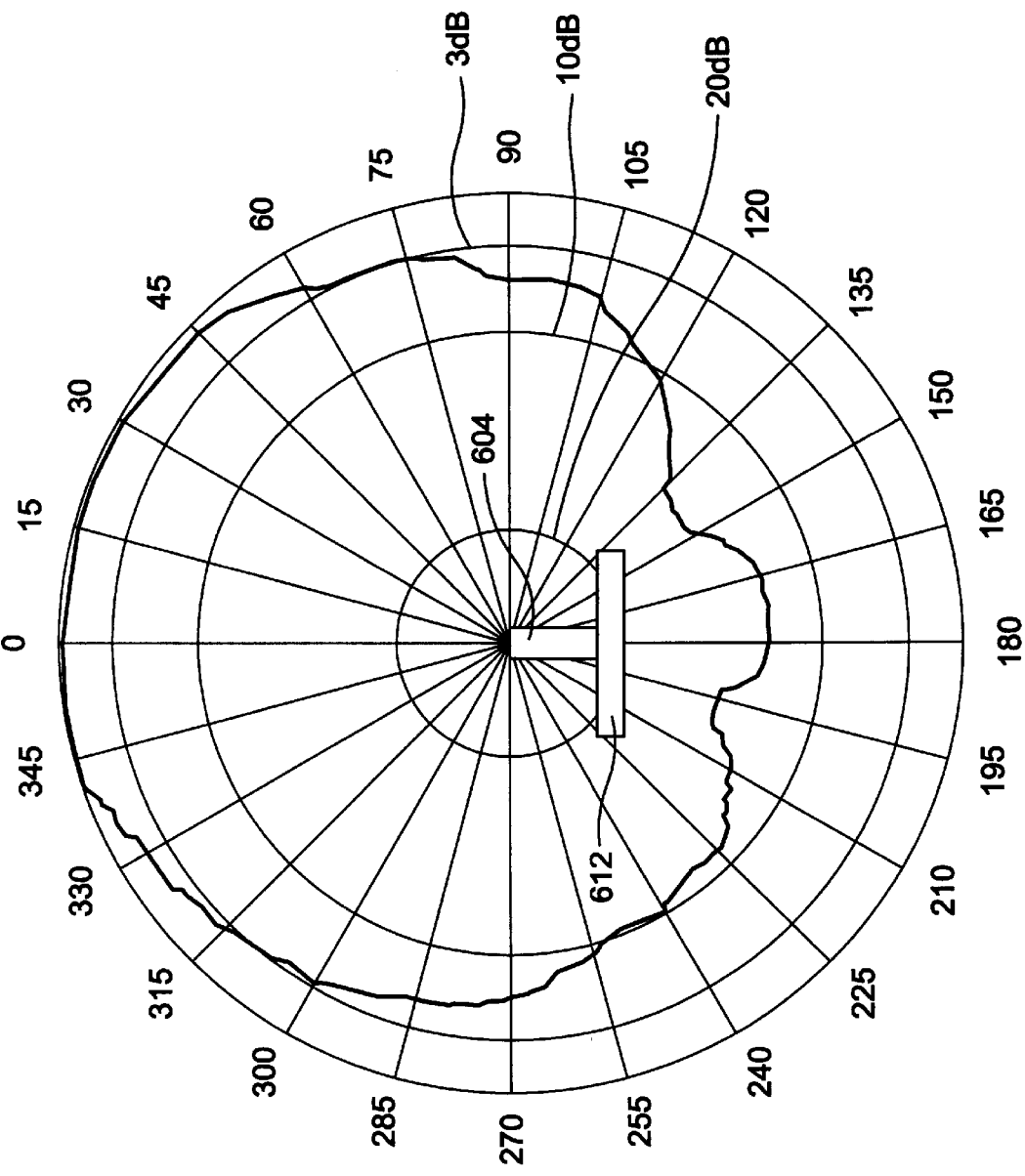
FIG. 57(c) is a graphical representation of test results showing the radiation pattern obtained using a construction of the inventive antenna assembly configured for a PCS telephone.
Figure 57D:
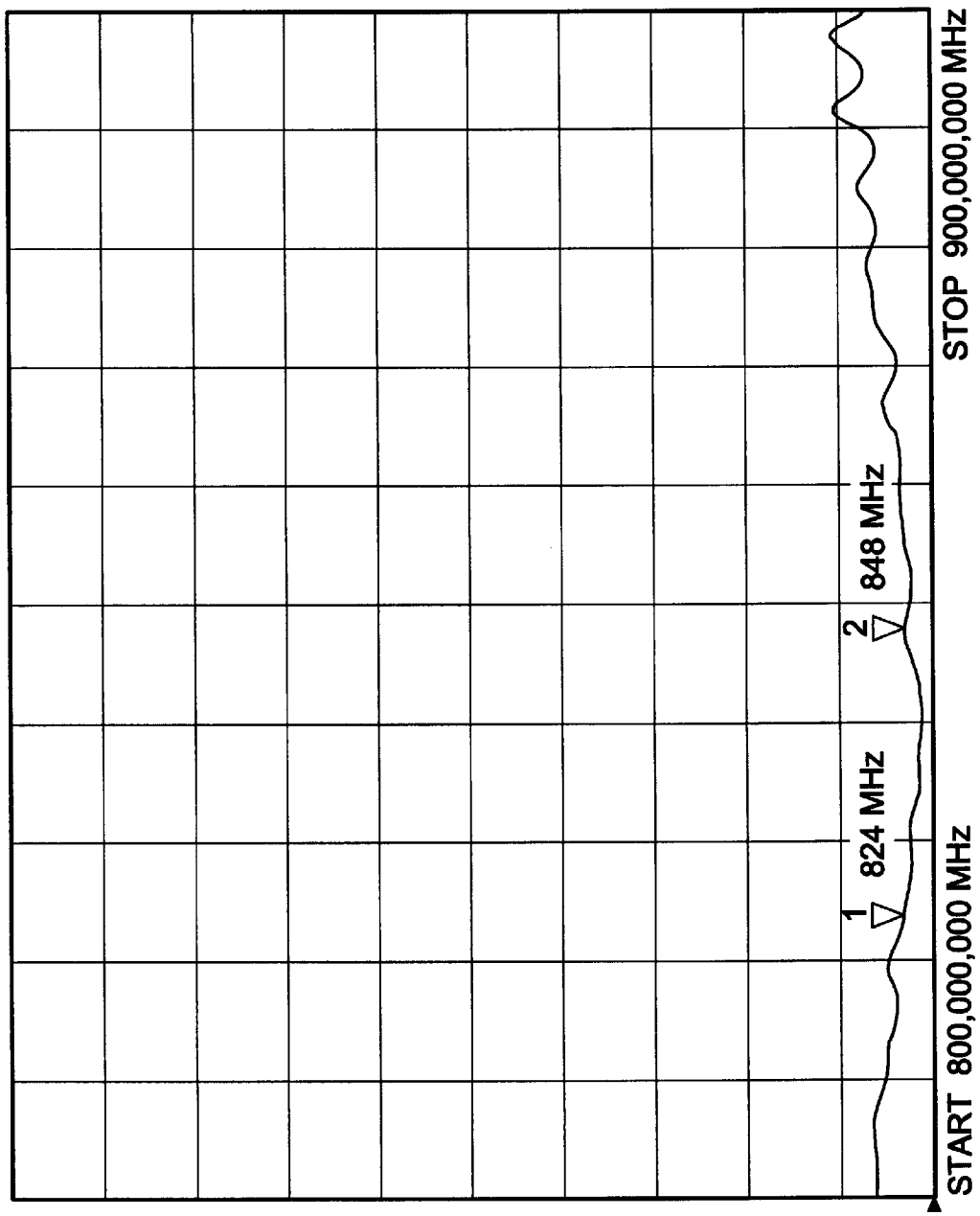
FIG. 57(d) is a graphical representation of test results showing the VSWR obtained using a construction of the inventive antenna assembly configured for a PCS telephone.

FIG. 57(c) shows the radiation pattern of the tested antenna assembly 600 constructed for cellular telephone use, nominally 900 MHz. The orientation of the inventive antenna assembly is schematically shown. FIG. 57(d) shows the VSWR (voltage standing wave ration) of the inventive antenna assembly 600 within the frequency range used for cellular telephone communication.

The constructed and tested antenna assembly 600 had a folded dipole driven antenna member 606 constructed from a brass mesh foil with an overall length of about 4 inches and a width of 0.25 inches. A folded 14 gauge copper wire with an overall length of 5.81 inches, slightly greater than the length of the driven antenna member was used as a radiation reflector 608, and was oriented as shown in FIG. 53(a). A gap of 1.25 inches was maintained between the driven antenna member 606 and the radiation reflector 608 by the support member 610, comprised of printed circuit board substrate material. The shielding member 612 was comprised of two 0.05 inch sheets of a radiation absorber 619 and a foil metallic shield 617. The constructed antenna assembly 600 was mounted on and electrically coupled during testing with a Model PTR 830 cellular telephone manufactured by JRC International of Fortworth, Tex.

As can be seen from FIG. 57(c), the inventive antenna assembly 600 constructed for cellular telephone use also has an excellent front to back ratio averaging 12 to 13 dB, providing for the protection of the user from the possibly harmful effects of absorbed radiation, and providing an enhanced signal range, since the energy conventionally absorbed by the head and body is directed away from the user. The bandwidth of the cellular communications systems is between 800 and 900 MHz. As can be seen from FIG. 57(d), the VSWR of the tested antenna assembly 600 is again excellent, especially in the 824 to 848 MHz region where it averaged 1.2:1 to 1.3:1. This suggests a very efficient antenna that can be effectively used for transmitting and receiving radio signals in the cellular telephone frequency range. The measure gain exceed 4 db over a standard laboratory dipole.

The spacing of the driven antenna member 606 and the radiation reflector 608, as well as the length, widths, diameters and thickness of the elements making up the inventive antenna assembly 600 can be adjusted depending on the desired size and performance characteristics of the antenna assembly 600, and the electrical characteristics of the radio signal transmitting device 602 on which the antenna assembly 600 is to be mounted.

Figure 58A:
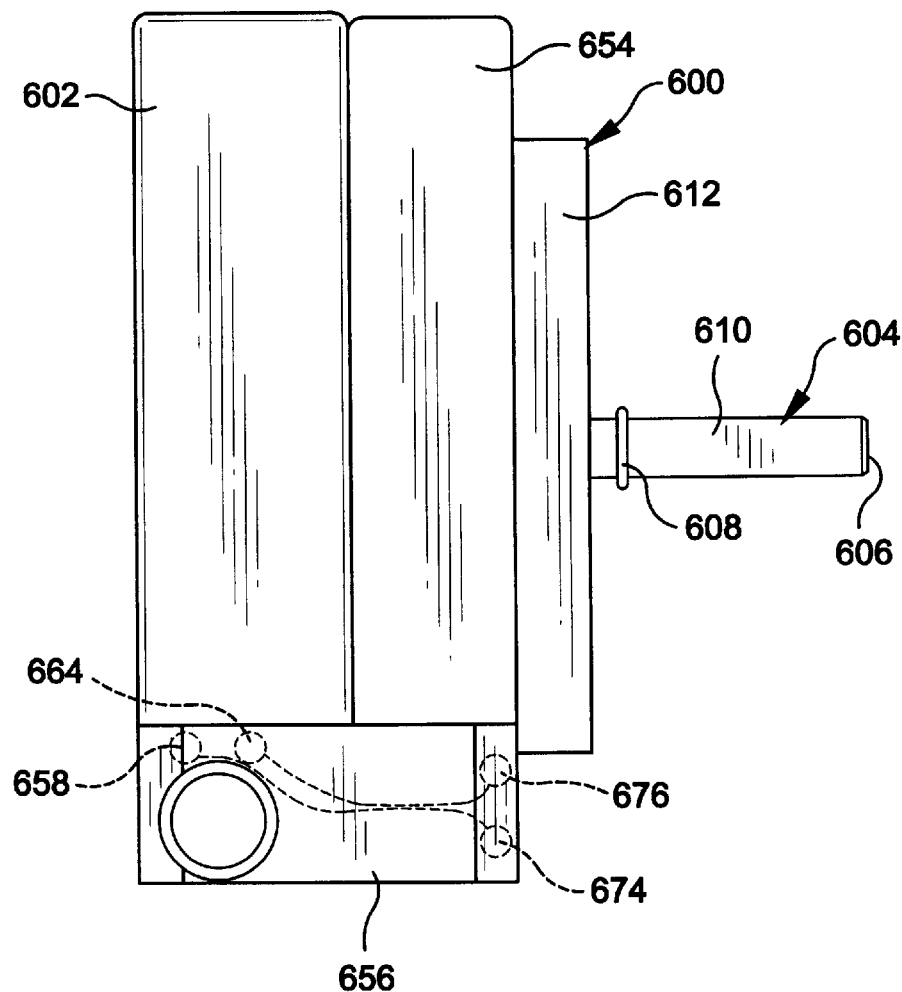
FIG. 58(a) is a top plan view of a radio signal transmitting device having a retrofitted inventive antenna assembly and battery pack, showing an inventive connection adapting means.
Figure 58B:
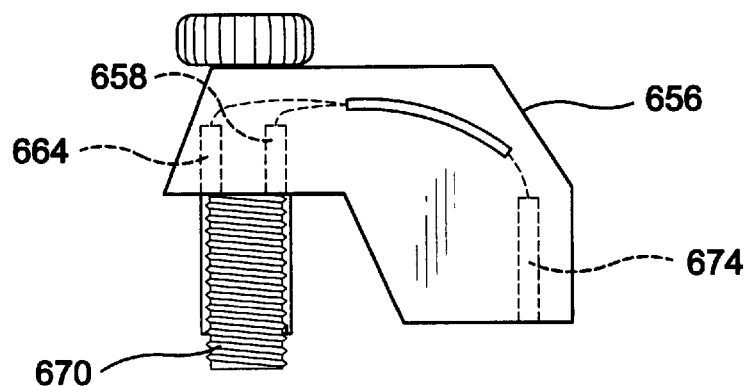
FIG. 58(b) is an isolated side view of the inventive connection adapting means shown in FIG. 58(a)

FIG. 58(a) is a top plan view of a radio signal transmitting device 602 having a retrofitted inventive antenna assembly 600 and battery pack 654. The inventive antenna assembly 600 and battery pack 654 are electrically and mechanically connected to the radio signal transmitting device 602, such as a cellular telephone 614(FIGS. 54(a) and 54(b)), PCS telephone 648 (FIG. 56(a)), walkie-talkie, police radio, etc., by utilizing an inventive connection adapter 656. A side view of the inventive connection adapter 656 is shown in FIG. 58(b). This particular connection adapter 656 shown in suitable for adapting the inventive antenna assembly 600 for use with a cellular telephone 614 described below with reference to FIGS. 61(a)–61(c), such as that manufactured by Motorola of Libertyville, Ill. The connection adapter 656 is provided for adapting an electrical connection between the cellular telephone 614 and the inventive antenna assembly 600. The connection adapter 656 includes a driven signal connection terminal 658 for completing a connection between a driven signal output terminal 660 (FIG. 61(c)) of the radio signal transmitting device 602 and the first segment 613 of the dipole driven antenna member 606. A ground connection terminal 664 is provided for completing a connection between a ground output terminal 666 (FIG. 61(c)) of the radio signal transmitting device 602 and the second segment 615 of the dipole antenna. A threaded post 670 is provided for engaging with a threaded receiving hole 672 (FIG. 61(c)) of the radio signal transmitting device 602. The threaded post 670 mechanically fixes the connection adapter 656 to the radio signal transmitting device via the threaded receiving hole 672.

Figures 61A, 61B, 61C:
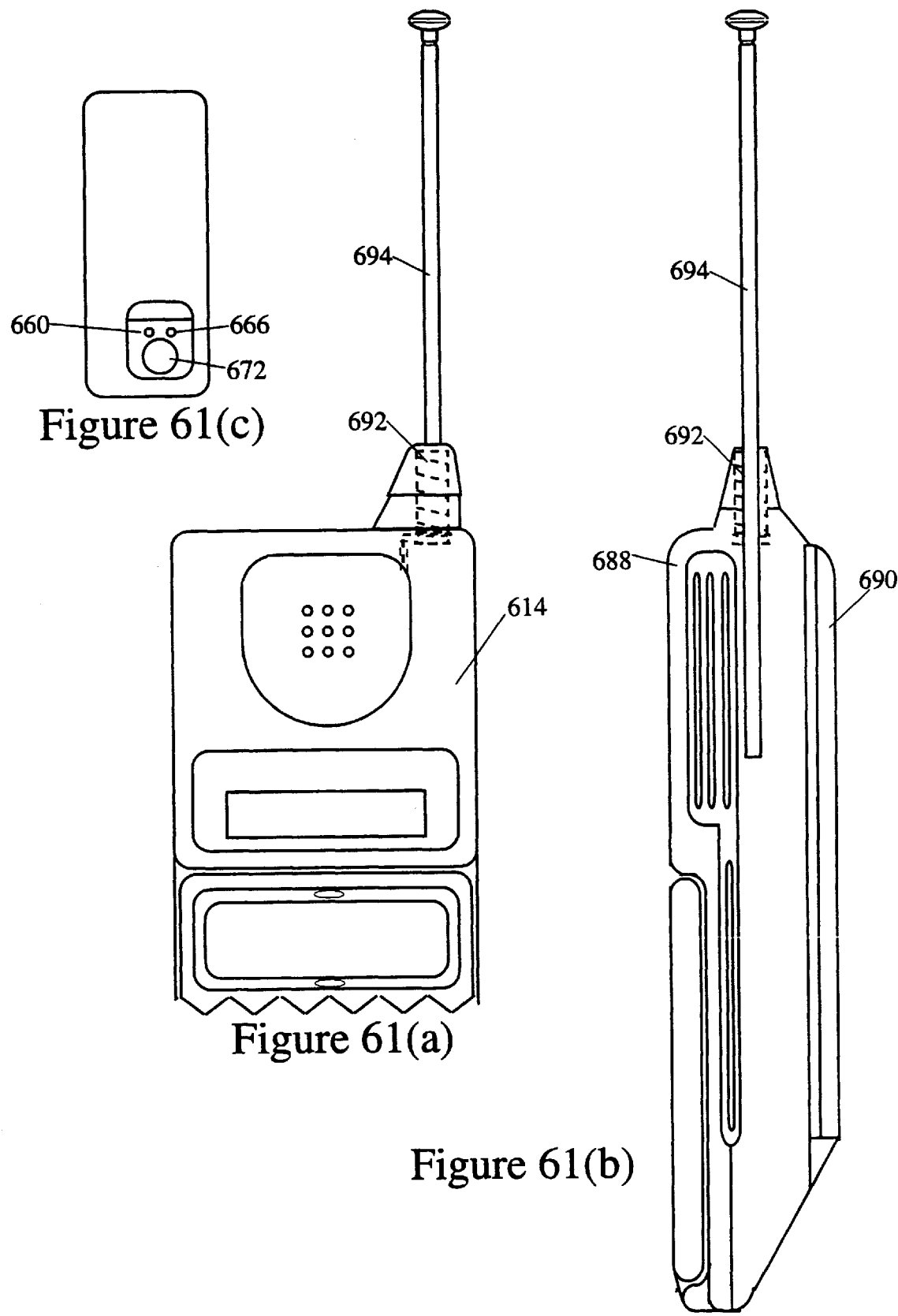
FIG. 61(a) is a cutaway front plan view of a prior art cellular telephone.
FIG. 61(b) is a side plan view of the prior art cellular telephone shown in FIG. 61(a)
FIG. 61(c) is a top plan view of the prior art cellular telephone shown in FIG. 61(c).

In the configuration of the connection adapter 656 shown in FIGS. 58(a) and 58(b), a pair of male connection terminals 658,664 are provided which mate with female connection terminals 660,666 (FIG. 61(c)) provided on the radio signal transmitting device 602. A pair of female connection terminals 674,676 are provided, each respectively connected by an electrical wire to one of the pair of male connection terminals 658,664. The retrofitting of the inventive antenna assembly 600 and battery pack 654 will be described with reference to the use of a Motorola cellular telephone 614. However, alternative connection adapters 656 can be configured, depending on the type of radio signal transmitting device 602 to which the antenna assembly 600 is to be retrofitted.

Figure 59A:
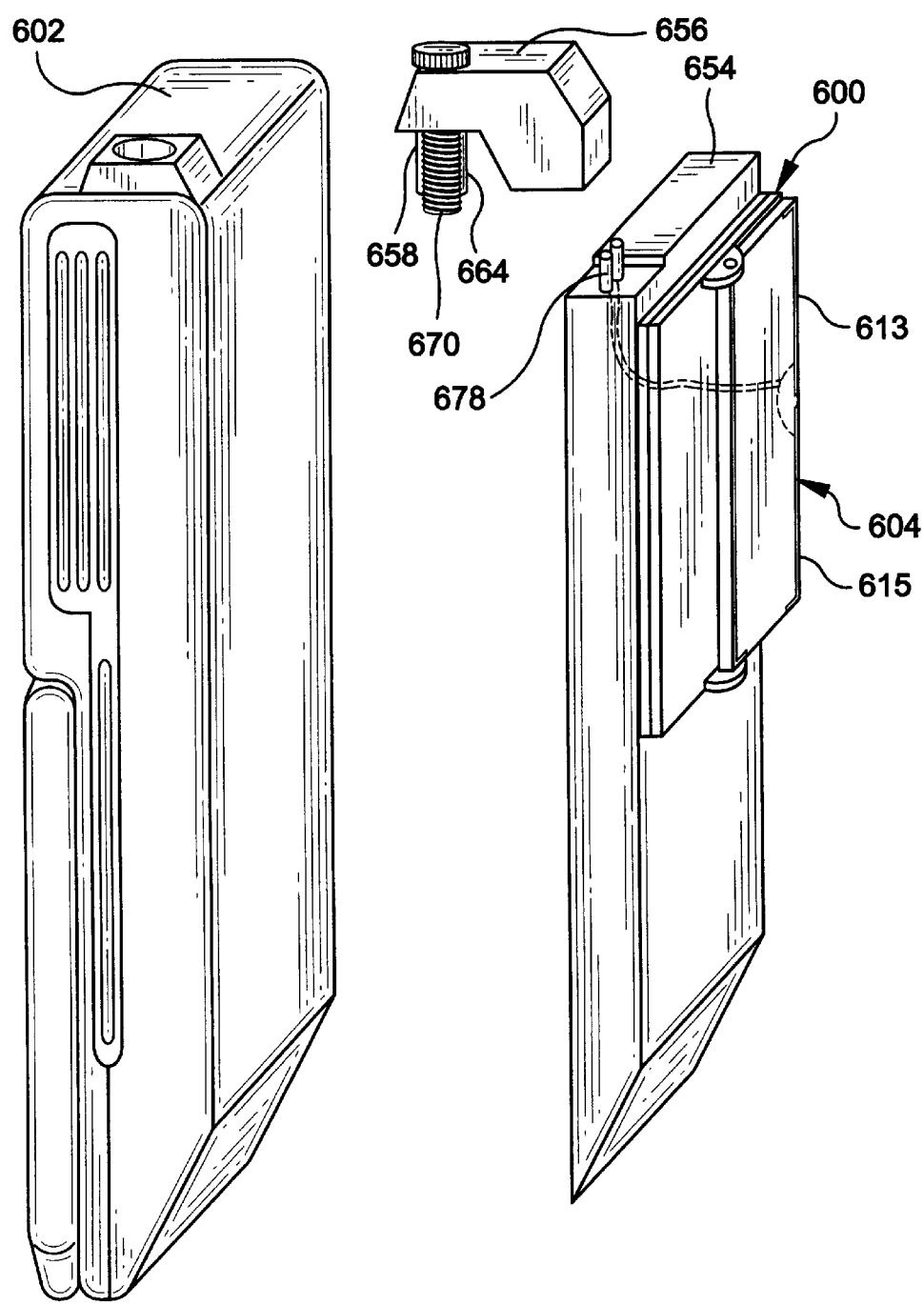
FIG. 59(a) is an unassembled perspective view of a radio signal transmitting device, such as a cellular telephone, the inventive connection adapting means and the retrofittable inventive antenna assembly and battery pack.
Figure 59B:
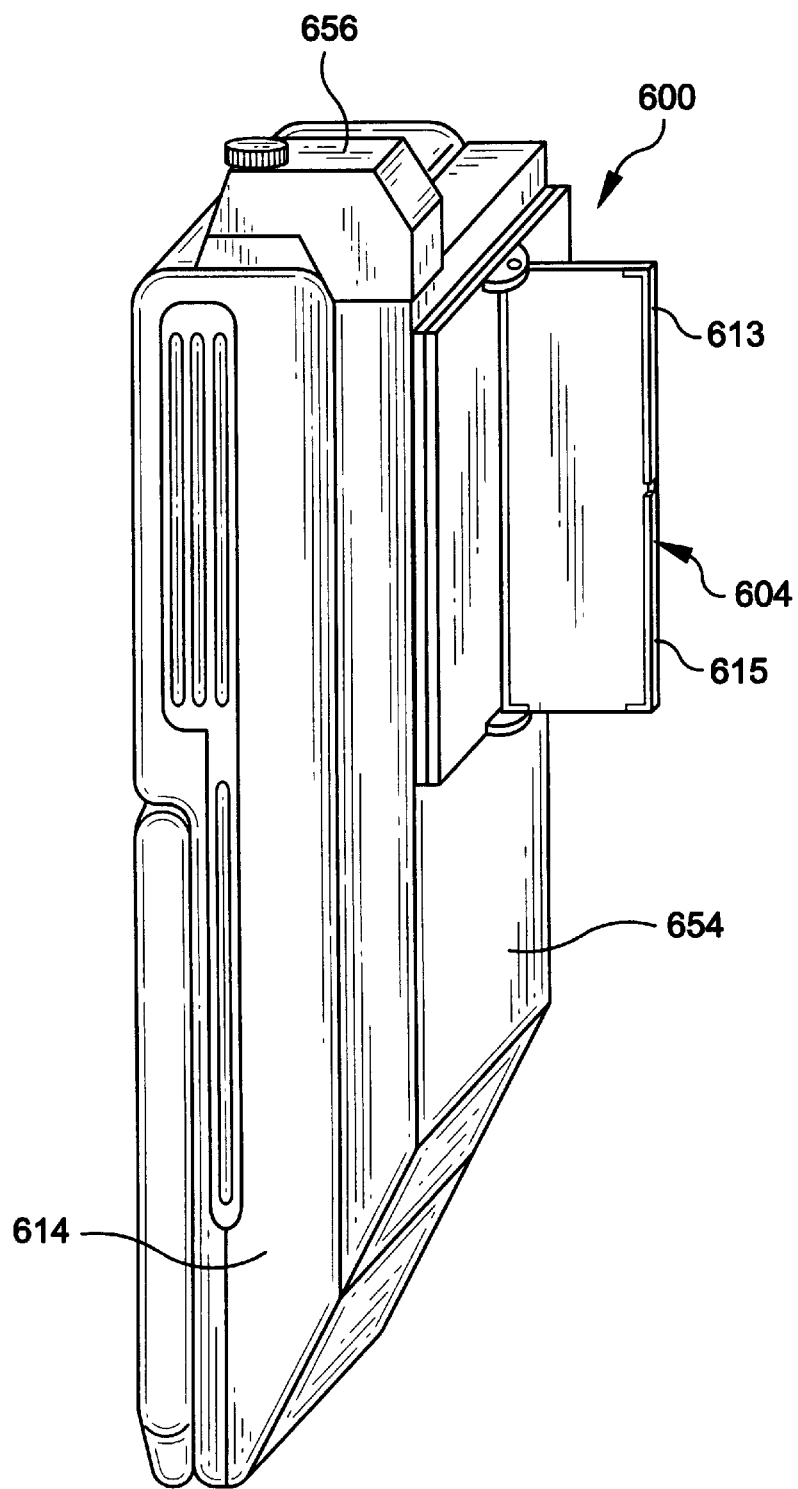
FIG. 59(b) is an assembled perspective view of the radio signal transmitting device cellular telephone shown in FIG. 59(a), having the inventive connection adapting means providing an electrical and mechanical connection with the retrofitted inventive antenna assembly and battery pack.

FIG. 59(a) is an unassembled perspective view of a radio signal transmitting device 602, such as a cellular telephone 614, the inventive connection adapter 656, and the retrofittable inventive antenna assembly 600 and battery pack 654. The retrofittable inventive antenna assembly 600 and battery pack 654 includes two male connection terminals 678 which are coupled electrically to the first segment 613 and the second segment 615, respectively of the dipole driven antenna member 606. A shielded coax cable 621 connects the electrical terminals 660,666 of the radio signal transmitting device 602 with the inventive antenna assembly 600, so as to prevent degradation of the signal received by the driven antenna member 606 from the transmission/reception circuit of the radio signal transmitting device 602.

Figure 60A:
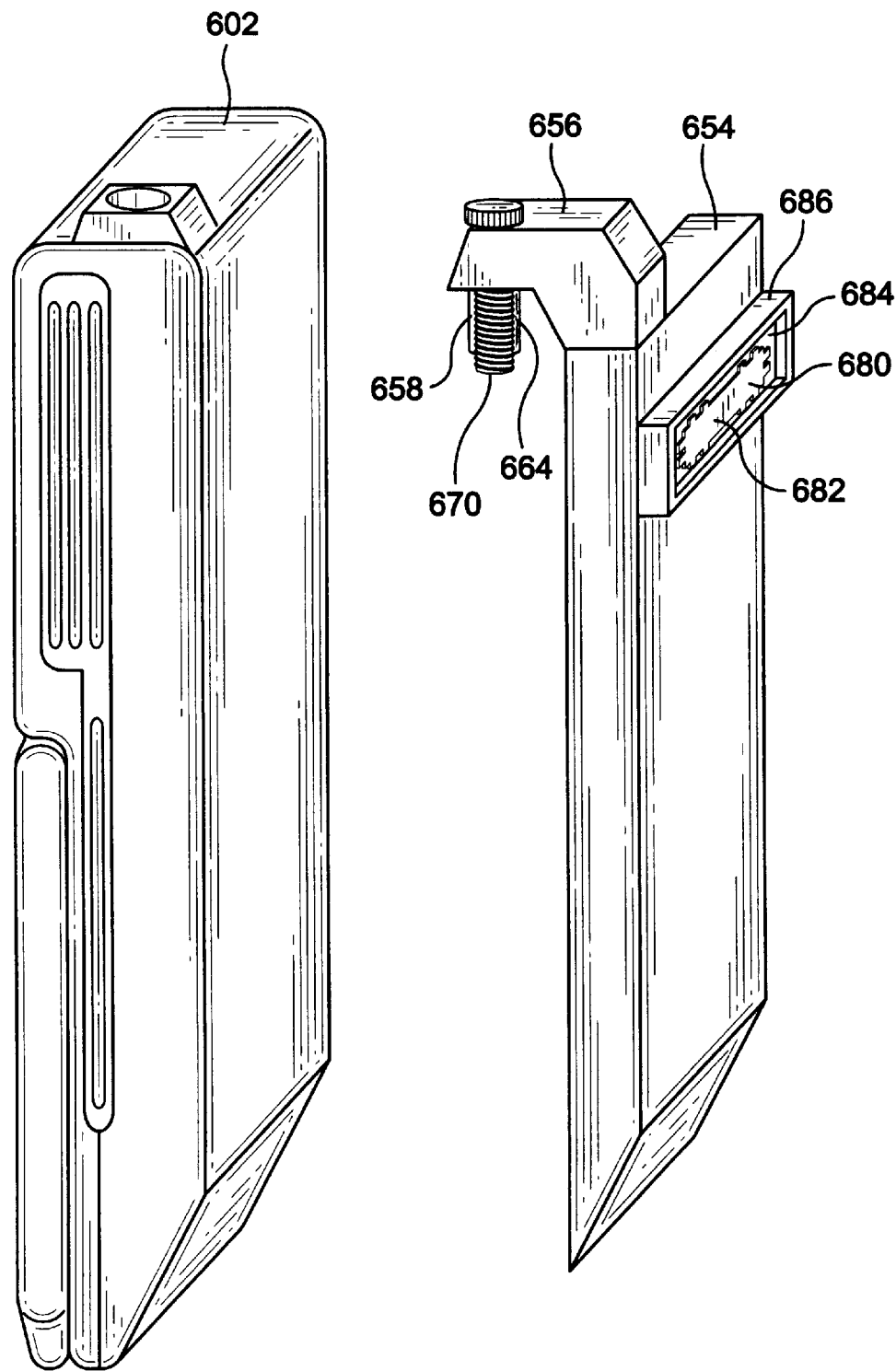
FIG. 60(a) is an unassembled perspective view of a radio signal transmitting device.
Figure 60B:
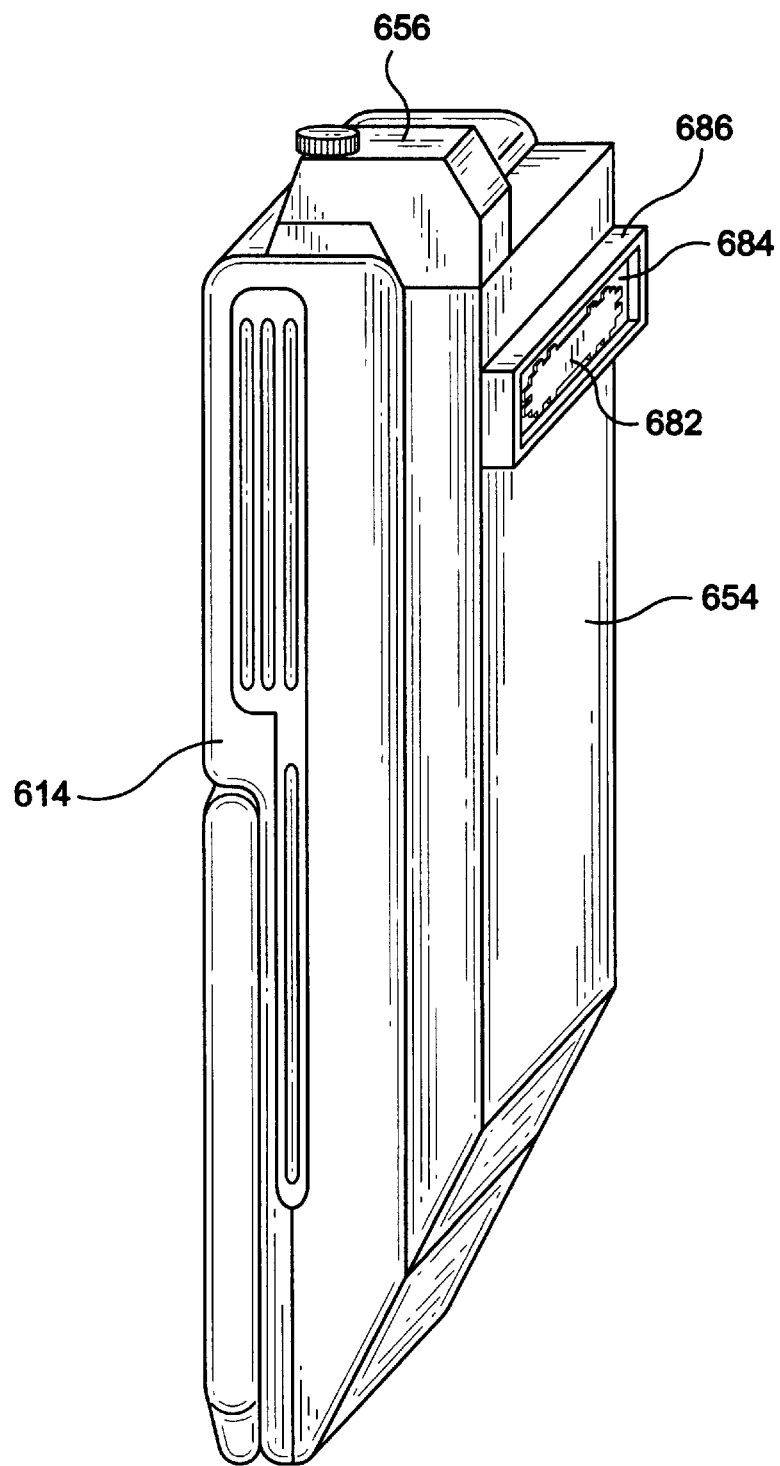
FIG. 60(b) is an assembled perspective view of the radio signal transmitting device shown in FIG. 60(a)

FIG. 60(a) is an unassembled perspective view of a radio signal transmitting device 602, such as a cellular telephone 614, inventive connection adapter 656, and an embodiment of a retrofittable inventive patch-type antenna assembly 600 and battery pack 654. In accordance with the inventive patch antenna 680, a thin-film patch 682 is formed by coating or laminating both sides of a dielectric substrate 684 with a thin film of metal. The metal can be formed on the dielectric substrate 684 by sputtering, screen printing, vacuum depositing, etc. The metal on one side of the dielectric substrate 684 is formed into a high resolution patch antenna 680, using photolithography, screen printing and/or etching techniques, having a configuration and dimensions that are effective to form a microwave antenna. The metal layer on the other side of the dielectric substrate 684 is used as a ground plane for signal transmission and/or reception. The radiation patch antenna 680 is received by radiation blocker/absorber and/or reflector member 686. This member may be integrally formed with, or fixed to the rechargeable battery pack 654 of the radio signal transmitting device 602. Thus, the radiation emitting patch antenna 680 is effectively shielded to prevent the unwanted and potentially harmful exposure of the user to the emitted radiation, while allowing for transmission of an emitted radiation signal in directions away from the user. In accordance with the above configurations, the inventive connection adapter 656 makes obtaining the advantageous of the inventive antenna assemblies as simple as replacing the cellular phone rechargeable battery pack 654.

FIGS. 61(a)–61(c) show a prior art Motorola flip phone. This phone includes a handset 688 and a detachable battery 690. The battery 690 is positioned on the back of the handset 688 and slips upward to lock into position by a détente mechanism. Electrical contacts on the rear of the handset 688 engage with a set of contacts on the battery 690. This prior art cellular telephone comes equipped with a conventional internal antenna 692 and extendible monopole antenna shaft 694. The internal antenna 692 is coupled with the driven signal output terminal 660, and emits an omni-directional radio signal. A large portion of this omni-directional signal is received and absorbed by the user, mostly by the head.

All of the various constructions of the inventive antenna assembly described herein (for example, antenna assembly 600 shown in FIG. 53(a)) provide a means for preventing, or at least limiting, a radio signal transmitted by a radio signal transmitting device (cellular telephone, PCS telephone, walkie-talkie, police radio, or the like) from interfering with an electronic device on or within the body of the user of the radio signal transmitting device. In accordance with the present invention, interference with such an electronic device, such as a hearing aid, pacemaker, or the like, is prevented by shielding and/or directing away that portion of the radio signal that would conventionally be transmitted toward the user. Thus, the inventive antenna assembly prevents unwanted and potentially harmful exposure to radiation, and prevents interference with an electronic device, such as a hearing aid, by the transmitted radio signal. Further, the inventive antenna assembly obtains a significant increase in the forward gain of the transmitted radio signal, making the radio signal transmitting device more effective for communication.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

What is claimed is:

1. An antenna assembly for transmitting a radio signal from a communication device for use by a user, said antenna assembly comprising:

an antenna structure, including a driven element and at least one parasitic element, and further including a support structure for supporting the driven element and the at least one parasitic element and for maintaining a gap distance between the driven element and the at least one parasitic element effective to direct at least a portion of the radio signal in a direction away from the user;

a radiation-shielding structure for blocking at least a portion of the radio signal directed toward the user of the communication device, said radiation-shielding structure including a radiation-shielding material and a conductive element, said conductive element disposed during use between the radiation-shielding material and the user; and a pivot structure for pivotally securing the support structure relative to the radiation shielding structure, the radiation shielding structure being disposed during use between the antenna structure and the user.

2. The antenna assembly of claim 1 wherein the radio signal has a wavelength and the gap distance between the driven element and the at least one parasitic element is approximately one tenth of the wavelength of the radio signal.

3. The antenna assembly of claim 1 wherein the radio signal has a wavelength and the driven element has an effective antenna length of approximately one-half of the wavelength.

4. The antenna assembly of claim 1 wherein the radio signal has a wavelength and the at least one parasitic element has a length of approximately one-half of the wavelength.

5. The antenna assembly of claim 1 wherein the conductive element is a metal layer.

6. The antenna assembly of claim 1 wherein the radiation shielding material is a conductive material dispersed in a non-conductive matrix.

7. The antenna assembly of claim 6 wherein the conductive material is selected from a group consisting of: a conductive free metal, $FeO_2$, titanium oxide, a ferromagnetic material, carbonyl iron, ferrite oxide, garnet, magnesium, nickel, lithium, yttrium, and calcium vanadium.

8. An antenna assembly for emitting a radio signal generally in a transmission direction from a communication device for use by a user, said antenna assembly comprising:

an antenna structure, said antenna structure including a driven element and a radiation redirecting element, said antenna structure further including a support member for supporting said driven element and said radiation redirecting element and for maintaining a distance between said driven element and said radiation redirecting element effective to redirect at least a portion of the radio signal;

a radiation-shielding structure displaced away from the antenna structure in a direction generally opposite the transmission direction, the radiation-shielding structure including a radiation-shielding material and a conductive member; and a pivotal connection member for pivotally securing the antenna structure relative to the radiation-shielding structure, the radiation shielding-structure being disposed during use between the antenna structure and the user.

9. The antenna assembly of claim 8 wherein the radiation-shielding material is a conductive material dispersed in a non-conductive matrix.

10. The antenna assembly of claim 9 wherein the conductive material is selected from a group consisting of: a conductive free metal, $FeO2$, titanium oxide, a ferromagnetic material, carbonyl iron, ferrite oxide, garnet, magnesium, nickel, lithium, yttrium, and calcium vanadium.

11. An antenna assembly for emitting a radio frequency signal generally in a transmission direction, said antenna assembly comprising:

a conductive member including a face surface generally directed in the transmission direction;

a radiation shielding member conformingly engaging the face surface;

a directional antenna including a driven element and a radiation redirecting element, said radiation redirecting element displaced a first distance from said driven element to effectively redirect at least a portion of the radio frequency signal toward the transmission direction; and a mounting structure for pivotally connecting the directional antenna relative to the radiation shielding member, the driven element and the radiation shielding member being spaced apart a distance which is variable as the directional antenna is pivoted.

* * * * *

UNITED STATES PATENT AND TRADEMARK OFFICE
CERTIFICATE OF CORRECTION

PATENT NO. : 6095820
DATED : August 1, 2000
INVENTOR(S) : Luxon, Norval N.

It is certified that error appears in the above-indentified patent and that said Letters Patent is hereby corrected as shown below:

On the title page: Item [75] Inventor: "Norval N. Luxon --.

Signed and Sealed this

Third Day of April, 2001

*Attest:*

NICHOLAS P. GODICI

*Attesting Officer*   *Acting Director of the United States Patent and Trademark Office*